(12) United States Patent
Tonami

(10) Patent No.: US 6,836,456 B2
(45) Date of Patent: Dec. 28, 2004

(54) INFORMATION REPRODUCING APPARATUS

(75) Inventor: Junichiro Tonami, Yokohama (JP)

(73) Assignee: Victor Company of Japan, Ltd., Yokohama (JP)

(*) Notice: Subject to any disclaimer, the term of this patent is extended or adjusted under 35 U.S.C. 154(b) by 741 days.

(21) Appl. No.: 09/903,566

(22) Filed: Jul. 13, 2001

(65) Prior Publication Data

US 2002/0018422 A1 Feb. 14, 2002

(30) Foreign Application Priority Data

Jul. 27, 2000 (JP) ........................................ 2000-226775
Jul. 28, 2000 (JP) ........................................ 2000-228704

(51) Int. Cl.[7] .................................................. G11B 5/76
(52) U.S. Cl. ............................. 369/59.22; 369/47.35; 369/124.02
(58) Field of Search ................... 369/47.15, 47.16, 369/47.23, 47.24, 47.35, 53.31, 53.34, 59.19, 59.21, 59.22, 59.23, 124.02, 124.03, 124.05

(56) References Cited

U.S. PATENT DOCUMENTS 5,835,467 A  11/1998 Tomita et al.
6,327,235 B1 * 12/2001 Hayashi ..................... 369/59.1

FOREIGN PATENT DOCUMENTS

| EP | 0 840 318 A2 | 5/1998 |
| EP | 1 160 785 A2 | 12/2001 |
| EP | 1 174 877 A2 | 1/2002 |
| JP | 9-320200 | 12/1997 |

* cited by examiner

Primary Examiner—Paul W. Huber
(74) Attorney, Agent, or Firm—Louis Woo

(57) ABSTRACT

A first signal is read from a first track of a recording medium. A second signal is read from a second track of the recording medium which neighbors the first track. A filter processes the second signal into a filtering-resultant signal according to a controllable filtering characteristic. A first subtracter operates for subtracting the filtering-resultant signal from the first signal to generate a subtraction-resultant signal. A peak detector generates peak-point information representing a timing at which the level represented by the first signal peaks. A temporary decision circuit implements a temporary decision about the subtraction-resultant signal. A second subtracter generates an error signal indicative of a difference between the subtraction-resultant signal and a signal representative of the result of the temporary decision at a timing equal to the timing represented by the peak-point information. The filtering characteristic of the filter is controlled in response to the error signal.

21 Claims, 54 Drawing Sheets

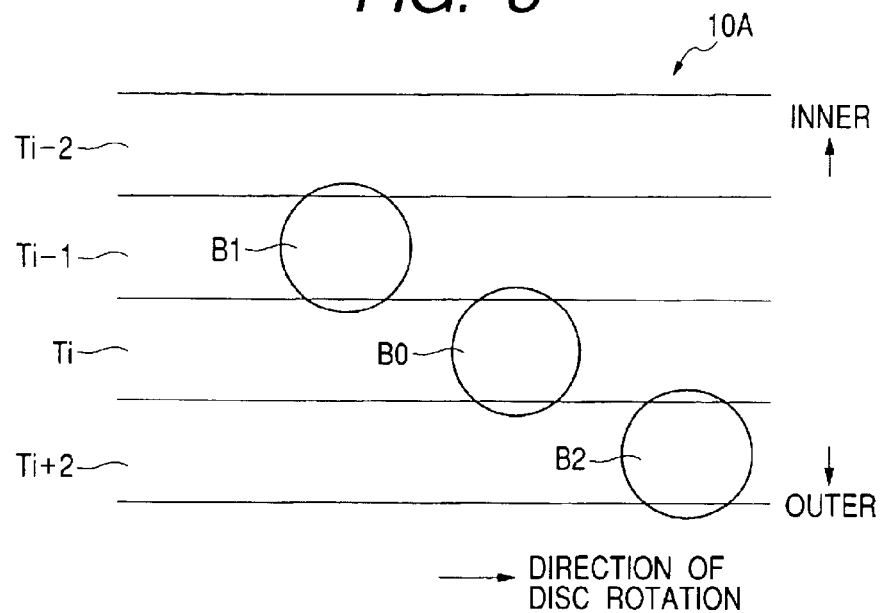
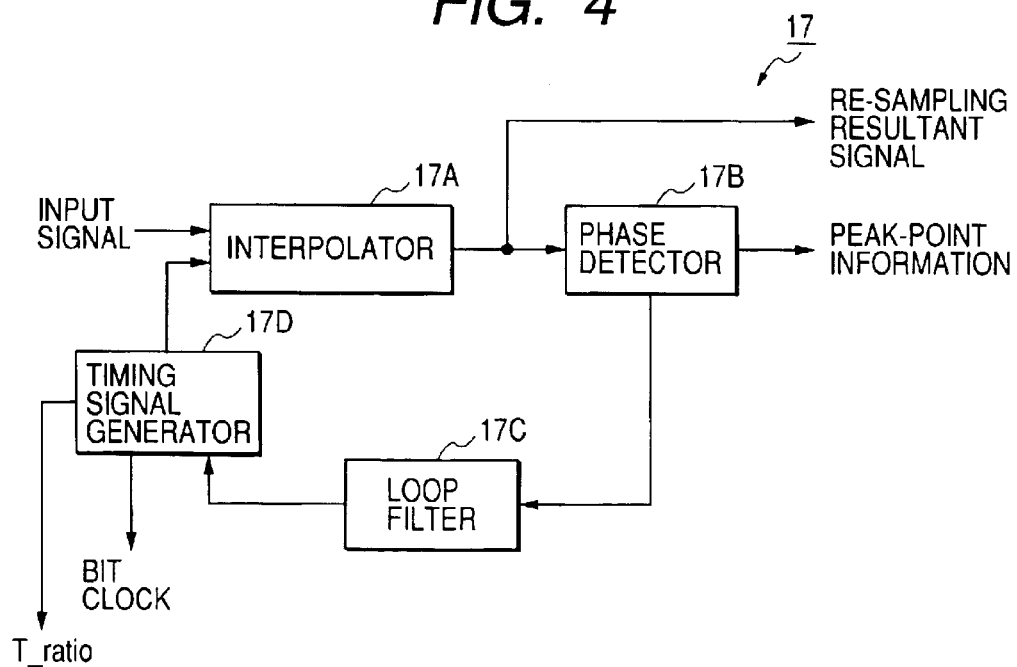

FIG. 10

| RLL MODE | | RLL (2, X) | | | | |
|---|---|---|---|---|---|---|
| | 1 | 2 | 3 | 4 | 5 | 6 |
| PR MODE | PR(1,-1) | PR(1,1,-1,-1) | PR(1,2,-2,-1) | PR(1,3,-3,-1) | PR(2,3,-3,-2) | PR(3,4,-4,-3) |
| TARGET VALUE a+b | +1 | +2 | +3 | +4 | +5 | +7 |
| a | +1 | +1 | +1 | +1 | +2 | +3 |
| 0 | 0 | 0 | 0 | 0 | 0 | 0 |
| -a | -1 | -1 | -1 | -1 | -2 | -3 |
| -(a+b) | -1 | -2 | -3 | -4 | -5 | -7 |
| GAIN G | A | A/2 | A/3 | A/4 | A/5 | A/7 |

OUTPUT VALUE/INPUT VALUE

OUTPUT VALUE/INPUT VALUE

FIG. 38

| PR MODE / RLL MODE | | 1 | 2 | 3 | 4 | 5 | 6 |
|---|---|---|---|---|---|---|---|
| | | PR(1,1) | PR(1,1,1,1) | PR(1,2,2,1) | PR(1,3,3,1) | PR(2,3,3,2) | PR(3,4,4,3) |
| RLL(1,X) {M1-7, MMVF, MD2} | 2a+2b | | | 6→+3 | 8→+4 | 10→+5 | 14→+7 |
| | a+2b | | | 5→+2 | 7→+3 | 8→+3 | 11→+4 |
| | 2b | | | 4→+1 | 6→+2 | 6→+1 | 8→+1 |
| | a+b | | | 3→ 0 | 4→ 0 | 5→ 0 | 7→ 0 |
| | 2a | | | 2→−1 | 2→−2 | 4→−1 | 6→−1 |
| | a | | | 1→−2 | 1→−3 | 2→−3 | 3→−4 |
| | 0 | | | 0→−3 | 0→−4 | 0→−5 | 0→−7 |
| | GAIN G | A | A/2 | A/3 | A/4 | A/5 | A/7 |
| RLL(2,X) {EFM, EFMP, M8-15, PR} | 2a+2b | | 4→+2 | 6→+3 | 8→+4 | 10→+5 | 14→+7 |
| | a+2b | 2→+1 | 3→+1 | 5→+2 | 7→+3 | 8→+3 | 11→+4 |
| | a+b | 1→ 0 | 2→ 0 | 3→ 0 | 4→ 0 | 5→ 0 | 7→ 0 |
| | a | 0→−1 | 1→−1 | 1→−2 | 1→−3 | 2→−3 | 3→−4 |
| | 0 | | 0→−2 | 0→−3 | 0→−4 | 0→−5 | 0→−7 |

INFORMATION REPRODUCING APPARATUS

BACKGROUND OF THE INVENTION

1. Field of the Invention

This invention generally relates to an apparatus for reproducing information from a recording medium such as an optical disc.

2. Description of the Related Art

Japanese patent application publication number 9-320200 discloses an apparatus for reproducing information from an optical disc in a 3-beam method. The apparatus of Japanese application 9-320200 applies three forward laser beams to three neighboring tracks on the optical disc, respectively. The three forward laser beams are reflected by the optical disc before returning to the apparatus. The three return laser beams are converted into three readout signals respectively. The readout signal which corresponds to central one among the three forward laser beams (or central one among the three neighboring tracks) is called the first readout signal. The other readout signals are called the second and third readout signals, respectively.

In the apparatus of Japanese application 9-320200, the first, second, and third readout signals are sampled into first, second, and third sequences of signal samples respectively. The first, second, and third sample sequences are passed through first, second, and third variable-coefficient filters to generate first, second, and third filtering-resultant sample sequences, respectively. The first filter is designed to remove signal components caused by intersymbol interferences. The second filter is designed so that the second filtering-resultant sample sequence will correspond to a crosstalk between the central track and the related track neighboring the central track. The third filter is designed so that the third filtering-resultant sample sequence will correspond to a crosstalk between the central track and the related track neighboring the central track. The second and third filtering-resultant sample sequences are subtracted from the first filtering-resultant sample sequence to generate a readout sample sequence. A final reproduced signal is derived from the readout sample sequence.

The apparatus of Japanese application 9-320200 includes a device for extracting, from the final readout sample sequence, every sample (every zero-cross sample) corresponding to a time point at which the value represented by the final readout sample sequence crosses "0". The value represented by the extracted zero-cross sample is used as an error signal reflecting crosstalk-caused signal components. Filtering coefficients used by the first, second, and third filters are updated in response to the error signal so that the error signal can converge on "0" or crosstalk-caused components can be completely removed from the readout sample sequence. The updating of the filtering coefficients in response to the error signal is based on an LMS (least-mean-square) adaptive algorithm.

In the apparatus of Japanese application 9-320200, since only zero-cross samples are used in generating the error signal, the rate of the convergence of the error signal on "0" tends to be low. The apparatus of Japanese application 9-320200 does not implement partial-response waveform equalization. Therefore, the apparatus of Japanese application 9-320200 can not use a viterbi decoding process in recovering original information from a reproduced signal.

An analog signal representative of digital information which is read out from an optical disc in a tangential push-pull method has a waveform of a differential type. Also, a signal read out from a hard disk or a magnetic tape has a differential-type waveform. A differential-waveform signal takes a continuous value near "0". Therefore, it is difficult for a zero-cross detection technique to sense a data change point in the differential-waveform signal. Accordingly, the apparatus of Japanese application 9-320200 can not properly operate on a differential-waveform signal.

SUMMARY OF THE INVENTION

It is an object of this invention to provide an information reproducing apparatus which can remove crosstalk-caused components from a readout signal having a differential-type waveform.

A first aspect of this invention provides an information reproducing apparatus comprising first means for reading a first signal from a first track of a recording medium; second means for reading a second signal from a second track of the recording medium, the second track neighboring the first track; a filter for filtering the second signal read by the second means into a filtering-resultant signal according to a controllable filtering characteristic; a first subtracter for subtracting the filtering-resultant signal from the first signal read by the first means to generate a subtraction-resultant signal; a peak detector for detecting whether or not a level represented by the first signal read by the first means peaks, and generating peak-point information representing a timing at which the level represented by the first signal peaks; a second subtracter for generating an error signal indicative of a difference between the subtraction-resultant signal and a prescribed reference signal at a timing equal to the timing represented by the peak-point information; and third means for controlling the filtering characteristic of the filter in response to the error signal generated by the second subtracter so as to minimize the error signal.

A second aspect of this invention provides an information reproducing apparatus comprising first means for reading a first signal of a run-length-limited code from a first track of a recording medium; second means for reading a second signal from a second track of the recording medium, the second track neighboring the first track; a transversal filter subjecting the first signal read by the first means to a partial-response waveform equalization to generate an equalization-resultant signal, the partial-response waveform equalization depending on tap coefficients; a controllable filter for filtering the second signal read by the second means into a filtering-resultant signal according to a controllable filtering characteristic; a first subtracter for subtracting the filtering-resultant signal from the equalization-resultant signal to generate a subtraction-resultant signal; third means for detecting whether or not one of (1) the first signal read by the first means and (2) the subtraction-resultant signal generated by the first subtracter corresponds to a peak point, and generating peak-point information in response to a result of said detecting; a temporary decision device for calculating a temporary decision value of the subtraction-resultant signal on the basis of a PR mode signal, an RLL mode signal, the peak-point information, and an actual value of the subtraction-resultant signal, the PR mode signal representing a type of the partial-response waveform equalization, the RLL mode signal representing a type of the run-length-limited code; a second subtracter for calculating a difference between the temporary decision value of the subtraction-resultant signal and the actual value thereof, and generating an error signal in response to the calculated difference; and fourth means for controlling the tap coefficients of the transversal filter and the filtering characteristic of the controllable filter in response to the error signal generated by the second subtracter so as to minimize the error signal.

A third aspect of this invention provides an information reproducing apparatus comprising first means for reading a first signal of a run-length-limited code from a first track of a recording medium; second means for reading a second signal from a second track of the recording medium, the second track neighboring the first track; a first A/D converter for converting the first signal read by the first means into a first digital signal; a second A/D converter for converting the second signal read by the second means into a second digital signal; third means for re-sampling the first digital signal generated by the first A/D converter to generate a first resampling-resultant signal; fourth means for generating a bit clock signal from the first digital signal generated by the first A/D converter; a first transversal filter subjecting the first re-sampling-resultant signal to a partial-response waveform equalization to generate an equalization-resultant signal, the partial-response waveform equalization depending on first tap coefficients; fifth means for re-sampling the second digital signal generated by the second A/D converter in response to the bit clock signal to generate a second re-sampling-resultant signal; a second transversal filter for filtering the second re-sampling-resultant signal into a pseudo crosstalk signal according to second tap coefficients, the pseudo crosstalk signal indicating a crosstalk between the first and second tracks; a first subtracter for subtracting the pseudo crosstalk signal from the equalization-resultant signal to generate a subtraction-resultant signal; sixth means for detecting whether or not one of (1) the first digital signal generated by the first A/D converter and (2) the subtraction-resultant signal generated by the first subtracter corresponds to a peak point, and generating peak-point information in response to a result of said detecting; a delay circuit responsive to the peak-point information generated by the fifth means for outputting at least three successive samples of the peak-point information; a temporary decision device for calculating a temporary decision value of the subtraction-resultant signal on the basis of a PR mode signal, an RLL mode signal, the successive samples of the peak-point information which are outputted from the delay circuit, and an actual value of the subtraction-resultant signal, the PR mode signal representing a type of the partial-response waveform equalization, the RLL mode signal representing a type of the run-length-limited code; a second subtracter for calculating a difference between the temporary decision value of the subtraction-resultant signal and the actual value thereof, and generating an error signal in response to the calculated difference; seventh means for controlling the first tap coefficients of the first transversal filter in response to the error signal generated by the second subtracter so as to minimize the error signal; and eighth means for controlling the second tap coefficients of the second transversal filter in response to the error signal generated by the second subtracter.

A fourth aspect of this invention is based on the third aspect thereof, and provides an information reproducing apparatus wherein at least one of the PR mode signal and the RLL mode signal remains fixed.

A fifth aspect of this invention is based on the third aspect thereof, and provides an information reproducing apparatus wherein the sixth means comprises means for detecting whether or not the subtraction-resultant signal generated by the first subtracter corresponds to a peak point, and generating peak-point information in response to a result of said detecting.

A sixth aspect of this invention is based on the second aspect thereof, and provides an information reproducing apparatus further comprising a phase-locked loop circuit for generating a system clock signal from the subtraction-resultant signal generated by the first subtracter, a delay circuit responsive to the peak-point information generated by the third means for outputting at least three successive samples of the peak-point information, and means provided in the temporary decision device for calculating the temporary decision value of the subtraction-resultant signal on the basis of the PR mode signal, the RLL mode signal, the successive samples of the peak-point information which are outputted from the delay circuit, and the actual value of the subtraction-resultant signal, wherein the third means is contained in the phase-locked loop circuit.

A seventh aspect of this invention is based on the second aspect thereof, and provides an information reproducing apparatus further comprising a phase-locked loop circuit for generating a system clock signal from the first signal read by the first means, a delay circuit responsive to the peak-point information generated by the third means for outputting at least three successive samples of the peak-point information, and means provided in the temporary decision device for calculating the temporary decision value of the subtraction-resultant signal on the basis of the PR mode signal, the RLL mode signal, the successive samples of the peak-point information which are outputted from the delay circuit, and the actual value of the subtraction-resultant signal.

An eighth aspect of this invention is based on the third aspect thereof, and provides an information reproducing apparatus wherein the type of the partial-response waveform equalization which is represented by the PR mode signal is expressed as PR (a, b, −b, −a), and the successive samples of the peak-point information are three successive samples, and wherein the temporary decision device comprises means for calculating a value P on the basis of the successive samples of the peak-point information, the value P being equal to a·G when at least one of the successive samples of the peak-point information except a central sample corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of the successive samples of the peak-point information corresponds to a peak point, where G denotes a gain factor.

A ninth aspect of this invention is based on the third aspect thereof, and provides an information reproducing apparatus wherein the type of the partial-response waveform equalization which is represented by the PR mode signal is expressed as PR (a, b, −b, −a), and the successive samples of the peak-point information are five successive samples, and wherein the temporary decision device comprises means for calculating a value P on the basis of the successive samples of the peak-point information, the value P being equal to a·G when at least one of second and fourth samples among the successive samples of the peak-point information corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of second, third, and fourth samples among the successive samples of the peak-point information corresponds to a peak point, where G denotes a gain factor.

A tenth aspect of this invention is based on the first aspect thereof, and provides an information reproducing apparatus wherein the first means comprises means for reading the first signal from the first track of the recording medium in a tangential push-pull method.

An eleventh aspect of this invention provides an information reproducing apparatus comprising first means for reading a first signal from a first track of a recording medium; second means for reading a second signal from a second track of the recording medium, the second track neighboring the first track; a filter for filtering the second signal read by the second means into a filtering-resultant signal according to a controllable filtering characteristic; a first subtracter for subtracting the filtering-resultant signal from the first signal read by the first means to generate a subtraction-resultant signal; a zero-cross detector for detecting whether or not a level represented by the first signal read by the first means crosses zero, and generating 0-point information representing a timing at which the level represented by the first signal crosses zero; a peak detector for detecting whether or not the level represented by the first signal read by the first means peaks, and generating peak-point information representing a timing at which the level represented by the first signal peaks; third means for selecting one of (1) the 0-point information generated by the zero-cross detector and (2) the peak-point information generated by the peak detector; a second subtracter for generating an error signal indicative of a difference between the subtraction-resultant signal and a prescribed reference signal at a timing equal to the timing represented by the information selected by the third means; and fourth means for controlling the filtering characteristic of the filter in response to the error signal generated by the second subtracter so as to minimize the error signal.

A twelfth aspect of this invention provides an information reproducing apparatus comprising first means for reading a first signal of a run-length-limited code from a first track of a recording medium; second means for reading a second signal from a second track of the recording medium, the second track neighboring the first track; a transversal filter subjecting the first signal read by the first means to a partial-response waveform equalization to generate an equalization-resultant signal, the partial-response waveform equalization depending on tap coefficients; a controllable filter for filtering the second signal read by the second means into a filtering-resultant signal according to a controllable filtering characteristic; a first subtracter for subtracting the filtering-resultant signal from the equalization-resultant signal to generate a subtraction-resultant signal; third means for detecting whether or not one of (1) the first signal read by the first means and (2) the subtraction-resultant signal generated by the first subtracter corresponds to a zero-cross point, and generating 0-point information in response to a result of said detecting; fourth means for detecting whether or not one of (1) the first signal read by the first means and (2) the subtraction-resultant signal generated by the first subtracter corresponds to a peak point, and generating peak-point information in response to a result of said detecting; fifth means for selecting one of (1) the 0-point information generated by the third means and (2) the peak-point information generated by the fourth means; a temporary decision device for calculating a temporary decision value of the subtraction-resultant signal on the basis of a PR mode signal, an RLL mode signal, the information selected by the fifth means, and an actual value of the subtraction-resultant signal, the PR mode signal representing a type of the partial-response waveform equalization, the RLL mode signal representing a type of the run-length-limited code; a second subtracter for calculating a difference between the temporary decision value of the subtraction-resultant signal and the actual value thereof, and generating an error signal in response to the calculated difference; and sixth means for controlling the tap coefficients of the transversal filter and the filtering characteristic of the controllable filter in response to the error signal generated by the second subtracter so as to minimize the error signal.

A thirteenth aspect of this invention provides an information reproducing apparatus comprising first means for reading a first signal of a run-length-limited code from a first track of a recording medium; second means for reading a second signal from a second track of the recording medium, the second track neighboring the first track; a first A/D converter for converting the first signal read by the first means into a first digital signal; a second A/D converter for converting the second signal read by the second means into a second digital signal; third means for re-sampling the first digital signal generated by the first A/D converter to generate a first re-sampling-resultant signal; fourth means for generating a bit clock signal from the first digital signal generated by the first A/D converter; a first transversal filter subjecting the first re-sampling-resultant signal to a partial-response waveform equalization to generate an equalization-resultant signal, the partial-response waveform equalization depending on first tap coefficients; fifth means for re-sampling the second digital signal generated by the second A/D converter in response to the bit clock signal to generate a second re-sampling-resultant signal; a second transversal filter for filtering the second re-sampling-resultant signal into a pseudo crosstalk signal according to second tap coefficients, the pseudo crosstalk signal indicating a crosstalk between the first and second tracks; a first subtracter for subtracting the pseudo crosstalk signal from the equalization-resultant signal to generate a subtraction-resultant signal; sixth means for detecting whether or not one of (1) the first digital signal generated by the first A/D converter and (2) the subtraction-resultant signal generated by the first subtracter corresponds to a zero-cross point, and generating 0-point information in response to a result of said detecting; seventh means for detecting whether or not one of (1) the first digital signal generated by the first A/D converter and (2) the subtraction-resultant signal generated by the first subtracter corresponds to a peak point, and generating peak-point information in response to a result of said detecting; eighth means for selecting one of (1) the 0-point information generated by the sixth means and the peak-point information generated by the seventh means; a delay circuit responsive to the information selected by the eighth means for outputting at least three successive samples of the information selected by the eighth means; a temporary decision device for calculating a temporary decision value of the subtraction-resultant signal on the basis of a PR mode signal, an RLL mode signal, the successive samples of the information which are outputted from the delay circuit, and an actual value of the subtraction-resultant signal, the PR mode signal representing a type of the partial-response waveform equalization, the RLL mode signal representing a type of the run-length-limited code; a second subtracter for calculating a difference between the temporary decision value of the subtraction-resultant signal and the actual value thereof, and generating an error signal in response to the calculated difference; ninth means for controlling the first tap coefficients of the first transversal filter in response to the error signal generated by the second subtracter so as to minimize the error signal; and tenth means for controlling the second tap coefficients of the second transversal filter in response to the error signal generated by the second subtracter.

A fourteenth aspect of this invention is based on the thirteenth aspect thereof, and provides an information reproducing apparatus wherein at least one of the PR mode signal and the RLL mode signal remains fixed.

A fifteenth aspect of this invention is based on the thirteenth aspect thereof, and provides an information reproducing apparatus wherein the sixth means comprises means for detecting whether or not the subtraction-resultant signal generated by the first subtracter corresponds to a zero-cross point, and generating 0-point information in response to a result of said detecting, and the seventh means comprises means for detecting whether or not the subtraction-resultant signal generated by the first subtracter corresponds to a peak point, and generating peak-point information in response to a result of said detecting.

A sixteenth aspect of this invention is based on the twelfth aspect thereof, and provides an information reproducing apparatus further comprising a phase-locked loop circuit for generating a system clock signal from the subtraction-resultant signal generated by the first subtracter, a delay circuit responsive to the information selected by the fifth means for outputting at least three successive samples of the information selected by the fifth means, and means provided in the temporary decision device for calculating the temporary decision value of the subtraction-resultant signal on the basis of the PR mode signal, the RLL mode signal, the successive samples of the information which are outputted from the delay circuit, and the actual value of the subtraction-resultant signal, wherein the third means and the fourth means are contained in the phase-locked loop circuit.

A seventeenth aspect of this invention is based on the twelfth aspect thereof, and provides an information reproducing apparatus further comprising a phase-locked loop circuit for generating a system clock signal from the first signal read by the first means, a delay circuit responsive to the information selected by the fifth means for outputting at least three successive samples of the information selected by the fifth means, and means provided in the temporary decision device for calculating the temporary decision value of the subtraction-resultant signal on the basis of the PR mode signal, the RLL mode signal, the successive samples of the information which are outputted from the delay circuit, and the actual value of the subtraction-resultant signal.

An eighteenth aspect of this invention is based on the twelfth aspect thereof, and provides an information reproducing apparatus further comprising seventh means for changing the partial-response waveform equalization by the transversal filter between PR (a, b, b, a) equalization and PR (a, b, −b, −a) equalization.

A nineteenth aspect of this invention is based on the eleventh aspect thereof, and provides an information reproducing apparatus wherein the first means comprises means for reading the first signal from the first track of the recording medium in a tangential push-pull method.

A twentieth aspect of this invention provides an information reproducing apparatus comprising first means for reading a first signal from a first track of a recording medium; second means for reading a second signal from a second track of the recording medium, the second track neighboring the first track; a filter for filtering the second signal read by the second means into a filtering-resultant signal according to a controllable filtering characteristic; a first subtracter for subtracting the filtering-resultant signal from the first signal read by the first means to generate a subtraction-resultant signal; a peak detector for detecting whether or not a level represented by the first signal read by the first means peaks, and generating peak-point information representing a timing at which the level represented by the first signal peaks; a temporary decision circuit for implementing a temporary decision about the subtraction-resultant signal generated by the first subtracter, and generating a temporary decision result signal representing a result of the temporary decision; a second subtracter for generating an error signal indicative of a difference between the subtraction-resultant signal and the temporary decision result signal at a timing equal to the timing represented by the peak-point information; and third means for controlling the filtering characteristic of the filter in response to the error signal generated by the second subtracter so as to minimize the error signal.

A twenty-first aspect of this invention provides an information reproducing apparatus comprising first means for reading a first signal from a first track of a recording medium; second means for reading a second signal from a second track of the recording medium, the second track neighboring the first track; a filter for filtering the second signal read by the second means into a filtering-resultant signal according to a controllable filtering characteristic; a first subtracter for subtracting the filtering-resultant signal from the first signal read by the first means to generate a subtraction-resultant signal; a zero-cross detector for detecting whether or not a level represented by the first signal read by the first means crosses zero, and generating 0-point information representing a timing at which the level represented by the first signal crosses zero; a peak detector for detecting whether or not the level represented by the first signal read by the first means peaks, and generating peak-point information representing a timing at which the level represented by the first signal peaks; third means for selecting one of (1) the 0-point information generated by the zero-cross detector and (2) the peak-point information generated by the peak detector; a temporary decision circuit for implementing a temporary decision about the subtraction-resultant signal generated by the first subtracter, and generating a temporary decision result signal representing a result of the temporary decision; a second subtracter for generating an error signal indicative of a difference between the subtraction-resultant signal and the temporary decision result signal at a timing equal to the timing represented by the information selected by the third means; and fourth means for controlling the filtering characteristic of the filter in response to the error signal generated by the second subtracter so as to minimize the error signal.

BRIEF DESCRIPTION OF THE DRAWINGS

FIG. 3 is a diagram of tracks on an optical disc, and beam spots formed thereon.

FIG. 4 is a block diagram of a re-sampling DPLL section in FIG. 1.

FIG. 10 is a diagram of the relation between PR (a, b, −b, −a) characteristics and temporary decision result values for RLL (2, X).

FIG. 38 is a diagram of the relation among PR (a, b, b, a) characteristics, RLL modes, and temporary decision result values.

DETAILED DESCRIPTION OF THE INVENTION

First Embodiment

Figure 1:
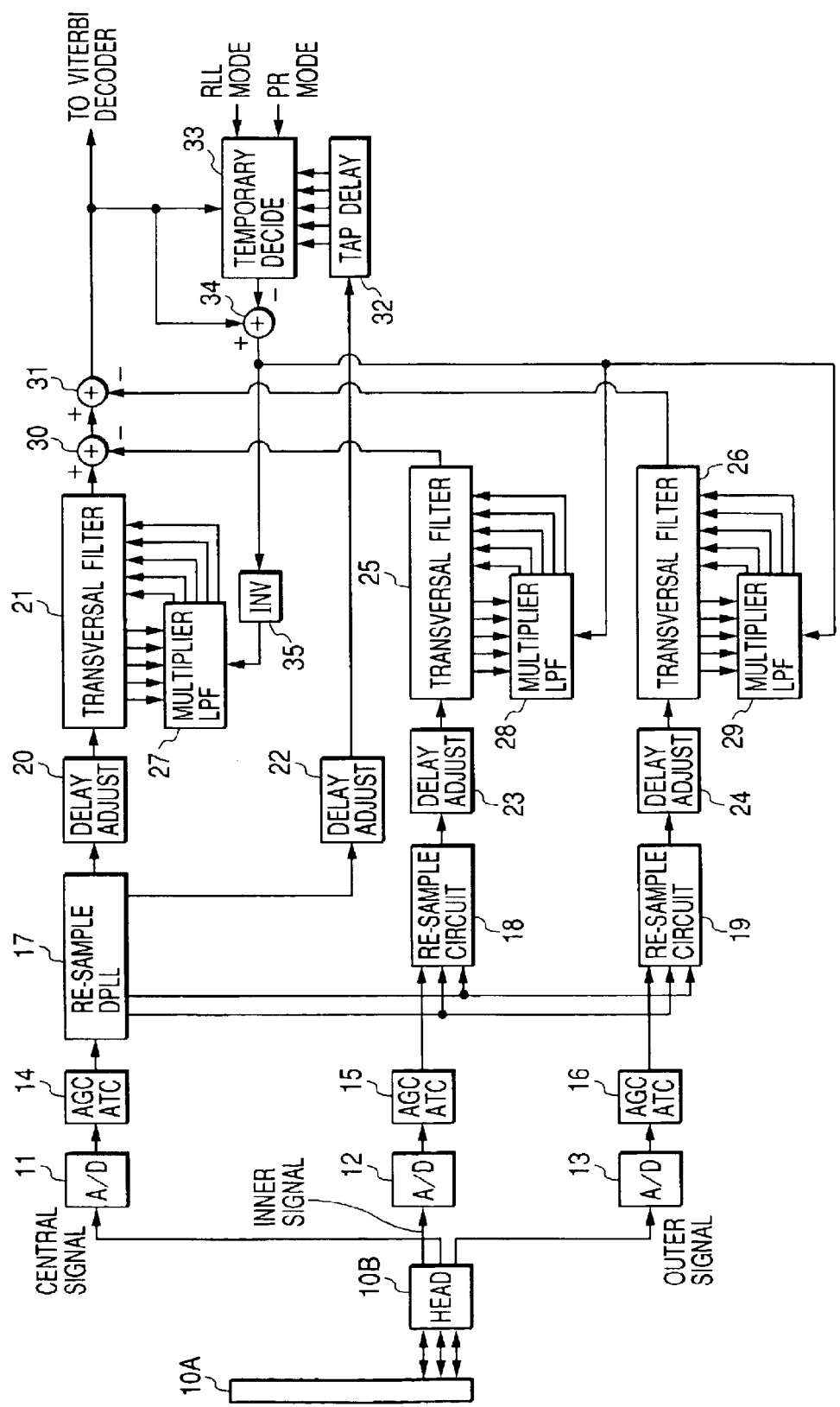
FIG. 1 is a block diagram of an information reproducing apparatus according to a first embodiment of this invention.
Figure 2:
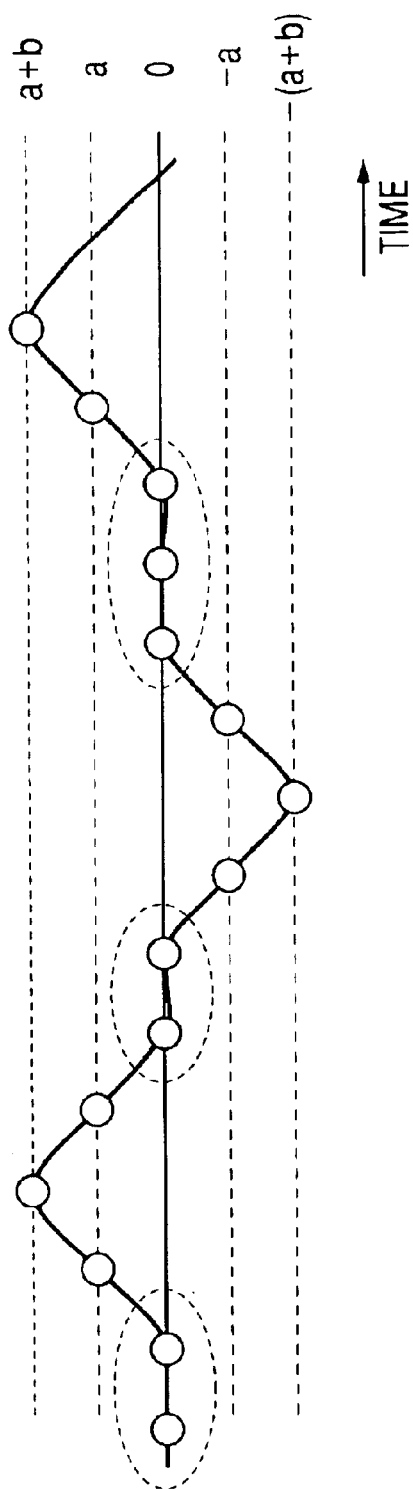
FIG. 2 is a time-domain diagram showing an example of the differential-type waveform of a readout signal.

FIG. 1 shows an information reproducing apparatus according to a first embodiment of this invention. With reference to FIG. 1, an optical disc 10A stores a signal of a run-length-limited code at a predetermined high recording density. The optical disc 10A is rotated by a motor (not shown). The information reproducing apparatus includes an optical head 10B which reads out the signal of the run-length-limited code from the optical disc 10A in a 3-beam-based tangential push-pull method (a 3-beam-based TPP method). The readout signal generated by the optical head 10B has a differential-type waveform such as shown in FIG. 2.

Specifically, the optical head 10B applies three forward laser beams to three neighboring tracks on the optical disc 10A, respectively. The three forward laser beams are reflected by the optical disc 10A before returning to the optical head 10B. The optical head 10B converts the three return laser beams into three readout signals respectively.

As shown in FIG. 3, the optical disc 10A has tracks Ti (i=1, 2, 3, . . . ) sequentially arranged in the radially outward direction of the disc. The three forward laser beams form spots B0, B1, and B2 on the optical disc 10A, respectively. When the beam spot B0 is located on a track Ti, the beam spots B1 and B2 are located on racks Ti−1 and Ti+1 immediately inward and outward of the track Ti respectively. The beam spots B0, B1, and B2 are called the central beam spot, the inner beam spot, and the outer beam spot, respectively. The track Ti scanned by the central beam spot B0 is the track of interest. The inner beam spot B1 follows the central beam spot B0 as viewed in the direction of rotation of the optical disc 10A. The outer beam spot B2 precedes the central beam spot B0 as viewed in the direction of rotation of the optical disc 10A.

With reference back to FIG. 1, the three forward laser beams are reflected by the optical disc 10A before returning to the optical head 10B. The optical head 10B converts the three return laser beams into three readout signals respectively. The readout signal corresponding to the central beam spot B0 and the track Ti of interest is called the central readout signal. The readout signal corresponding to the inner beam spot B1 and the track Ti−1 immediately inward of the track Ti of interest is called the inner readout signal. The readout signal corresponding to the outer beam spot B2 and the track Ti+1 immediately outward of the track Ti of interest is called the outer readout signal. The central readout signal is fed from the optical head 10B to an A/D (analog-to-digital) converter 11. The inner readout signal is fed from the optical head 10B to an A/D converter 12. The outer readout signal is fed from the optical head 10B to an A/D converter 13.

The A/D converter 11 changes the central readout signal into a corresponding digital signal. Specifically, the A/D converter 11 periodically samples the central readout signal in response to a master clock signal (a system clock signal), and converts every resultant sample into a digital sample. The A/D converter 11 outputs the resultant sequence of digital samples to a digital AGC/ATC (automatic gain control/automatic threshold control) circuit 14.

The A/D converter 12 changes the inner readout signal into a corresponding digital signal. Specifically, the A/D converter 12 periodically samples the inner readout signal in response to the master clock signal, and converts every resultant sample into a digital sample. The A/D converter 12 outputs the resultant sequence of digital samples to a digital AGC/ATC circuit 15.

The A/D converter 13 changes the outer readout signal into a corresponding digital signal. Specifically, the A/D converter 13 periodically samples the outer readout signal in response to the master clock signal, and converts every resultant sample into a digital sample. The A/D converter 13 outputs the resultant sequence of digital samples to a digital AGC/ATC circuit 16.

The AGC/ATC circuit 14 subjects the output signal of the A/D converter 11 to automatic gain control for providing a constant signal amplitude and also automatic threshold control, that is, DC (direct current) control of a threshold value for a two-value comparing process, on a digital basis. The AGC/ATC circuit 14 outputs the resultant digital signal to a re-sampling DPLL section 17. The output signal of the AGC/ATC circuit 14 is called the first central digital signal.

The AGC/ATC circuit 15 subjects the output signal of the A/D converter 12 to automatic gain control and also automatic threshold control (DC control) on a digital basis. The AGC/ATC circuit 15 outputs the resultant digital signal to a re-sampling circuit 18. The output signal of the AGC/ATC circuit 15 is called the first inner digital signal.

The AGC/ATC circuit 16 subjects the output signal of the A/D converter 13 to automatic gain control and also automatic threshold control (DC control) on a digital basis. The AGC/ATC circuit 16 outputs the resultant digital signal to a re-sampling circuit 19. The output signal of the AGC/ATC circuit 16 is called the first outer digital signal.

The re-sampling DPLL section 17 converts the output signal of the AGC/ATC circuit 14 (the first central digital signal) into a second central digital signal by a re-sampling process. A timing related to samples of the output signal of the AGC/ATC circuit 14 (the first central digital signal) is determined by the system clock signal. A timing related to samples of the second central digital signal is determined by a bit clock signal. During the re-sampling process, the re-sampling DPLL section 17 generates samples of the second central digital signal from samples of the first central digital signal through at least one of interpolation and decimation.

The re-sampling DPLL section 17 includes a digital PLL (phase locked loop) circuit having a closed loop. The digital PLL circuit in the re-sampling DPLL section 17 generates a second central digital signal on the basis of the output signal of the AGC/ATC circuit 14. The second central digital signal relates to a sampling frequency equal to a bit clock frequency. Specifically, samples of the second central digital signal are generated from samples of the output signal of the AGC/ATC circuit 14 through a PLL re-sampling process based on at least one of interpolation and decimation. The second central digital signal is fed from the re-sampling DPLL section 17 to a transversal filter 21 via a delay adjuster 20 which provides a suitable signal delay.

The re-sampling DPLL section 17 includes a peak detector for sensing every sample point (every peak sample point) at which the level represented by the second central digital signal (the re-sampling-resultant signal) peaks in a positive side or a negative side. The peak detector generates peak-point information representative of every sensed sample point. Specifically, the peak detector decides whether or not every sample of the second central digital signal corresponds to a positive or negative peak. Here, "negative peak" means "valley". The result of the decision is used in generating the peak-point information. In the re-sampling DPLL section 17, the timing of the re-sampling or the frequency and phase of the re-sampling are locked so that the levels represented by positive-peak-point-corresponding samples of the second digital signal will be maximized and the levels represented by negative-peak-point-corresponding samples of the second digital signal will be minimized. The peak-point information is fed from the re-sampling DPLL section 17 to a tap delay circuit 32 via a delay adjuster 22 which provides a suitable signal delay.

The re-sampling DPLL section 17 includes a circuit for generating the bit clock signal, and also a circuit for generating a signal (a parameter signal) indicative of a parameter T_ratio equal to an internal division ratio related to re-sampling. In general, the bit clock signal is a punctured clock signal. The re-sampling DPLL section 17 outputs the bit clock signal and the parameter signal to the re-sampling circuits 18 and 19.

The re-sampling circuit 18 converts the output signal of the AGC/ATC circuit 15 (the first inner digital signal) into a second inner digital signal by a re-sampling process responsive to the bit clock signal and dependent on the parameter T_ratio indicated by the parameter signal. The bit clock signal is used as a re-sampling clock signal. The rate of re-sampling is determined by the parameter T_ratio. The second inner digital signal is fed from the re-sampling circuit 18 to a transversal filter 25 via a delay adjuster 23 which provides a suitable signal delay.

The re-sampling circuit 19 converts the output signal of the AGC/ATC circuit 16 (the first outer digital signal) into a second outer digital signal by a re-sampling process responsive to the bit clock signal and dependent on the parameter T_ratio indicated by the parameter signal. The bit clock signal is used as a re-sampling clock signal. The rate of re-sampling is determined by the parameter T_ratio. The second outer digital signal is fed from the re-sampling circuit 19 to a transversal filter 26 via a delay adjuster 24 which provides a suitable signal delay.

As shown in FIG. 4, the re-sampling DPLL section 17 includes an interpolator 17A, a phase detector 17B, a loop filter 17C, and a timing signal generator 17D which are connected in a closed loop in that order. The interpolator 17A receives the output signal of the AGC/ATC circuit 14. The interpolator 17A receives data point phase information and the bit clock signal from the timing signal generator 17D. The interpolator 17A estimates phase-point data samples of the second central digital signal from samples of the output signal of the AGC/ATC circuit 14 through interpolation responsive to the data point phase information and the bit clock signal. Here, "phase" is defined relative to the bit clock signal. The sample estimation by the interpolator 17A corresponds to re-sampling. The interpolator 17A outputs the estimated phase-point data samples to the phase detector 17B and also the delay adjuster 20 (see FIG. 1) as the second central digital signal. The second central digital signal is transmitted via the delay adjuster 20 to the transversal filter 21 (see FIG. 1).

In the re-sampling DPLL section 17, the phase detector 17B includes a peak detector for sensing peak sample points from the phase-point data samples of the second central digital signal. Specifically, the peak detector calculates the slope (differential) of the level represented by the second central digital signal on the basis of two successive samples thereof. The peak detector senses every inversion of the polarity of the calculated slope. The peak detector senses a sample point immediately preceding the sample point corresponding to the sensed polarity inversion. The peak detector sets a peak-point information value PK to "1" for the sensed sample point. The peak detector sets the peak-point information value PK to "0" for the other sample points. Thus, the peak detector generates peak-point information representing the value PK. The peak detector in the phase detector 17B outputs the peak-point information to the delay adjuster 22 (see FIG. 1). The peak-point information is transmitted via the delay adjuster 22 to the tap delay circuit 32 (see FIG. 1).

In the re-sampling DPLL section 17, the phase detector 17B detects a phase error as follows. The phase detector 17B refers to a sample of the second central digital signal which corresponds to each of the sensed peak sample points. The phase detector 17B also refers to samples of the second central digital signal which immediately precede and follow each sensed peak-corresponding sample respectively. The phase detector 17B calculates the difference between the levels represented by samples of the second central digital signal which immediately precede and follow each sensed peak-corresponding sample respectively. The calculated difference is used as a detected phase error. The phase detector 17B generates a signal representing the detected phase error. The phase detector 17B outputs the phase error signal to the loop filter 17C. The loop filter 17C integrates the phase error signal. The loop filter 17C outputs the integration-resultant signal to the timing signal generator 17D. The timing signal generator 17D produces the data point phase information and the bit clock signal in response to the output signal of the loop filter 17C. Thus, the data point phase information and the bit clock signal are controlled in response to the phase error signal. This control is designed to implement frequency and phase lock. Specifically, the frequency and phase of the re-sampling by the interpolator 17A are locked so as to nullify or minimize the detected phase error. Accordingly, the levels represented by positive-peak-point-corresponding samples of the second central digital signal can be maximized while the levels represented by negative-peak-point-corresponding samples of the second central digital signal can be minimized.

In the re-sampling DPLL section 17, the timing signal generator 17D produces the signal (the parameter signal) indicative of the parameter T_ratio on the basis of the data point phase information. The timing signal generator 17D may use the data point phase information as the parameter signal. The timing signal generator 17D outputs the parameter signal and the bit clock signal to the re-sampling circuits 18 and 19 (see FIG. 1).

The interpolator 17A may generate the bit clock signal in response to the data point phase information fed from the timing signal generator 17D. In this case, the interpolator 17A outputs the bit clock signal to the re-sampling circuits 18 and 19 (see FIG. 1).

With reference back to FIG. 1, an adaptive equalization circuit including the transversal filter 21 subjects the output signal of the delay adjuster 20 to automatic waveform equalization in response to the peak-point information outputted from the delay adjuster 22. The automatic waveform equalization corresponds to a process of providing the signal in question with a partial-response (PR) characteristic. The adaptive equalization circuit outputs the equalization-resultant signal to a viterbi decoder (not shown). The viterbi decoder recovers original data from the output signal of the adaptive equalization circuit.

The transversal filter 21 which follows the delay adjuster 20 is connected to a multiplier and LPF section 27 and a subtracter 30. The subtracter 30 is connected to the transversal filter 25 and a subtracter 31. The subtracter 31 is connected to the transversal filter 26, the viterbi decoder (not shown), a temporary decision circuit 33, and a subtracter 34. The temporary decision circuit 33 is connected to the tap delay circuit 32 and the subtracter 34. The tap delay circuit 32 follows the delay adjuster 22. The subtracter 34 is connected to an inverter 35. The inverter 35 is connected to the multiplier and LPF section 27. The devices 21, 27, 30, 31, 32, 33, 34, and 35 compose the adaptive equalization circuit.

The transversal filter 21 subjects the output signal of the delay adjuster 20 (that is, the second central digital signal) to PR waveform equalization responsive to tap coefficients. The PR waveform equalization is designed to suppress unwanted signal components caused by intersymbol interferences. The multiplier and LPF section 27 varies and updates the tap coefficients in response to the output signal of the inverter 35. The transversal filter 21 outputs the equalization-resultant signal to the subtracter 30. The subtracter 30 receives the output signal of the transversal filter 25. The device 30 subtracts the output signal of the transversal filter 25 from the equalization-resultant signal to remove crosstalk-caused signal components. The subtracter 30 outputs the subtraction-resultant signal to the subtracter 31. The subtracter 31 receives the output signal of the transversal filter 26. The device 31 subtracts the output signal of the transversal filter 26 from the output signal of the subtracter 30 to remove crosstalk-caused signal components. The subtracter 31 outputs the subtraction-resultant signal to the viterbi decoder (not shown), the temporary decision circuit 33, and the subtracter 34.

The tap delay circuit 32 defers or delays the peak-point information by a plurality of different time intervals, and thereby converts the peak-point information into different tap delayed signals. The tap delay circuit 32 includes a cascade or series combination of 1-sample delay elements through which the peak-point information is passed. The tap delayed signals appear at taps between the 1-sample delay elements. The tap delay circuit 32 outputs the tap delayed signals to the temporary decision circuit 33. Specifically, the tap delayed signals represent five successive samples of the peak-point information.

The temporary decision circuit 33 receives the output signal of the subtracter 31. The temporary decision circuit 33 receives the tap delayed signals from the tap delay circuit 32. The temporary decision circuit 33 receives a PR (partial-response) mode signal and an RLL (run-length-limited) mode signal from suitable devices not shown in the drawing. The temporary decision circuit 33 includes a logic circuit which is designed to implement a temporary decision about the output signal of the subtracter 31 in response to the received signals according to a predetermined algorithm. The temporary decision circuit 33 may include programmable signal processor. In this case, the predetermined algorithm is given as a program for controlling the signal processor. The temporary decision circuit 33 generates a signal representing the result of the temporary decision. The temporary decision circuit 33 outputs the temporary decision result signal to the subtracter 34. The subtracter 34 receives the output signal of the subtracter 31. The device 34 subtracts the temporary decision result signal from the output signal of the subtracter 31, thereby generating an error signal (an amplitude error signal) corresponding to the difference therebetween. The subtracter 34 outputs the error signal to the inverter 35. The device 35 inverts the error signal in polarity. The inverter 35 causes negative feedback. The inverter 35 outputs the inversion-resultant error signal to the multiplier and LPF section 27.

Figure 5:
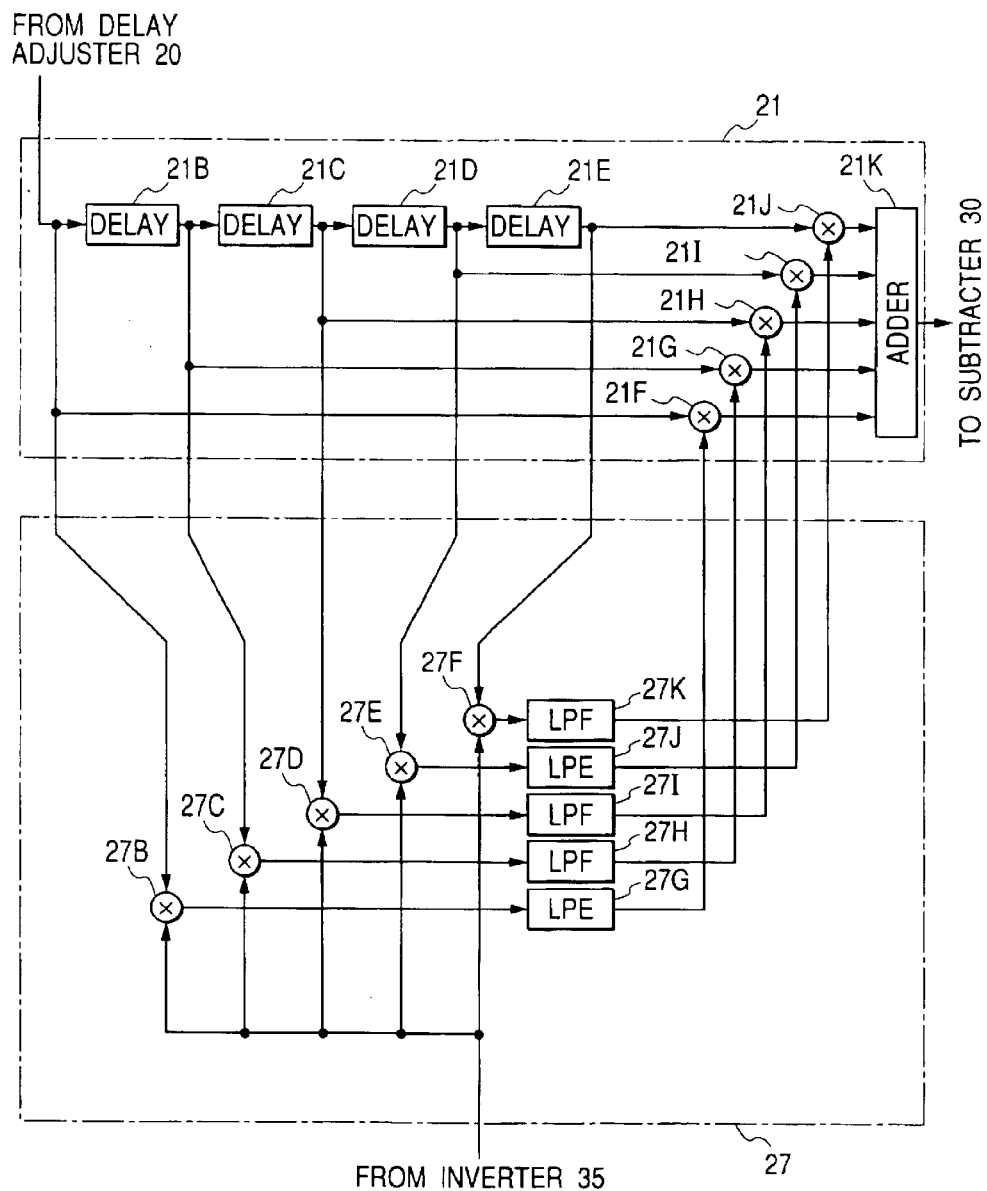
FIG. 5 is a block diagram of a transversal filter and a multiplier and LPF section in FIG. 1.

As shown in FIG. 5, the transversal filter 21 includes delay circuits 21B, 21C, 21D, and 21E, multipliers 21F, 21G, 21H, 21I, and 21J, and an adder 21K.

The delay circuits 21B, 21C, 21D, and 21E are connected in cascade in that order. The input terminal of the delay circuit 21B is subjected to the output signal of the delay adjuster 20 (that is, the second central digital signal). Also, a first input terminal of the multiplier 21F is subjected to the output signal of the delay adjuster 20. The input terminal of the delay circuit 21B is connected to the multiplier and LPF section 27 as a first tap in the transversal filter 21. The output terminals of the delay circuits 21B, 21C, 21D, and 21E form second, third, fourth, and fifth taps in the transversal filter 21, respectively. The output terminals of the delay circuits 21B, 21C, 21D, and 21E are connected to the multiplier and LPF section 27. Also, the output terminals of the delay circuits 21B, 21C, 21D, and 21E are connected to first input terminals of the multipliers 21G, 21H, 21I, and 21J, respectively. Second input terminals of the multipliers 21F, 21G, 21H, 21I, and 21J are connected to the multiplier and LPF section 27. The output terminals of the multipliers 21F, 21G, 21H, 21I, and 21J are connected to input terminals of the adder 21K. The output terminal of the adder 21K is connected to the subtracter 30.

As shown in FIG. 5, the multiplier and LPF section 27 includes multipliers 27B, 27C, 27D, 27E, and 27F, and low pass filters 27G, 27H, 27I, 27J, and 27K.

A first input terminal of the multiplier 27B is connected to the input terminal of the delay circuit 21B within the transversal filter 21, that is, the first tap within the transversal filter 21. Thus, the first input terminal of the multiplier 27B is subjected to the output signal of the delay adjuster 20 (that is, the second central digital signal). First input terminals of the multipliers 27C, 27D, 27E, and 27F are connected to the output terminals of the delay circuits 21B, 21C, 21D, and 21E within the transversal filter 21, respectively. In other words, the first input terminals of the multipliers 27C, 27D, 27E, and 27F are connected to the second, third, fourth, and fifth taps within the transversal filter 21, respectively. Second input terminals of the multipliers 27B, 27C, 27D, 27E, and 27F are connected to the output terminal of the inverter 35. The output terminals of the multipliers 27B, 27C, 27D, 27E, and 27F are connected to the input terminals of the low pass filters 27G, 27H, 27I, 27J, and 27K, respectively. The output terminals of the low pass filters 27G, 27H, 27I, 27J, and 27K are connected to the second input terminals of the multipliers 21F, 21G, 21H, 21I, and 21J within the transversal filter 21, respectively.

In the transversal filter 21, the output signal from the delay adjuster 20 (the second central digital signal) successively passes through the delay circuits 21B, 21C, 21D, and 21E while being deferred or delayed thereby. Each of the delay circuits 21B, 21C, 21D, and 21E provides a predetermined delay corresponding to a 1-sample interval (a 1-bit-corresponding interval). The output signal from the delay adjuster 20 (the second central digital signal) is also applied to the multiplier 21F. The output signals of the delay circuits 21B, 21C, 21D, and 21E are applied to the multipliers 21G, 21H, 21I, and 21J, respectively. The multipliers 21F, 21G, 21H, 21I, and 21J receive output signals of the multiplier and LPF section 27 which represent tap coefficients respectively. The tap coefficients correspond to waveform equalization coefficients. The device 21F multiplies the output signal from the delay adjuster 20 (the second central digital signal) and the related tap coefficient, and outputs the multiplication-resultant signal to the adder 21K. The device 21G multiplies the output signal of the delay circuit 21B and the related tap coefficient, and outputs the multiplication-resultant signal to the adder 21K. The device 21H multiplies the output signal of the delay circuit 21C and the related tap coefficient, and outputs the multiplication-resultant signal to the adder 21K. The device 21I multiplies the output signal of the delay circuit 21D and the related tap coefficient, and outputs the multiplication-resultant signal to the adder 21K. The device 21J multiplies the output signal of the delay circuit 21E and the related tap coefficient, and outputs the multiplication-resultant signal to the adder 21K. The device 21K adds up the output signals of the multipliers 21F, 21G, 21H, 21I, and 21J into the equalization-resultant signal.

As previously mentioned, the multipliers 27B, 27C, 27D, 27E, and 27F in the multiplier and LPF section 27 receive the output signal of the inverter 35. The output signal of the inverter 35 is the inversion of the error signal generated by the subtracter 34 which indicates an amplitude error related to the output signal of the subtracter 31. The input signal to the device 21B and the output signals from the devices 21B, 21C, 21D, and 21E within the transversal filter 21 are applied to the multipliers 27B, 27C, 27D, 27E, and 27F within the multiplier and LPF section 27 as tap output signals, respectively. The devices 27B, 27C, 27D, 27E, and 27F multiply the respective tap output signals of the transversal filter 21 by the amplitude error signal fed from the inverter 35. The multipliers 27B, 27C, 27D, 27E, and 27F output the multiplication-resultant signals to the low pass filters 27G, 27H, 27I, 27J, and 27K, respectively. The low pass filters 27G, 27H, 27I, 27J, and 27K remove high-frequency components from the output signals of the multipliers 27B, 27C, 27D, 27E, and 27F, and thereby process the output signals of the multipliers 27B, 27C, 27D, 27E, and 27F into signals representing the tap coefficients, respectively. The low pass filters 27G, 27H, 27I, 27J, and 27K output the tap coefficient signals to the multipliers 21F, 21G, 21H, 21I, and 21J within the transversal filter 21, respectively. The tap coefficients represented by the output signals of the low pass filters 27G, 27H, 27I, 27J, and 27K cause the equalization by the transversal filter 21 to nullify or minimize the error signal generated by the subtracter 34. In this way, the tap coefficients used by the transversal filter 21 are controlled on a feedback basis to nullify or minimize the error signal generated by the subtracter 34.

The transversal filter 21, the multiplier and LPF section 27, the subtracters 30, 31, and 34, the tap delay circuit 32, the temporary decision circuit 33, and the inverter 35 compose a feedback loop which operates on the basis of an LMS (least-square-method) algorithm. The temporary decision circuit 33 implements a temporary decision to set a convergence target. The temporary decision is premised on partial-response equalization.

Figure 6:
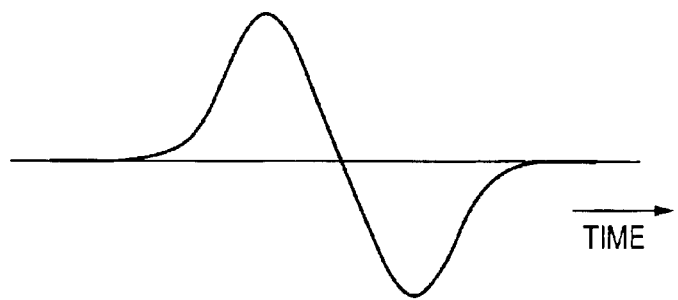
FIG. 6 is a time-domain diagram of an example of a differential-type isolated waveform.
Figure 7:
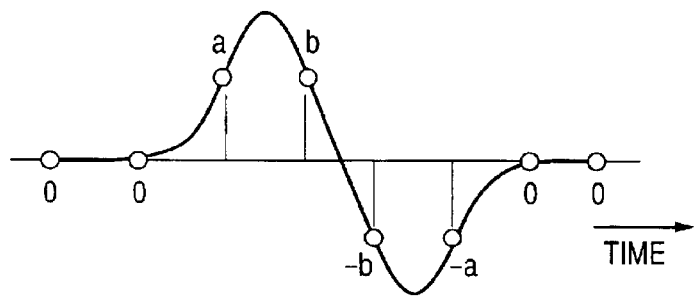
FIG. 7 is a time-domain diagram of a waveform (an equalization-resultant waveform) which results from equalization of the differential-type isolated waveform in FIG. 6.
Figure 8:
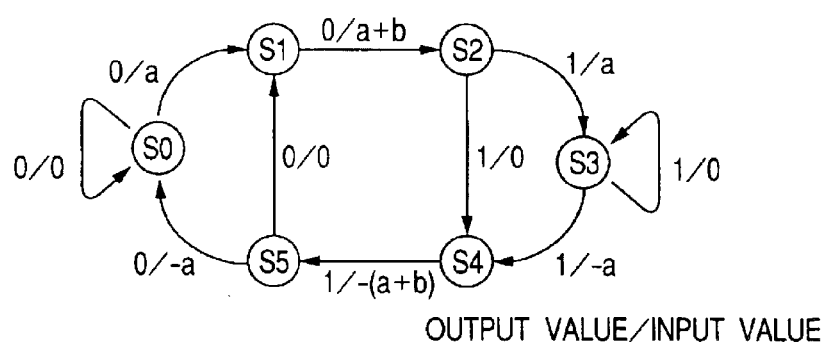
FIG. 8 is a diagram of signal state transitions regarding a partial-response (PR) characteristic and a run-length-limited (RLL) code corresponding to PR (a, b, −b, −a) and RLL (1, X) respectively.

Partial-response (PR) characteristics will be explained below. When a differential-type isolated waveform in FIG. 6 is subjected to equalization accorded with the characteristic of PR (a, b, −b, −a), the equalization-resultant waveform in FIG. 7 is provided. A waveform resulting from the PR (a, b, −b, −a) equalization of a continuous waveform takes one of five different values, that is, "−(a+b)", "−a", "0", "a", and "a+b". It is assumed that the 5-value signal of the (1, X) run-length-limited code is inputted into a viterbi decoder. Here, the (1, X) run-length-limited code is prescribed by run-length limiting rules such that the minimum transition interval is equal to "2", and the maximum transition interval is equal to a given value X depending on the modulation format. The (1, X) run-length-limited code is also denoted as RLL (1, X). The state of a current sample of an original signal (an input value) and the state of a current sample of a reproduced signal (an output value) resulting from PR equalization are restricted by the states of previous samples. In the input signal, two successive samples of "1" will not occur. FIG. 8 shows signal state transitions available in this case.

In FIG. 8, S0, S1, S2, S3, S4, and S5 denote signal states determined by immediately-preceding output values. Transitions from the state S2 will be taken as an example. When the input value is "a", the output value becomes "1" and a transition to the state S3 from the state S2 occurs. When the input value is "0", the output value becomes "1" and a transition to the state S4 from the state S2 occurs. Under normal conditions, regarding the state S2, the input value different from "a" and "0" does not occur. Thus, the input value different from "a" and "0" is an error.

Figure 9:
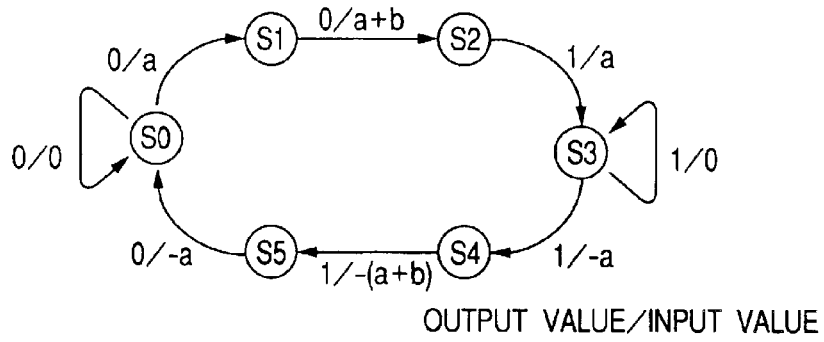
FIG. 9 is a diagram of signal state transitions regarding a partial-response (PR) characteristic and a run-length-limited (RLL) code corresponding to PR (a, b, −b, −a) and RLL (2, X) respectively.

FIG. 9 shows signal state transitions available in the case of a (2, X) run-length-limited code rather than the (1, X) run-length-limited code. Here, the (2, X) run-length-limited code is prescribed by run-length limiting rules such that the minimum transition interval is equal to "3", and the maximum transition interval is equal to a given value X depending on the modulation format. The (2, X) run-length-limited code is also denoted as RLL (2, X). The signal state transitions in FIG. 9 include neither a transition from the state S5 to the state S1 nor a transition from the state S2 to the state S4.

FIG. 10 shows the relation between the PR mode and the decision result value outputted from the temporary decision circuit 33 which occurs when the RLL mode (the run-length-limited mode) corresponds to RLL (2, X). The RLL mode is represented by the RLL mode signal inputted into the temporary decision circuit 33. The PR mode is represented by the PR mode signal inputted into the temporary decision circuit 33. The PR mode indicates the type of the PR waveform equalization implemented by the adaptive equalization circuit including the transversal filter 21. The PR mode can be changed among identification numbers "1", "2", "3", "4", "5", and "6" assigned to PR (1, −1), PR (1, 1, −1, −1), PR (1, 2, −2, −1), PR (1, 3, −3, −1), PR (2, 3, −3, −2), and PR (3, 4, −4, −3) respectively. Here, PR (1, −1) is known as PR4 (partial response class IV) while PR (1, 1, −1, −1) is known as EPR4 (extended partial response class IV).

The waveform resulting from the PR(a, b, −b, −a) equalization takes one of five different values "−(a+b)", "−a", "0", "a", and "a+b". In FIG. 10, the decision result values outputted from the temporary decision circuit 33 in correspondence with these values "−(a+b)", "−a", "0", "a", and "a+b" are listed for PR (1, −1), PR (1, 1, −1, −1), PR (1, 2, −2, −1), PR (1, 3, −3, −1), PR (2, 3, −3, −2), and PR (3, 4, −4, −3).

In FIG. 10, PR (1, −1) means PR (a, b, −b, −a) in which a=0 and b=1. The gain or gain factor G is a multiplication coefficient A/(a+b) for normalizing the maximum (a+b) of the absolute decision result value, where "A" denotes an arbitrary level.

With reference back to FIG. 1, the equalization-resultant signal inputted into the temporary decision circuit 33 from the subtracter 31 is handled as a signal D3 occurring at the present moment. The present-moment signal D3 is also applied to the subtracter 34. The peak-point information is fed from the re-sampling DPLL section 17 to the tap delay circuit 32 via the delay adjuster 22. The tap delay circuit 32 defers or delays the peak-point information by a plurality of different time intervals, and thereby converts the peak-point information into different tap delayed signals. The tap delay circuit 32 outputs the tap delayed signals to the temporary decision circuit 33. The temporary decision circuit 33 implements a temporary decision to set a convergence target according to a predetermined algorithm. The temporary decision is premised on partial-response equalization. The temporary decision circuit 33 generates a signal representing the result of the temporary decision. The temporary decision circuit 33 outputs the temporary decision result signal to the subtracter 34. The subtracter 34 receives the present-moment signal D3. The device 34 subtracts the temporary decision result signal from the present-moment signal D3, thereby generating an error signal corresponding to the difference therebetween. The subtracter 34 outputs the error signal to the inverter 35.

The peak-point information whose value PK is "1" indicates a peak point. The peak-point information value PK being "1" corresponds to the value "a+b" or the value "−(a+b)" in FIGS. 8 and 9, and occurs in the transition from the state S1 to the state S2 or the transition from the state S4 to the state S5.

In FIGS. 8 and 9, the polarity of a peak can be decided by the polarity of a corresponding sample point. In the case where the interval from one peak point to the next peak point is known, or in the case where the number of transitions occurring for the interval from the state S2 to the state S5 or the interval from the state S5 to the state S2 is known, the path is settled and hence values to be taken at respective sample points are definite.

In FIGS. 8 and 9, the values different from "a+b" and "−(a+b)" do not correspond to the peak point. For the values different from "a+b" and "−(a+b)", the peak-point information value PK is equal to "0". Two or more peak points (PK=1) will not occur in succession. In the case of RLL (2, X), at least two "0" points exist between two adjacent peak points (PK=1).

Figure 11:
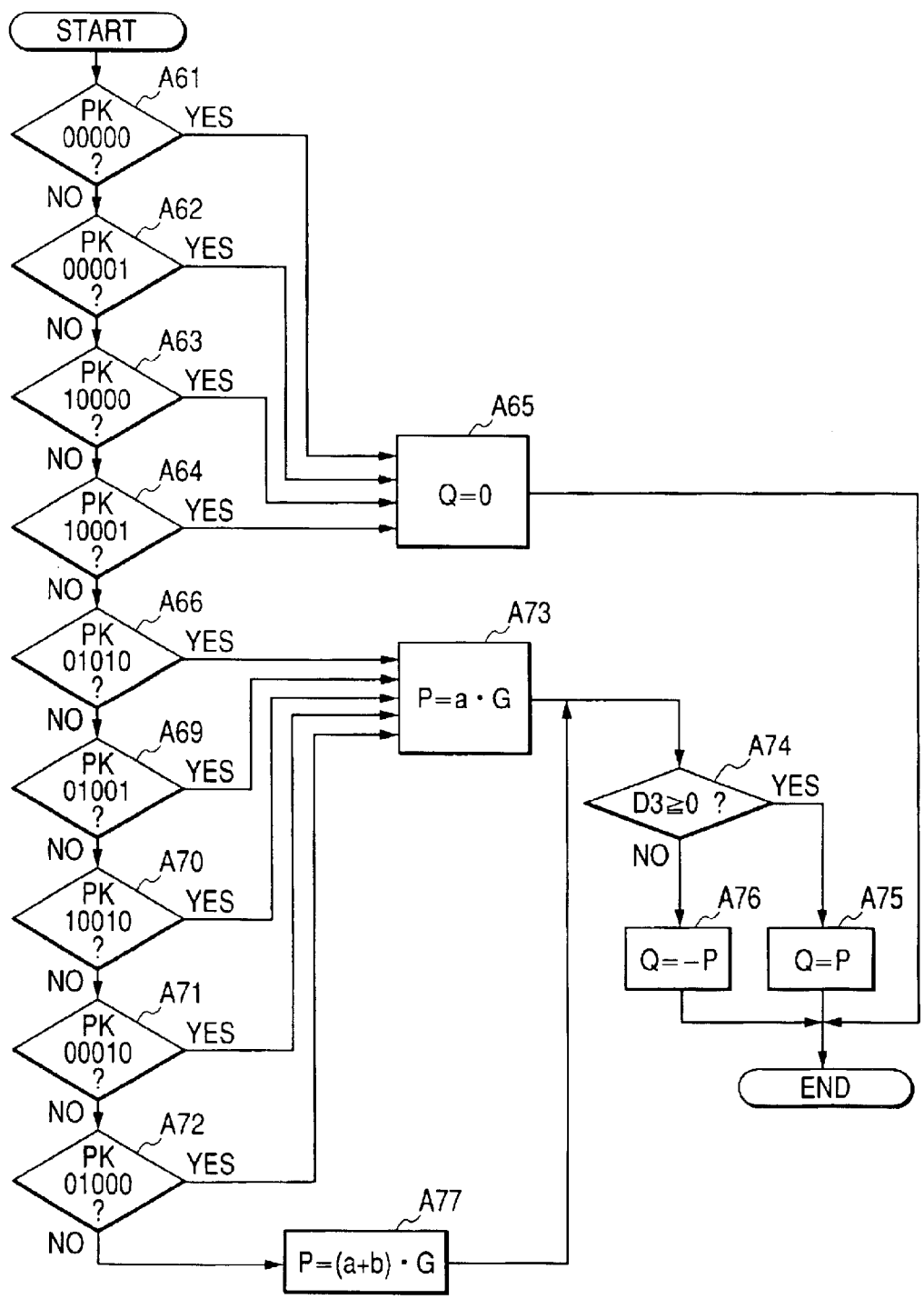
FIG. 11 is a flowchart of an algorithm of a temporary decision by a temporary decision circuit in FIG. 1.

FIG. 11 is a flowchart of the algorithm of the temporary decision for RLL (2, X) which is implemented by the temporary decision circuit 33. The temporary decision is executed for every period of the bit clock signal. The algorithm in FIG. 11 refers to five successive peak-point information values PK represented by the output signals of the tap delay circuit 32. The central-place value (the third-place value) among the five successive peak-point information values PK corresponds to a sample point of interest.

As shown in FIG. 11, a first step A61 of the algorithm decides whether or not five successive peak-point information values PK represented by the output signals of the tap delay circuit 32 are "00000". When the five successive peak-point information values PK are "00000", the algorithm advances from the step A61 to a step A65. Otherwise, the algorithm advances from the step A61 to a step A62.

The step A62 decides whether or not the five successive peak-point information values PK are "00001". When the five successive peak-point information values PK are "00001", the algorithm advances from the step A62 to the step A65. Otherwise, the algorithm advances from the step A62 to a step A63.

The step A63 decides whether or not the five successive peak-point information values PK are "10000". When the five successive peak-point information values PK are "10000", the algorithm advances from the step A63 to the step A65. Otherwise, the algorithm advances from the step A63 to a step A64.

The step A64 decides whether or not the five successive peak-point information values PK are "10001". When the five successive peak-point information values PK are "10001", the algorithm advances from the step A64 to the step A65. Otherwise, the algorithm advances from the step A64 to a step A66.

In the case where the five successive peak-point information values PK are "00000", "00001", "10000", or "10001", the before-equalization signal waveform is fixed to a signal level of "0" for a long time interval centered at the sample point of interest. Thus, in this case, the step A65 sets a temporary decision level (a temporary decision value or a temporary decision result value) Q to "0". Specifically, the step A65 calculates the temporary decision level Q according to the following equation.

$$Q=0 \tag{1}$$

After the step A65, the current execution cycle of the temporary decision ends.

The step A66 decides whether or not the five successive peak-point information values PK are "01010". When the five successive peak-point information values PK are "01010", the algorithm advances from the step A66 to a step A73. Otherwise, the algorithm advances from the step A66 to a step A69.

The step A69 decides whether or not the five successive peak-point information values PK are "01001". When the five successive peak-point information values PK are "01001", the algorithm advances from the step A69 to the step A73. Otherwise, the algorithm advances from the step A69 to a step A70.

The step A70 decides whether or not the five successive peak-point information values PK are "10010". When the five successive peak-point information values PK are "10010", the algorithm advances from the step A70 to the step A73. Otherwise, the algorithm advances from the step A70 to a step A71.

The step A71 decides whether or not the five successive peak-point information values PK are "00010". When the five successive peak-point information values PK are "00010", the algorithm advances from the step A71 to the step A73. Otherwise, the algorithm advances from the step A71 to a step A72.

The step A72 decides whether or not the five successive peak-point information values PK are "01000". When the five successive peak-point information values PK are "01000", the algorithm advances from the step A72 to the step A73. Otherwise, the algorithm advances from the step A72 to a step A77.

In the case where the five successive peak-point information values PK are "01010", "01001", "10010", "00010", or "01000", the sample point of interest (the central sample point) does not correspond to a peak while at least one of the two sample points immediately neighboring the sample point of interest corresponds to a peak. In this case, the step A73 calculates an intermediate value P according to the following equation.

$$P = a \cdot G \quad (2)$$

where G denotes the gain (the gain factor) shown in FIG. 11, and "a" denotes the value in PR (a, b, −b, −a). The values G and "a" are known values designated by the PR mode signal and the RLL mode signal. After the step A73, the algorithm advances to a step A74.

In the case where the five successive peak-point information values PK differ from "00000", "00001", "10000", "10001", "01010", "01001", "10010", "00010", and "01000" (for example, in the case where the sample point of interest or the central-place sample point corresponds to a peak), the step A77 calculates the intermediate value P according to the following equation.

$$P = (a+b) \cdot G \quad (3)$$

where G denotes the gain (the gain factor) shown in FIG. 10, and "a" and "b" denote the values in PR (a, b, −b, −a). The values G, "a", and "b" are known values designated by the PR mode signal and the RLL mode signal. After the step A77, the algorithm advances to the step A74.

The step A74 detects the polarity of the present-moment signal D3 (the output signal of the subtracter 31). Specifically, the step A74 decides whether or not the present-moment signal D3 is smaller than "0". When the present-moment signal D3 is equal to or greater than "0", the algorithm advances from the step A74 to a step A75. When the present-moment signal D3 is smaller than "0", the algorithm advances from the step A74 to a step A76.

The step A75 sets the temporary decision level Q to the value P. In other words, the step A75 executes the statement "Q=P". On the other hand, the step A76 sets the temporary decision level Q to the value −P (the value P multiplied by −1). In other words, the step A76 executes the statement "Q=−P". After the steps A75 and A76, the current execution cycle of the temporary decision ends.

With reference back to FIG. 1, the temporary decision circuit 33 outputs a signal representative of the temporary decision level (the temporary decision value) Q to the subtracter 34 as a temporary decision result signal. The temporary decision value Q is determined on the basis of one of the previously-indicated equations (1), (2), and (3). Accordingly, the equalization by the transversal filter 21 is based on one of the equations (1), (2), and (3). The equalization based on one of the equations (1), (2), and (3) is periodically executed in response to the polarity of the present-moment signal D3 at a timing of the central-place one (the third-place one) among five successive peak-point information values PK.

Figure 12:
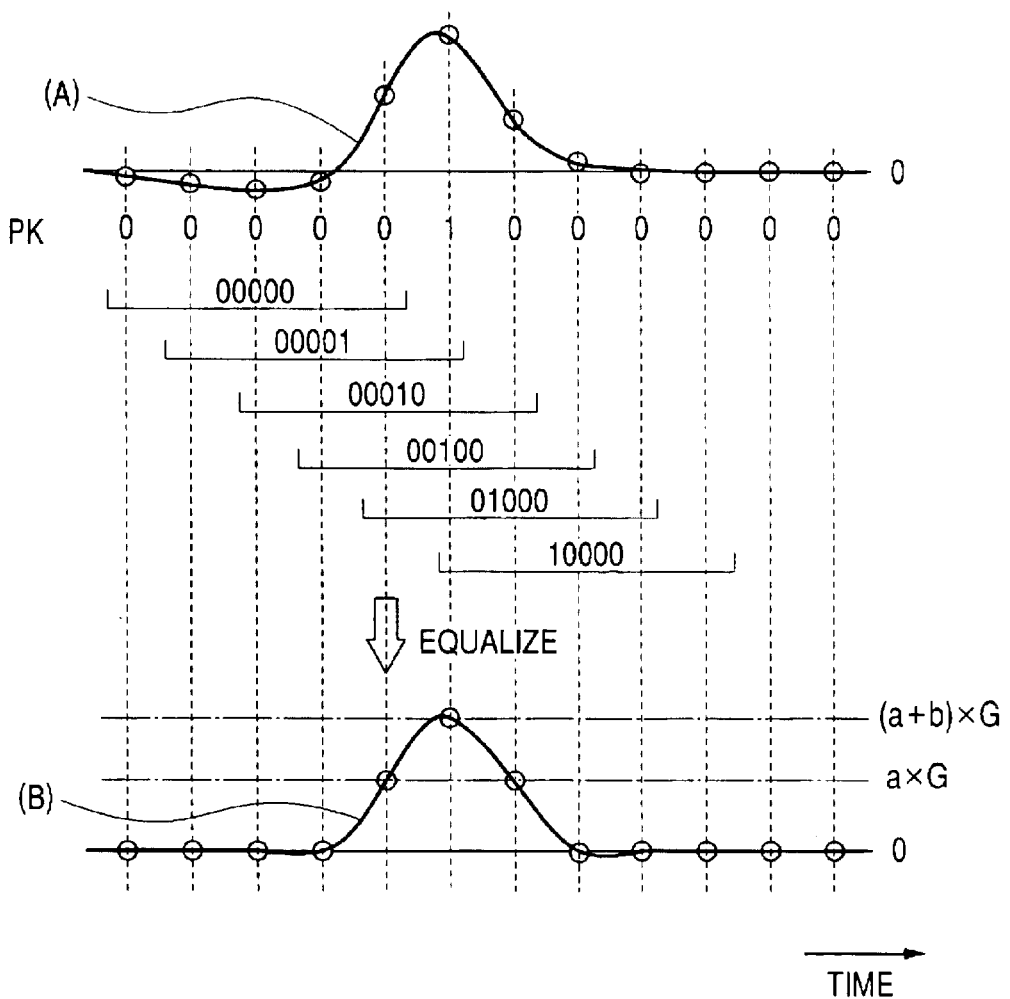
FIG. 12 is a time-domain diagram of a first example of an original waveform and an equalization-resultant waveform in the first embodiment of this invention.

FIG. 12 shows a first example of a before-equalization waveform (A) represented by a signal inputted into the transversal filter 21, and a first example of an after-equalization waveform or an equalization-resultant waveform (B) originating from the before-equalization waveform (A) and being represented by a signal outputted from the transversal filter 21. In FIG. 12, the character "○" denotes sample points for the PR equalization by the transversal filter 21. FIG. 12 also shows a first example of a time-domain change of the peak-point information value PK which corresponds to the before-equalization waveform (A). The value PK is represented by the peak-point information fed to the tap delay circuit 32 from the re-sampling DPLL section 17 via the delay adjuster 22. According to the before-equalization waveform (A), five successive peak-point information values PK change as

"00000"→"00001"→"00010"→"00100"→"01000"→"10000".

With reference to FIG. 12, when the five successive peak-point information values PK are "00000", "10000", or "00001", the equalization result level is set to "0" on the basis of the previously-indicated equation (1). When the five successive peak-point information values PK are "01000" or "00010", the polarity of the present-moment signal D3 at the timing of the central-place one among the five successive peak-point information values PK is positive and hence the equalization result level is set to "a·G" on the basis of the previously-indicated equation (2) and the equation "Q=P". When the five successive peak-point information values PK are "00100", the polarity of the present-moment signal D3 at the timing of the central-place one among the five successive peak-point information values PK is positive and hence the equalization result level is set to "(a+b)·G" on the basis of the previously-indicated equation (3) and the equation "Q=P". Accordingly, the after-equalization waveform (B) is similar to the before-equalization waveform (A).

Figure 13:
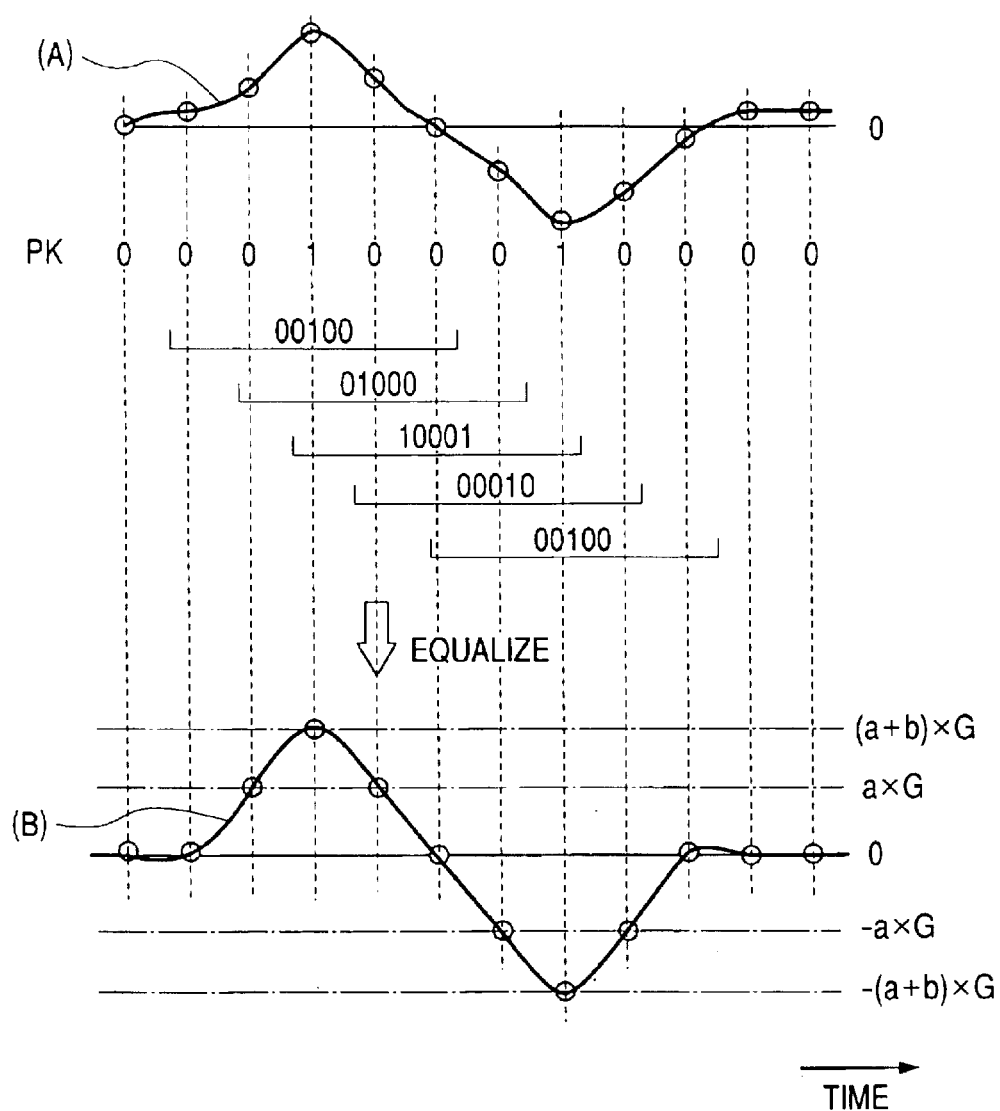
FIG. 13 is a time-domain diagram of a second example of an original waveform and an equalization-resultant waveform in the first embodiment of this invention.

FIG. 13 shows a second example of the before-equalization waveform (A), a second example of the after-equalization waveform (B), and a second example of the time-domain change of the peak-point information value PK. According to the before-equalization waveform (A) in FIG. 13, five successive peak-point information values PK change as

"00100"→"01000"→"10001"→"00010"→"00100".

With reference to FIG. 13, when the five successive peak-point information values PK assume "00100" for the first time, the polarity of the present-moment signal D3 at the timing of the central-place one among the five successive peak-point information values PK is positive and hence the equalization result level is set to "(a+b)·G" on the basis of the previously-indicated equation (3) and the equation "Q=P". When the five successive peak-point information values PK are "01000", the polarity of the present-moment signal D3 at the timing of the central-place one among the five successive peak-point information values PK is positive and hence the equalization result level is set to "a·G" on the basis of the previously-indicated equation (2) and the equation "Q=P". When the five successive peak-point information values PK are "10001", the equalization result level is set to "0" on the basis of the previously-indicated equation (1). When the five successive peak-point information values PK are "00010", the polarity of the present-moment signal D3 at the timing of the central-place one among the five successive peak-point information values PK is negative and hence the equalization result level is set to "−a·G" on the basis of the previously-indicated equation (2) and the equation "Q=−P". When the five successive peak-point information values PK assume "00100" for the second time, the polarity of the present-moment signal D3 at the timing of the central-place one among the five successive peak-point information values PK is negative and hence the equalization result level is set to "−(a+b)·G" on the basis of the previously-indicated equation (3) and the equation "Q=−P". Accordingly, the after-equalization waveform (B) is similar to the before-equalization waveform (A).

Figure 14:
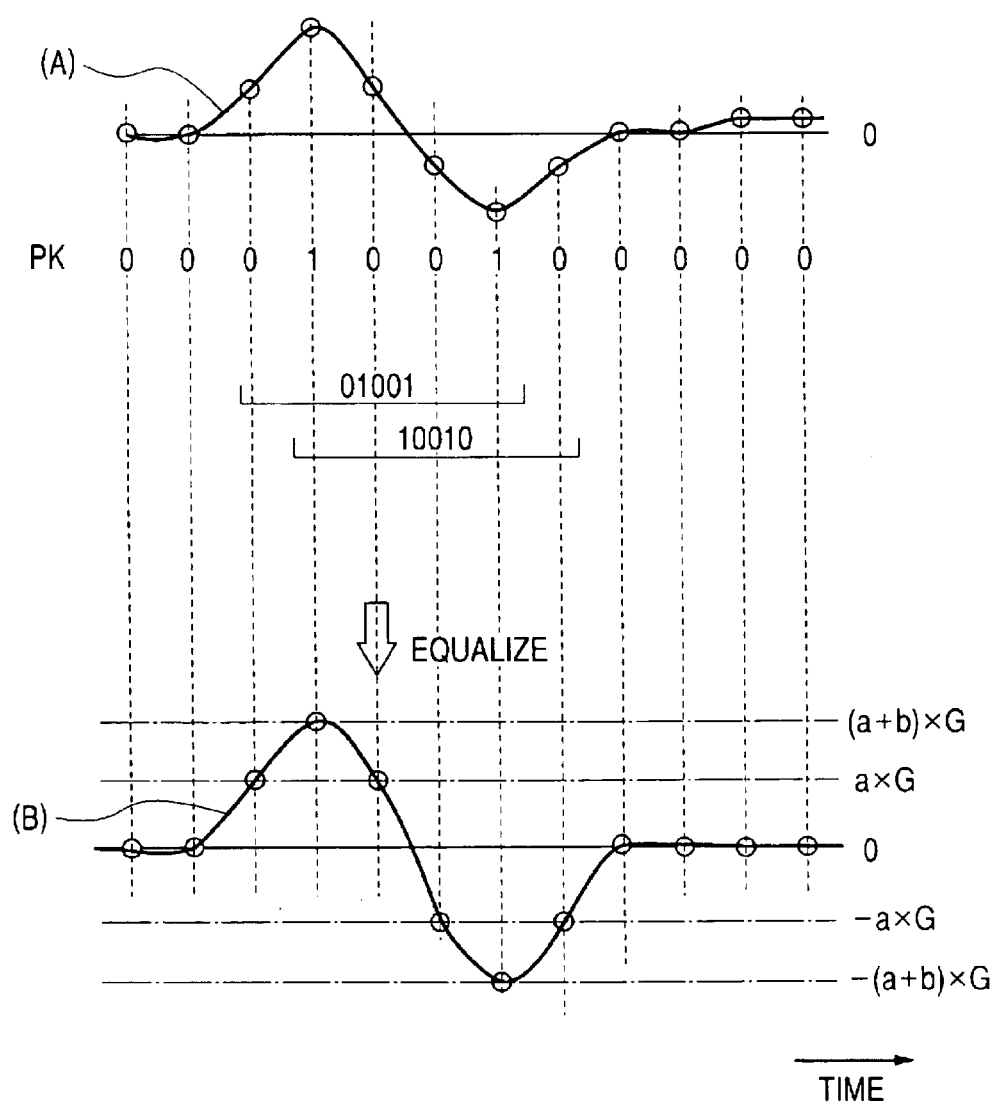
FIG. 14 is a time-domain diagram of a third example of an original waveform and an equalization-resultant waveform in the first embodiment of this invention.

FIG. 14 shows a third example of the before-equalization waveform (A), a third example of the after-equalization waveform (B), and a third example of the time-domain change of the peak-point information value PK. According to the before-equalization waveform (A) in FIG. 14, five successive peak-point information values PK change as "01001"→"10010".

With reference to FIG. 14, when the five successive peak-point information values PK are "01001", the polarity of the present-moment signal D3 at the timing of the central-place one among the five successive peak-point information values PK is positive and hence the equalization result level is set to "a·G" on the basis of the previously-indicated equation (2) and the equation "Q=P". When the five successive peak-point information values PK are "10010", the polarity of the present-moment signal D3 at the timing of the central-place one among the five successive peak-point information values PK is negative and hence the equalization result level is set to "−a·G" on the basis of the previously-indicated equation (2) and the equation "Q=−P". Accordingly, the after-equalization waveform (B) is similar to the before-equalization waveform (A).

The waveform equalization is executed in response to five successive peak-point information values and also the state transition diagram of FIG. 8 or FIG. 9. Therefore, the executed waveform equalization is less adversely affected by the level represented by a current signal sample. Thus, the executed waveform equalization is reliable. Furthermore, the executed waveform equalization can be changed among different PR equalizations in response to the PR mode signal and the RLL mode signal. Operation of the temporary decision circuit 33 for RLL (1, X) is similar to that for RLL (2, X) since the RLL (1, X) signal state transitions in FIG. 8 are similar to the RLL (2, X) signal state transitions in FIG. 9.

As previously mentioned, the second inner digital signal is fed from the re-sampling circuit 18 to the transversal filter 25 via the delay adjuster 23. The signal delay given by the delay adjuster 23 is set to a fixed value for providing a rough timing match to a pseudo crosstalk. The second inner digital signal is processed by the transversal filter 25. The second outer digital signal is fed from the re-sampling circuit 19 to the transversal filter 26 via the delay adjuster 24. The signal delay given by the delay adjuster 24 is set to a fixed value for providing a rough timing match to a pseudo crosstalk. The second outer digital signal is processed by the transversal filter 26. The transversal filters 25 and 26 are similar in structure to the transversal filter 21 in FIG. 5. The transversal filter 25 is connected to a multiplier and LPF section 28 and the subtracter 30. The multiplier and LPF section 28 is connected to the subtracter 34. The transversal filter 26 is connected to a multiplier and LPF section 29 and the subtracter 31. The multiplier and LPF section 29 is connected to the subtracter 34. The multiplier and LPF sections 28 and 29 are similar in structure to the multiplier and LPF section 27 in FIG. 5.

The multiplier and LPF section 28 receives the error signal from the subtracter 34. The multiplier and LPF section 28 receives signals (tap signals) from respective taps in the transversal filter 25. The multiplier and LPF section 28 multiplies the tap signals by the error signal. The multiplication-resultant signals reflect a correlation between the error signal and the signal read out from the track Ti−1 immediately inward of the track Ti of interest (see FIG. 3). The multiplier and LPF section 28 integrates the multiplication-resultant signals. The multiplier and LPF section 28 feeds the integration-resultant signals to the transversal filter 25 as tap coefficients (filtering coefficients). The tap coefficients are periodically updated. The transversal filter 25 processes the second inner digital signal in response to the tap coefficients, generating an inner pseudo signal caused by a crosstalk between the track Ti of interest and the track Ti−1 immediately inward of the track Ti of interest (see FIG. 3). The transversal filter 25 outputs the inner pseudo crosstalk signal to the subtracter 30.

The multiplier and LPF section 29 receives the error signal from the subtracter 34. The multiplier and LPF section 29 receives signals (tap signals) from respective taps in the transversal filter 26. The multiplier and LPF section 29 multiplies the tap signals by the error signal. The multiplication-resultant signals reflect a correlation between the error signal and the signal read out from the track Ti+1 immediately outward of the track Ti of interest (see FIG. 3). The multiplier and LPF section 29 integrates the multiplication-resultant signals. The multiplier and LPF section 29 feeds the integration-resultant signals to the transversal filter 26 as tap coefficients (filtering coefficients). The tap coefficients are periodically updated. The transversal filter 26 processes the second outer digital signal in response to the tap coefficients, generating an outer pseudo signal caused by a crosstalk between the track Ti of interest and the track Ti+1 immediately outward of the track Ti of interest (see FIG. 3). The transversal filter 26 outputs the outer pseudo crosstalk signal to the subtracter 31.

The subtracter 30 receives the equalization-resultant signal from the transversal filter 21. The device 30 subtracts the inner pseudo crosstalk signal (the output signal of the transversal filter 25) from the equalization-resultant signal to remove crosstalk-caused signal components. The subtracter 30 outputs the subtraction-resultant signal to the subtracter 31. The device 31 subtracts the outer pseudo crosstalk signal (the output signal of the transversal filter 26) from the output signal of the subtracter 30 to remove crosstalk-caused signal components. The subtracter 31 outputs the subtraction-resultant signal to the viterbi decoder (not shown), the temporary decision circuit 33, and the subtracter 34.

The removal of crosstalk-caused signal components by the apparatus portion including the transversal filter 25 is based on a feedback control. Similarly, the removal of crosstalk-caused signal components by the apparatus portion including the transversal filter 26 is based on a feedback control. The feedback control of suppressing intersymbol interferences by the apparatus portion including the transversal filter 21, the feedback control of removing crosstalk-caused signal components by the apparatus portion including the transversal filter 25, and the feedback control of removing crosstalk-caused signal components by the apparatus portion including the transversal filter 26 are executed so as to nullify or minimize the same error signal. Therefore, a collision can be prevented from occurring among the three feedback control systems.

As previously mentioned, the transversal filter 21 subjects the second central digital signal to the partial-response waveform equalization which converges the values of the resultant signal on the clearly different values "−(a+b)", "−a", "0", "a", and "a+b". The error signal is generated on the basis of the converged values of the equalization-resultant signal. Calculation is made as to correlations of the error signal with the signals read out from the tracks Ti−1 and Ti+1 immediately inward and outward the track Ti of interest. Crosstalk-caused signal components are estimated from the calculated correlations. Accordingly, accurate and quick convergence can be provided in the feedback controls of removing crosstalk-caused signal components.

The re-sampling of the first inner digital signal by the re-sampling circuit 18 is responsive to the bit clock signal and the parameter signal (the parameter T_ratio) fed from the re-sampling DPLL section 17. According to this design, it is possible to compensate for an error of the re-sampling frequency from the frequency of the system clock signal used by the A/D converter 12. Also, the re-sampling of the first inner digital signal by the re-sampling circuit 19 is responsive to the bit clock signal and the parameter signal (the parameter T_ratio) fed from the re-sampling DPLL section 17. According to this design, it is possible to compensate for an error of the re-sampling frequency from the frequency of the system clock signal used by the A/D converter 13.

The delay adjuster 23 provides a rough phase match. The apparatus portion for generating the inner pseudo crosstalk signal which includes the transversal filter 25 provides a fine phase match. Similarly, the delay adjuster 24 provides a rough phase match. The apparatus portion for generating the outer pseudo crosstalk signal which includes the transversal filter 26 provides a fine phase match. It should be noted that the delay adjusters 23 and 24 may be located in stages preceding the re-sampling circuits 18 and 19, respectively.

The re-sampling DPLL section 17 is located between the AGC/ATC circuit 14 and the apparatus portion for suppressing intersymbol interferences which includes the transversal filter 21. The re-sampling DPLL section 17 has the control loop which is completed therein. Accordingly, secure convergence can be provided in the operation of the re-sampling DPLL section 17.

Second Embodiment

Figure 15:
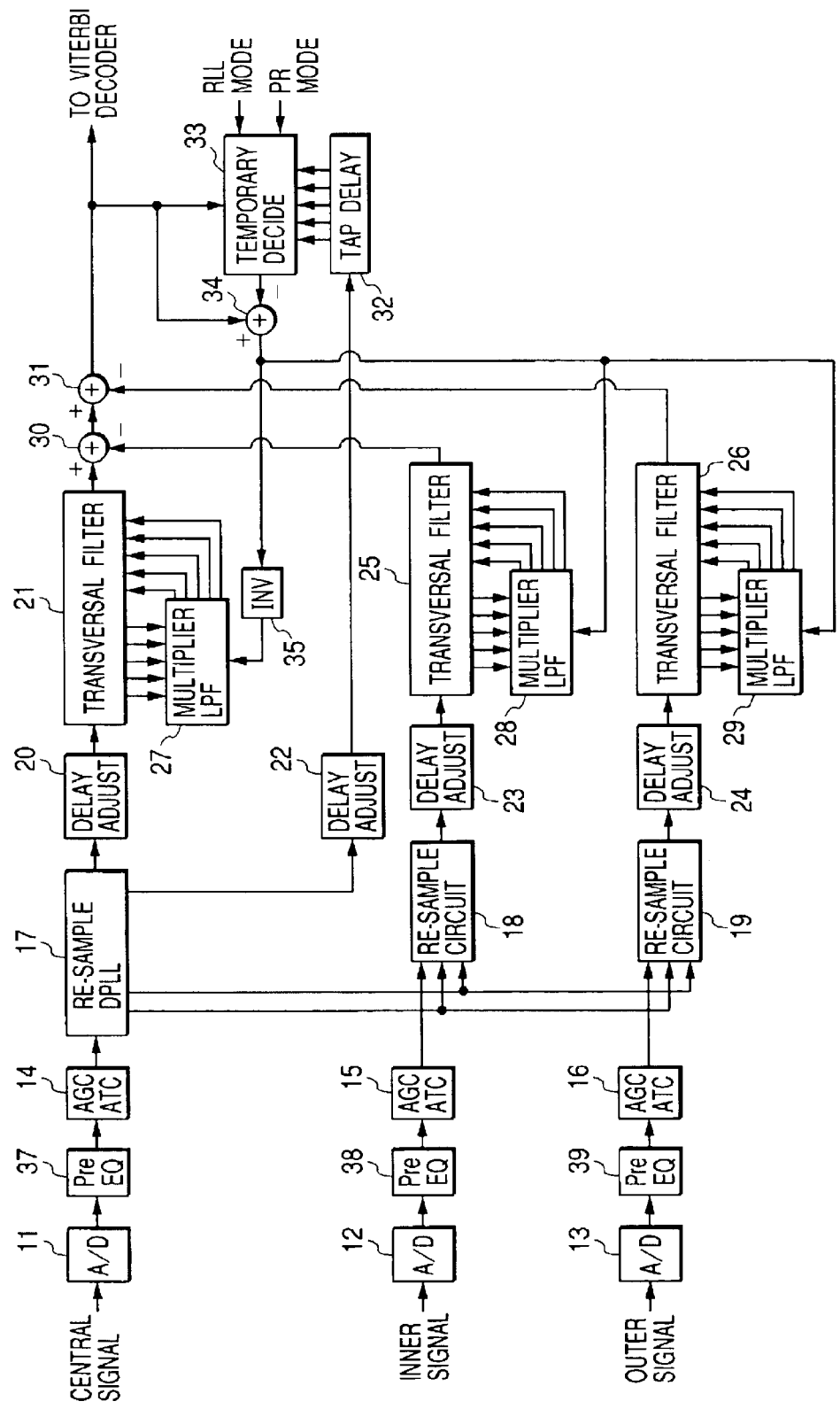
FIG. 15 is a block diagram of an information reproducing apparatus according to a second embodiment of this invention.

FIG. 15 shows an information reproducing apparatus according to a second embodiment of this invention. The apparatus of FIG. 15 is similar to the apparatus of FIG. 1 except that digital pre-equalizers 37, 38, and 39 are additionally provided. The digital pre-equalizer 37 is connected between the A/D converter 11 and the AGC/ATC circuit 14. The digital pre-equalizer 38 is connected between the A/D converter 12 and the AGC/ATC circuit 15. The digital pre-equalizer 39 is connected between the A/D converter 13 and the AGC/ATC circuit 16.

Third Embodiment

Figure 16:
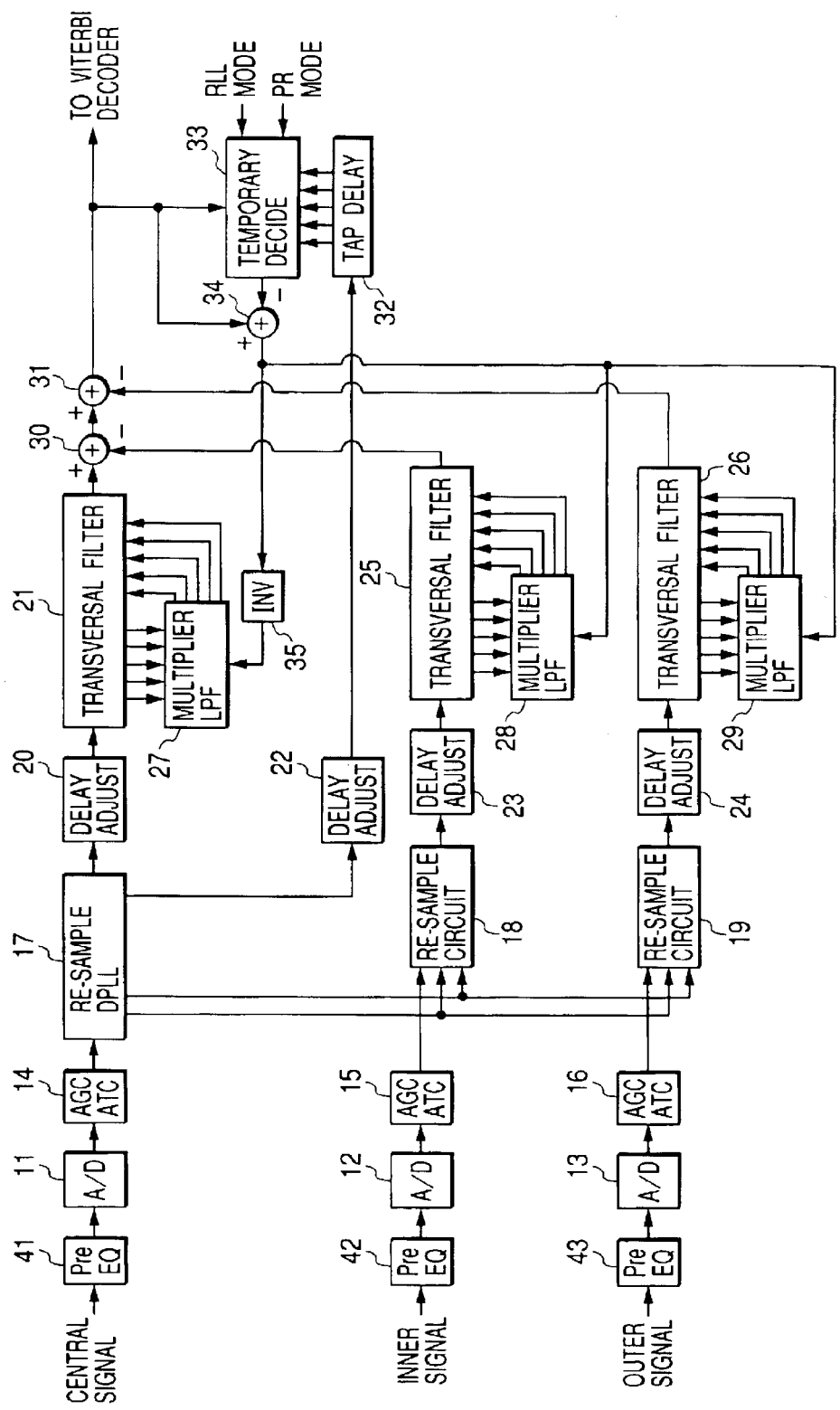
FIG. 16 is a block diagram of an information reproducing apparatus according to a third embodiment of this invention.

FIG. 16 shows an information reproducing apparatus according to a third embodiment of this invention. The apparatus of FIG. 16 is similar to the apparatus of FIG. 1 except that analog pre-equalizers (analog fixed equalizers) 41, 42, and 43 are additionally provided. The analog pre-equalizer 41 is located in a stage immediately preceding the A/D converter 11. The analog pre-equalizer 42 is located in a stage immediately preceding the A/D converter 12. The analog pre-equalizer 43 is located in a stage immediately preceding the A/D converter 13.

Fourth Embodiment

Figure 17:
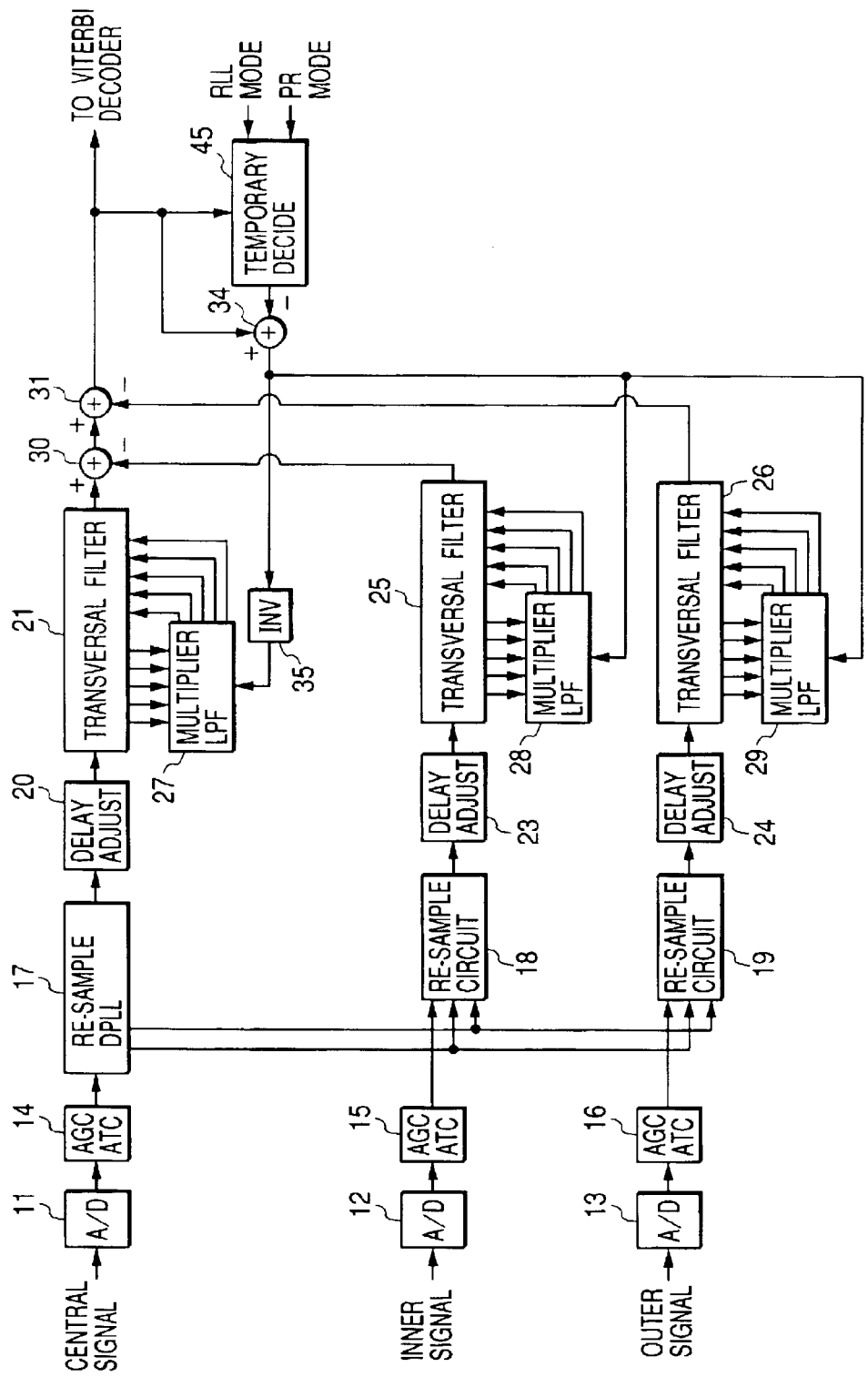
FIG. 17 is a block diagram of an information reproducing apparatus according to a fourth embodiment of this invention.

FIG. 17 shows an information reproducing apparatus according to a fourth embodiment of this invention. The apparatus of FIG. 17 is similar to the apparatus of FIG. 1 except that a temporary decision circuit 45 replaces the temporary decision circuit 33 (see FIG. 1), and the delay adjuster 22 and the tap delay circuit 32 (see FIG. 1) are omitted.

The temporary decision circuit 45 receives the output signal of the subtracter 31. The temporary decision circuit 45 compares the output signal of the subtracter 31 with a reference signal representative of a predetermined threshold value, thereby detecting every peak point and generating peak-point information. The temporary decision circuit 45 implements a temporary decision about the output signal of the subtracter 31 in response to five successive samples of the peak-point information, the RLL mode signal, and the PR mode signal according to a predetermined algorithm similar to that used by the temporary decision circuit 33 (see FIG. 1). The temporary decision circuit 45 generates a signal representing the result of the temporary decision. The temporary decision circuit 45 outputs the temporary decision result signal to the subtracter 34.

Fifth Embodiment

Figure 18:
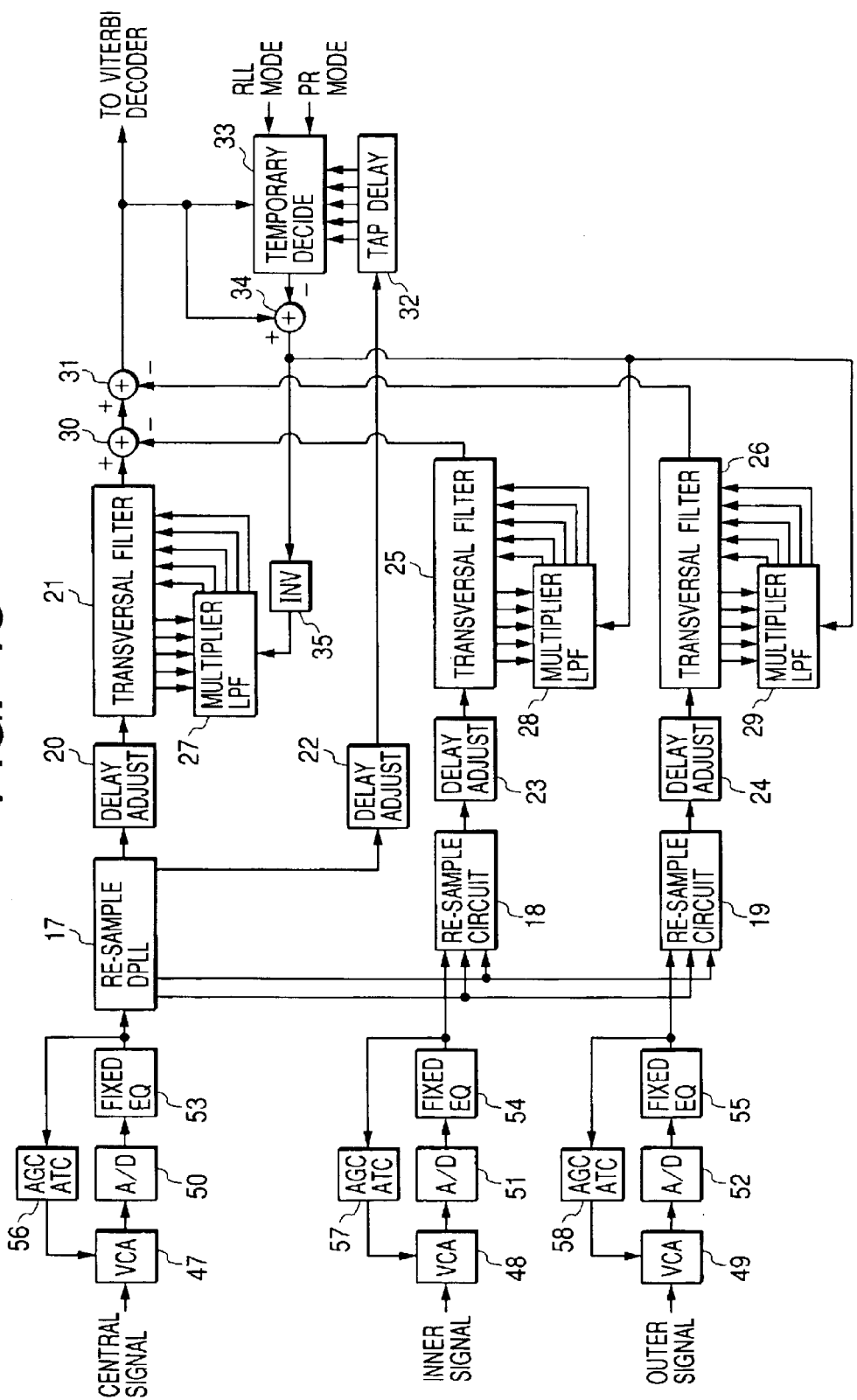
FIG. 18 is a block diagram of an information reproducing apparatus according to a fifth embodiment of this invention.

FIG. 18 shows an information reproducing apparatus according to a fifth embodiment of this invention. The apparatus of FIG. 18 is similar to the apparatus of FIG. 1 except for design changes mentioned hereafter.

The apparatus of FIG. 18 includes a voltage-controlled amplifier (VCA) 47, an A/D converter 50, a fixed equalizer 53, and an AGC/ATC detection circuit 56. The VCA 47 follows the optical head 10B (see FIG. 1). The VCA 47 is connected to the A/D converter 50 and the AGC/ATC detection circuit 56. The A/D converter 50 is connected to the fixed equalizer 53. The fixed equalizer 53 is connected to the AGC/ATC detection circuit 56 and the re-sampling DPLL section 17. The combination of the devices 47, 50, 53, and 56 replaces the combination of the devices 11 and 14 in FIG. 1.

The apparatus of FIG. 18 includes a VCA 48, an A/D converter 51, a fixed equalizer 54, and an AGC/ATC detection circuit 57. The VCA 48 follows the optical head 10B (see FIG. 1). The VCA 48 is connected to the A/D converter 51 and the AGC/ATC detection circuit 57. The A/D converter 51 is connected to the fixed equalizer 54. The fixed equalizer 54 is connected to the AGC/ATC detection circuit 57 and the re-sampling circuit 18. The combination of the devices 48, 51, 54, and 57 replaces the combination of the devices 12 and 15 in FIG. 1.

The apparatus of FIG. 18 includes a VCA 49, an A/D converter 52, a fixed equalizer 55, and an AGC/ATC detection circuit 58. The VCA 49 follows the optical head 10B

(see FIG. 1). The VCA 49 is connected to the A/D converter 52 and the AGC/ATC detection circuit 58. The A/D converter 52 is connected to the fixed equalizer 55. The fixed equalizer 55 is connected to the AGC/ATC detection circuit 58 and the re-sampling circuit 19. The combination of the devices 49, 52, 55, and 58 replaces the combination of the devices 13 and 16 in FIG. 1.

The VCA 47 receives the central readout signal from the optical head 10B (see FIG. 1). The VCA 47 amplifies the central readout signal at a controllable gain. The VCA 47 outputs the amplification-resultant signal to the A/D converter 50. The A/D converter 50 changes the output signal of the VCA 47 into a corresponding digital signal. Specifically, the A/D converter 50 periodically samples the output signal of the VCA 47 in response to a master clock signal (a system clock signal), and converts every resultant sample into a digital sample. The A/D converter 50 outputs the resultant sequence of digital samples to the fixed equalizer 53. The fixed equalizer 53 subjects the output signal of the A/D converter 50 to a fixed equalization process. The fixed equalizer 53 outputs the equalization-resultant signal to the AGC/ATC detection circuit 56 and the re-sampling DPLL section 17. The AGC/ATC detection circuit 56 generates a control voltage in response to the output signal of the fixed equalizer 53. The AGC/ATC detection circuit 56 outputs the control voltage to the VCA 47. The gain of the VCA 47 is controlled in response to the voltage outputted from the AGC/ATC detection circuit 56. The control of the gain of the VCA 47 is designed to implement AGC control, DC control, and ATC control.

The VCA 48 receives the inner readout signal from the optical head 10B (see FIG. 1). The VCA 48 amplifies the inner readout signal at a controllable gain. The VCA 48 outputs the amplification-resultant signal to the A/D converter 51. The A/D converter 51 changes the output signal of the VCA 48 into a corresponding digital signal. Specifically, the A/D converter 51 periodically samples the output signal of the VCA 48 in response to the master clock signal (the system clock signal), and converts every resultant sample into a digital sample. The A/D converter 51 outputs the resultant sequence of digital samples to the fixed equalizer 54. The fixed equalizer 54 subjects the output signal of the A/D converter 51 to a fixed equalization process. The fixed equalizer 54 outputs the equalization-resultant signal to the AGC/ATC detection circuit 57 and the re-sampling circuit 18. The AGC/ATC detection circuit 57 generates a control voltage in response to the output signal of the fixed equalizer 54. The AGC/ATC detection circuit 57 outputs the control voltage to the VCA 48. The gain of the VCA 48 is controlled in response to the voltage outputted from the AGC/ATC detection circuit 57. The control of the gain of the VCA 48 is designed to implement AGC control, DC control, and ATC control.

The VCA 49 receives the outer readout signal from the optical head 10B (see FIG. 1). The VCA 49 amplifies the outer readout signal at a controllable gain. The VCA 49 outputs the amplification-resultant signal to the A/D converter 52. The A/D converter 52 changes the output signal of the VCA 49 into a corresponding digital signal. Specifically, the A/D converter 52 periodically samples the output signal of the VCA 49 in response to the master clock signal (the system clock signal), and converts every resultant sample into a digital sample. The A/D converter 52 outputs the resultant sequence of digital samples to the fixed equalizer 55. The fixed equalizer 55 subjects the output signal of the A/D converter 52 to a fixed equalization process. The fixed equalizer 55 outputs the equalization-resultant signal to the AGC/ATC detection circuit 58 and the re-sampling circuit 19. The AGC/ATC detection circuit 58 generates a control voltage in response to the output signal of the fixed equalizer 55. The AGC/ATC detection circuit 58 outputs the control voltage to the VCA 49. The gain of the VCA 49 is controlled in response to the voltage outputted from the AGC/ATC detection circuit 58. The control of the gain of the VCA 49 is designed to implement AGC control, DC control, and ATC control.

Sixth Embodiment

Figure 19:
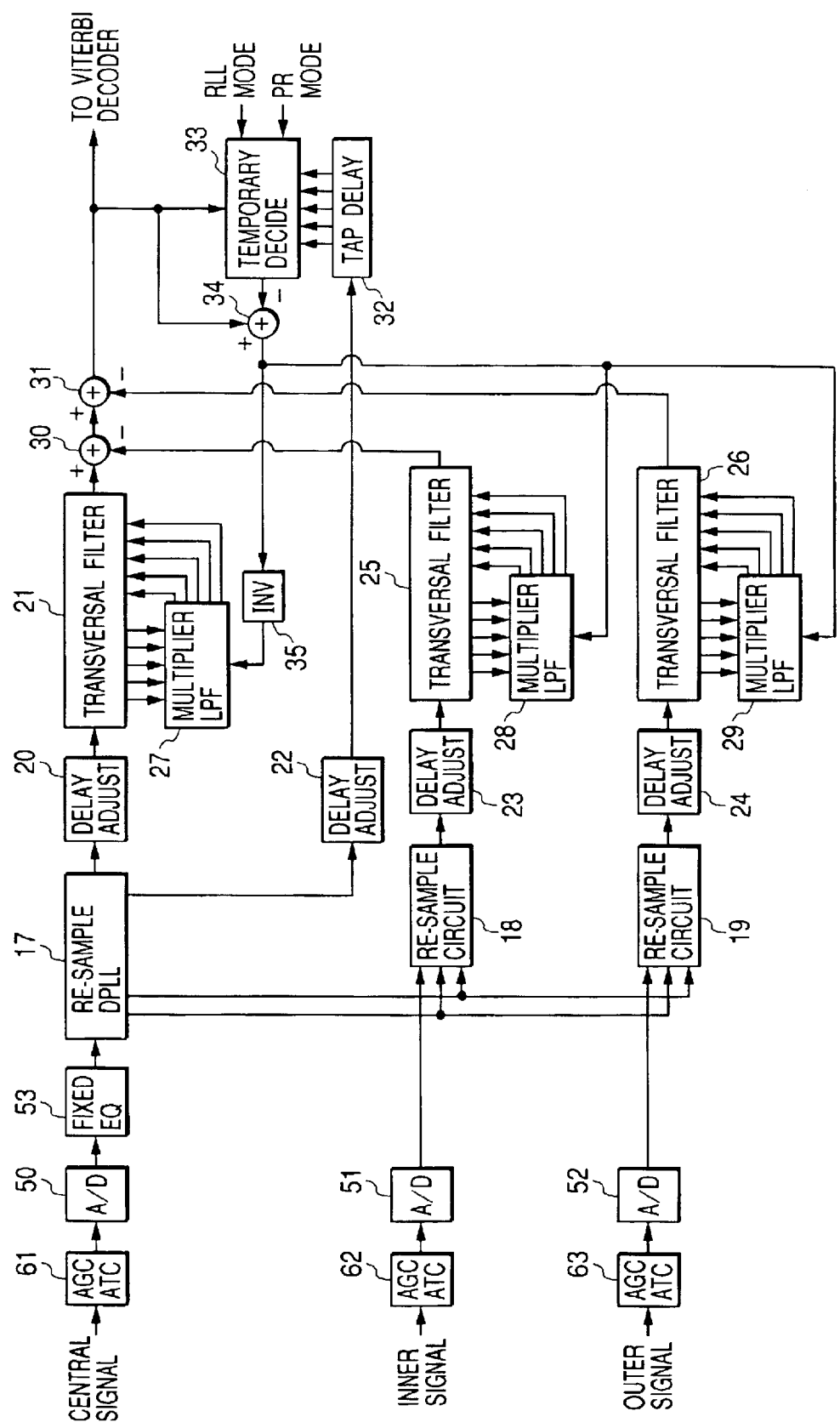
FIG. 19 is a block diagram of an information reproducing apparatus according to a sixth embodiment of this invention.

FIG. 19 shows an information reproducing apparatus according to a sixth embodiment of this invention. The apparatus of FIG. 19 is similar to the apparatus of FIG. 1 except for design changes mentioned hereafter.

The apparatus of FIG. 19 includes an analog AGC/ATC circuit 61, an A/D converter 50, and a fixed equalizer 53. The analog AGC/ATC circuit 61 follows the optical head 10B (see FIG. 1). The analog AGC/ATC circuit 61 is connected to the A/D converter 50. The A/D converter 50 is connected to the fixed equalizer 53. The fixed equalizer 53 is connected to the re-sampling DPLL section 17. The combination of the devices 61, 50, and 53 replaces the combination of the devices 11 and 14 in FIG. 1.

The apparatus of FIG. 19 includes an analog AGC/ATC circuit 62 and an A/D converter 51. The analog AGC/ATC circuit 62 follows the optical head 10B (see FIG. 1). The analog AGC/ATC circuit 62 is connected to the A/D converter 51. The A/D converter 51 is connected to the re-sampling circuit 18. The combination of the devices 62 and 51 replaces the combination of the devices 12 and 15 in FIG. 1.

The apparatus of FIG. 19 includes an analog AGC/ATC circuit 63 and an A/D converter 52. The analog AGC/ATC circuit 63 follows the optical head 10B (see FIG. 1). The analog AGC/ATC circuit 63 is connected to the A/D converter 52. The A/D converter 52 is connected to the re-sampling circuit 19. The combination of the devices 63 and 52 replaces the combination of the devices 13 and 16 in FIG. 1.

The analog AGC/ATC circuit 61 receives the central readout signal from the optical head 10B (see FIG. 1). The analog AGC/ATC circuit 61 subjects the central readout signal to an AGC/ATC process of controlling a signal amplitude at a constant level. The analog AGC/ATC circuit 61 outputs the resultant signal to the A/D converter 50. The A/D converter 50 changes the output signal of the analog AGC/ATC circuit 61 into a corresponding digital signal. Specifically, the A/D converter 50 periodically samples the output signal of the analog AGC/ATC circuit 61 in response to a master clock signal (a system clock signal), and converts every resultant sample into a digital sample. The A/D converter 50 outputs the resultant sequence of digital samples to the fixed equalizer 53. The fixed equalizer 53 subjects the output signal of the A/D converter 50 to a fixed equalization process. The fixed equalizer 53 outputs the equalization-resultant signal to the re-sampling DPLL section 17.

The analog AGC/ATC circuit 62 receives the inner readout signal from the optical head 10B (see FIG. 1). The analog AGC/ATC circuit 62 subjects the inner readout signal to an AGC/ATC process of controlling a signal amplitude at a constant level. The analog AGC/ATC circuit 62 outputs the resultant signal to the A/D converter 51. The A/D converter 51 changes the output signal of the analog AGC/ATC circuit 62 into a corresponding digital signal. Specifically, the A/D converter 51 periodically samples the output signal of the analog AGC/ATC circuit 62 in response to the master clock signal (the system clock signal), and converts every resultant sample into a digital sample. The A/D converter 51 outputs the resultant sequence of digital samples to the re-sampling circuit 18.

The analog AGC/ATC circuit 63 receives the outer readout signal from the optical head 10B (see FIG. 1). The analog AGC/ATC circuit 63 subjects the outer readout signal to an AGC/ATC process of controlling a signal amplitude at a constant level. The analog AGC/ATC circuit 63 outputs the resultant signal to the A/D converter 52. The A/D converter 52 changes the output signal of the analog AGC/ATC circuit 63 into a corresponding digital signal. Specifically, the A/D converter 52 periodically samples the output signal of the analog AGC/ATC circuit 63 in response to the master clock signal (the system clock signal), and converts every resultant sample into a digital sample. The A/D converter 52 outputs the resultant sequence of digital samples to the re-sampling circuit 19.

Seventh Embodiment

Figure 20:
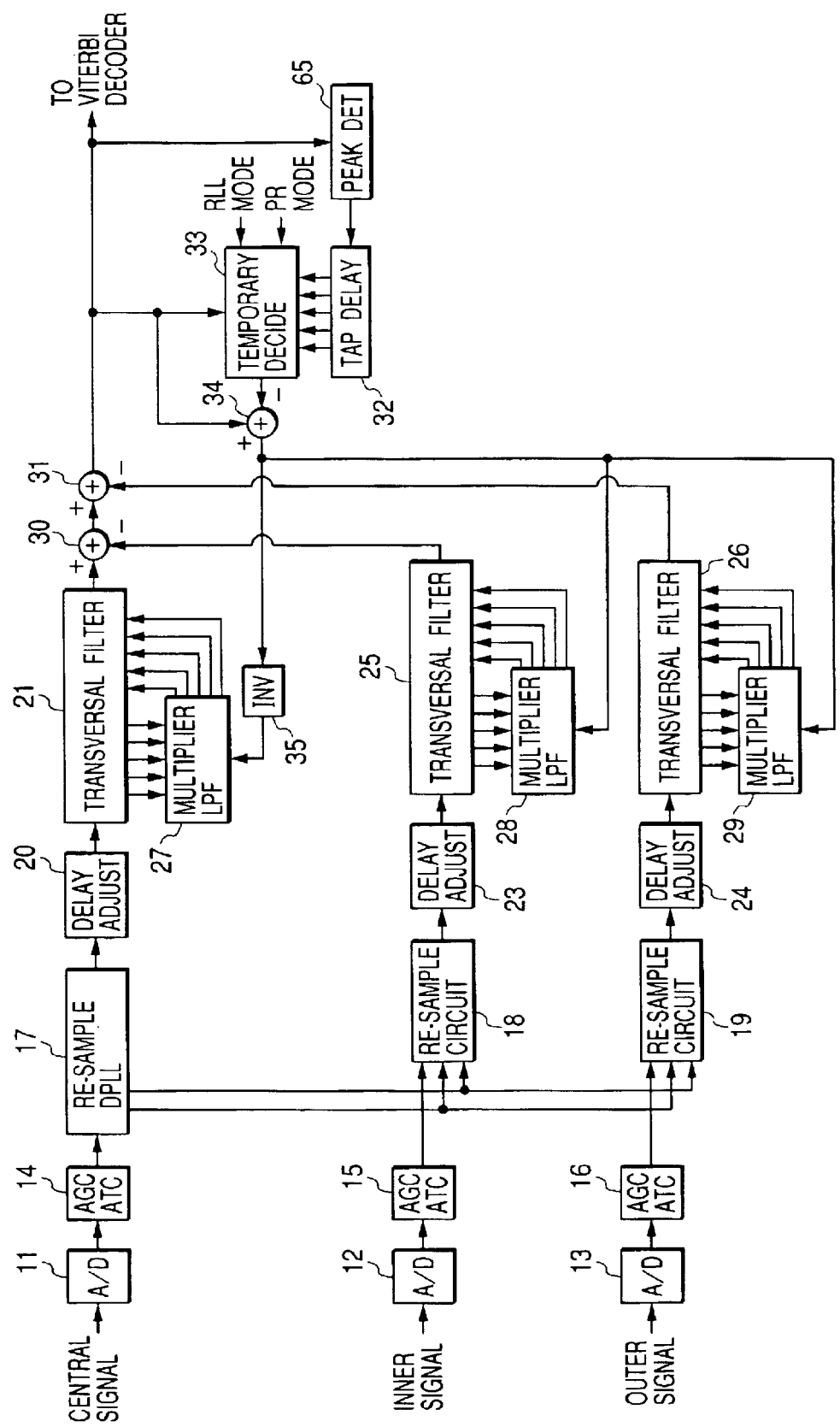
FIG. 20 is a block diagram of an information reproducing apparatus according to a seventh embodiment of this invention.

FIG. 20 shows an information reproducing apparatus according to a seventh embodiment of this invention. The apparatus of FIG. 20 is similar to the apparatus of FIG. 1 except that a peak detector 65 is additionally provided, and the delay adjuster 22 (see FIG. 1) is omitted.

The input terminal of the peak detector 65 is connected to the output terminal of the subtracter 31. The output terminal of the peak detector 65 is connected to the input terminal of the tap delay circuit 32.

The peak detector 65 receives the output signal of the subtracter 31. The peak detector 65 calculates the slope (differential) of the level represented by the output signal of the subtracter 31 on the basis of two successive samples thereof. The peak detector 65 senses every inversion of the polarity of the calculated slope. The peak detector 65 senses a sample point immediately preceding the sample point corresponding to the sensed polarity inversion. The peak detector 65 sets a peak-point information value PK to "1" for the sensed sample point. The peak detector 65 sets the peak-point information value PK to "0" for the other sample points. Thus, the peak detector 65 generates peak-point information representing the value PK. The peak detector 65 outputs the peak-point information to the tap delay circuit 32.

Eighth Embodiment

Figure 21:
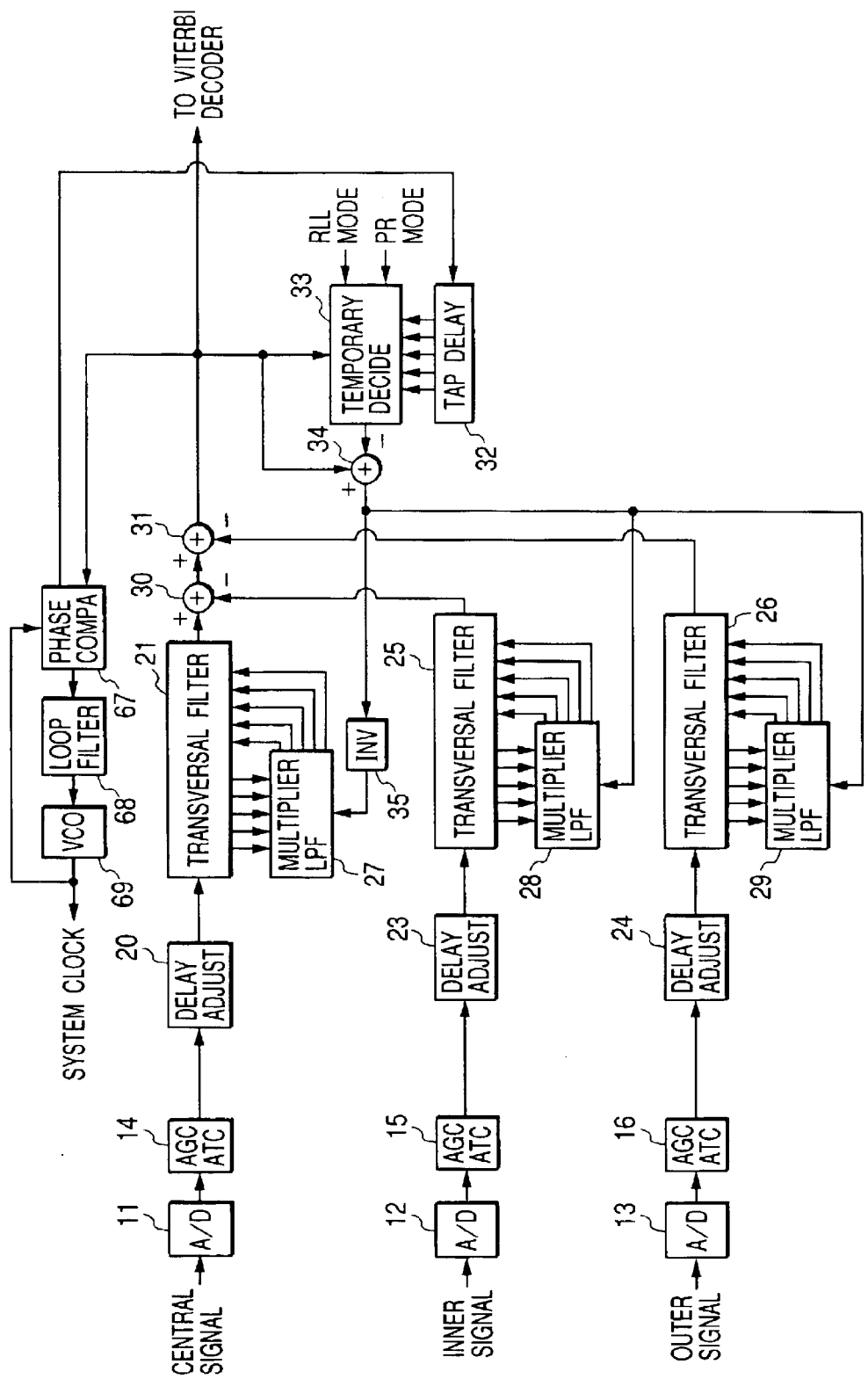
FIG. 21 is a block diagram of an information reproducing apparatus according to an eighth embodiment of this invention.

FIG. 21 shows an information reproducing apparatus according to an eighth embodiment of this invention. The apparatus of FIG. 21 is similar to the apparatus of FIG. 1 except for design changes mentioned hereafter.

The re-sampling DPLL section 17, the re-sampling circuits 18 and 19, and the delay adjuster 22 (see FIG. 1) are omitted from the apparatus of FIG. 21. Thus, in the apparatus of FIG. 21, the AGC/ATC circuit 14 and the delay adjuster 20 are directly connected to each other. The AGC/ATC circuit 15 and the delay adjuster 23 are directly connected to each other. The AGC/ATC circuit 16 and the delay adjuster 24 are directly connected to each other. The output signals of the AGC/ATC circuits 14, 15, and 16 are fed to the transversal filters 21, 25, and 26 via the delay adjusters 20, 23, and 24, respectively.

The apparatus of FIG. 21 includes a peak detection and phase comparison circuit 67, a loop filter 68, and a voltage-controlled oscillator (VCO) 69 which are connected in a closed loop in that order. The circuit 67 is connected to the subtracter 31. The circuit 67 detects every peak point of the output signal of the subtracter 31. The circuit 67 compares the phase of the detected peak point and the phase of a system clock signal fed from the VCO 69, and generates a phase error signal in response to the result of the phase comparison. The circuit 67 outputs the phase error signal to the loop filter 68. The loop filter 68 converts the phase error signal into a control voltage. The loop filter 68 outputs the control voltage to the VCO 69. The VCO 69 oscillates at a frequency determined by the control voltage, and thereby generates the system clock signal. The VCO 69 outputs the system clock signal to the A/D converters 11, 12, and 13, and other devices and circuits within the apparatus. The system clock signal has a frequency equal to a predetermined natural number times the frequency of a bit clock signal.

The peak detection and phase comparison circuit 67 implements peak detection as follows. The peak detection and phase comparison circuit 67 calculates the slope (differential) of the level represented by the output signal of the subtracter 31 on the basis of two successive samples thereof. The peak detection and phase comparison circuit 67 senses every inversion of the polarity of the calculated slope. The peak detection and phase comparison circuit 67 senses a sample point immediately preceding the sample point corresponding to the sensed polarity inversion. The peak detection and phase comparison circuit 67 sets a peak-point information value PK to "1" for the sensed sample point. The peak detection and phase comparison circuit 67 sets the peak-point information value PK to "0" for the other sample points. Thus, the peak detection and phase comparison circuit 67 generates peak-point information representing the value PK. The peak detection and phase comparison circuit 67 outputs the peak-point information to the tap delay circuit 32.

Ninth Embodiment

Figure 22:
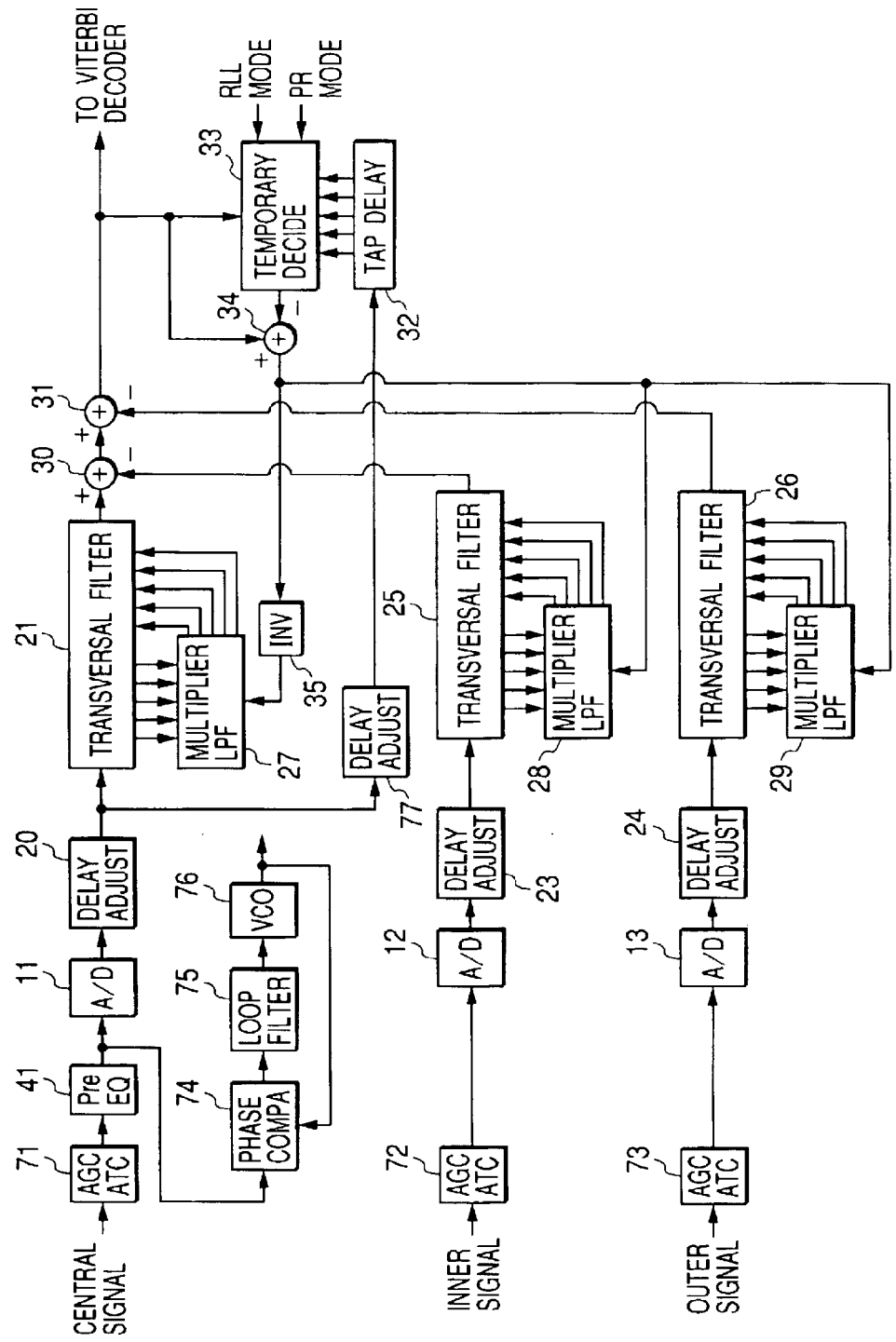
FIG. 22 is a block diagram of an information reproducing apparatus according to a ninth embodiment of this invention.

FIG. 22 shows an information reproducing apparatus according to a ninth embodiment of this invention. The apparatus of FIG. 22 is similar to the apparatus of FIG. 1 except for design changes mentioned hereafter.

The re-sampling DPLL section 17, the re-sampling circuits 18 and 19, and the delay adjuster 22 (see FIG. 1) are omitted from the apparatus of FIG. 22.

The apparatus of FIG. 22 includes an analog AGC/ATC circuit 71 and an analog fixed equalizer (an analog pre-equalizer) 41. The analog AGC/ATC circuit 71 follows the optical head 10B (see FIG. 1). The analog AGC/ATC circuit 71 is connected to the analog fixed equalizer 41. The analog fixed equalizer 41 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the analog fixed equalizer 41. The analog fixed equalizer 41 subjects the output signal of the analog AGC/ATC circuit 71 to a fixed equalization process. The analog fixed equalizer 41 outputs the equalization-resultant signal to the A/D converter 11. The A/D converter 11 changes the output signal of the analog fixed equalizer 41 into a corresponding digital signal. Specifically, the A/D converter 11 periodically samples the output signal of the analog fixed equalizer 41 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 22 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 22 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 22 includes a phase comparator 74, a loop filter 75, and a voltage-controlled oscillator (VCO) 76 which are connected in a closed loop in that order. The phase comparator 74 is connected to the output side of the analog fixed equalizer 41. The device 74 compares the phase of the output signal of the analog fixed equalizer 41 and the phase of a system clock signal fed from the VCO 76, and generates a phase error signal in response to the result of the phase comparison. The phase comparator 74 outputs the phase error signal to the loop filter 75. The loop filter 75 converts the phase error signal into a control voltage. The loop filter 75 outputs the control voltage to the VCO 76. The VCO 76 oscillates at a frequency determined by the control voltage, and thereby generates the system clock signal. The VCO 76 outputs the system clock signal to the A/D converters 11, 12, and 13, and other devices and circuits within the apparatus. The system clock signal has a frequency equal to a predetermined natural number times the frequency of the bit clock signal.

The apparatus of FIG. 22 includes a peak detector 77 connected between the delay adjuster 20 and the tap delay circuit 32. The peak detector 77 receives the output signal of the delay adjuster 20. The peak detector 77 calculates the slope (differential) of the level represented by the output signal of the delay adjuster 20 on the basis of two successive samples thereof. The peak detector 77 senses every inversion of the polarity of the calculated slope. The peak detector 77 senses a sample point immediately preceding the sample point corresponding to the sensed polarity inversion. The peak detector 77 sets a peak-point information value PK to "1" for the sensed sample point. The peak detector 77 sets the peak-point information value PK to "0" for the other sample points. Thus, the peak detector 77 generates peak-point information representing the value PK. The peak detector 77 outputs the peak-point information to the tap delay circuit 32.

Tenth Embodiment

Figure 23:
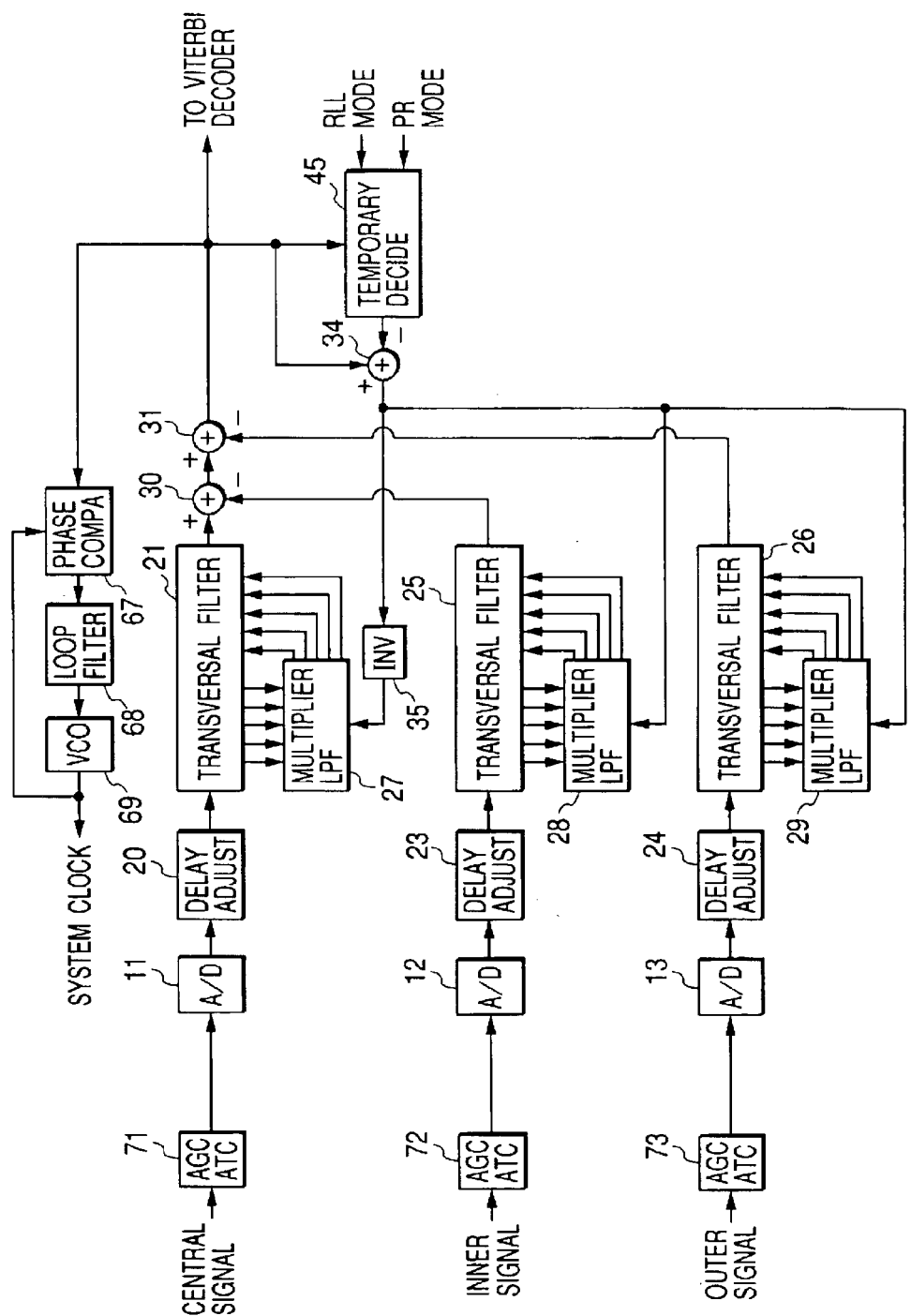
FIG. 23 is a block diagram of an information reproducing apparatus according to a tenth embodiment of this invention.

FIG. 23 shows an information reproducing apparatus according to a tenth embodiment of this invention. The apparatus of FIG. 23 is similar to the apparatus of FIG. 17 except for design changes mentioned hereafter.

The re-sampling DPLL section 17 and the re-sampling circuits 18 and 19 (see FIG. 17) are omitted from the apparatus of FIG. 23.

The apparatus of FIG. 23 includes an analog AGC/ATC circuit 71 which follows the optical head 10B (see FIG. 1). The analog AGC/ATC circuit 71 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the A/D converter 11. The A/D converter 11 changes the output signal of the analog AGC/ATC circuit 71 into a corresponding digital signal. Specifically, the A/D converter 11 periodically samples the output signal of the analog AGC/ATC circuit 71 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 23 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 23 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 23 includes a peak detection and phase comparison circuit 67, a loop filter 68, and a voltage-controlled oscillator (VCO) 69 which are connected in a closed loop in that order. The circuit 67 is connected to the subtracter 31. The circuit 67 detects every peak point of the output signal of the subtracter 31. The circuit 67 compares the phase of the detected peak point and the phase of a system clock signal fed from the VCO 69, and generates a phase error signal in response to the result of the phase comparison. The circuit 67 outputs the phase error signal to the loop filter 68. The loop filter 68 converts the phase error signal into a control voltage. The loop filter 68 outputs the control voltage to the VCO 69. The VCO 69 oscillates at a frequency determined by the control voltage, and thereby generates the system clock signal. The VCO 69 outputs the system clock signal to the A/D converters 11, 12, and 13, and other devices and circuits within the apparatus. The system clock signal has a frequency equal to a predetermined natural number times the frequency of the bit clock signal.

Eleventh Embodiment

Figure 24:
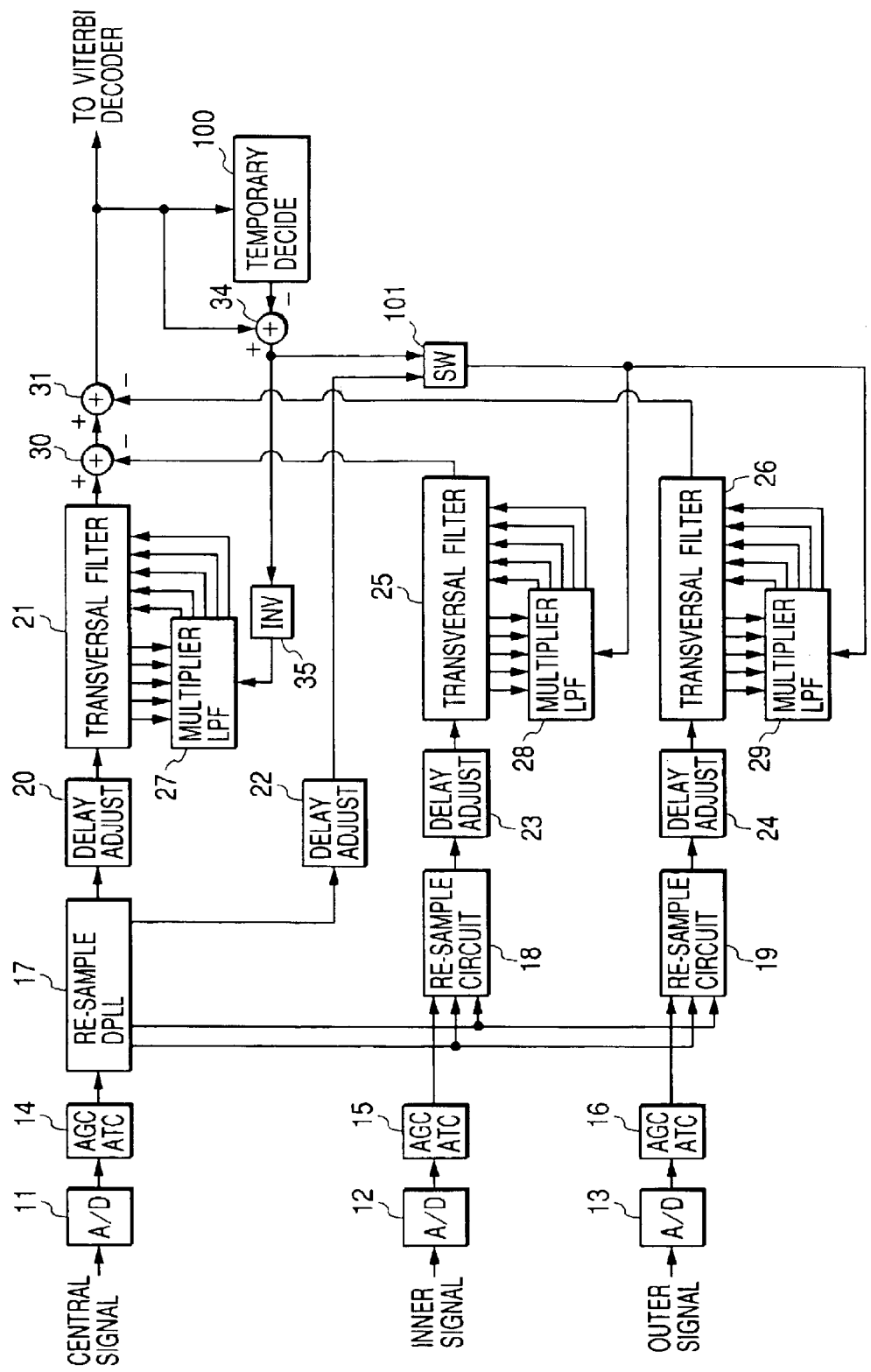
FIG. 24 is a block diagram of an information reproducing apparatus according to an eleventh embodiment of this invention.

FIG. 24 shows an information reproducing apparatus according to an eleventh embodiment of this invention. The apparatus of FIG. 24 is similar to the apparatus of FIG. 1 except that a temporary decision circuit 100 replaces the temporary decision circuit 33 (see FIG. 1), the tap delay circuit 32 (see FIG. 1) is omitted, and a switch 101 is additionally provided.

The temporary decision circuit 100 receives the output signal of the subtracter 31. The temporary decision circuit 100 implements a temporary decision about the output signal of the subtracter 31 by referring to predetermined threshold values. Specifically, the predetermined threshold values correspond to target levels (desired levels) among which the level represented by the output signal of the subtracter 31 is changed. The temporary decision circuit 100 compares the current output signal of the subtracter 31 with the predetermined threshold values, and thereby selects one of the target levels which best matches with the current output signal of the subtracter 31. The temporary decision circuit 100 generates a temporary decision result signal in accordance with the selected target level. The temporary decision circuit 100 outputs the temporary decision result signal to the subtracter 34.

The switch 101 is connected to the subtracter 34, the delay adjuster 22, and the multiplier and LPF sections 28 and 29. The switch 101 receives the error signal from the subtracter 34. The switch 101 receives the peak-point information from the delay adjuster 22. The switch 101 passes the error signal to the multiplier and LPF sections 28 and 29 when the value PK represented by the peak-point information is "1". The switch 101 inhibits the transmission of the error signal to the multiplier and LPF sections 28 and 29 when the value PK represented by the peak-point information is "0". Accordingly, the switch 101 selects only the error signal which corresponds to the timings of signal level peaks.

Twelfth Embodiment

Figure 25:
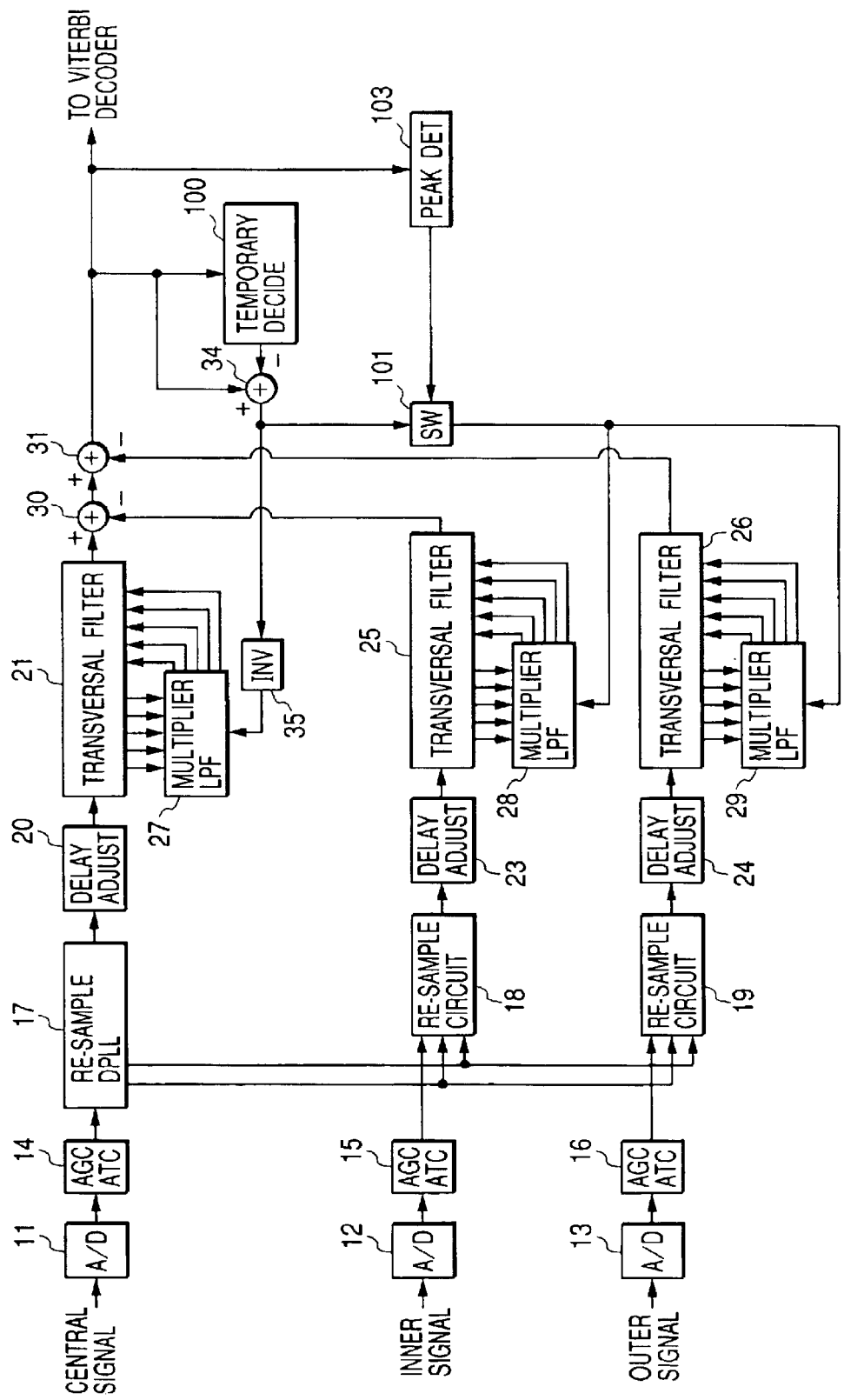
FIG. 25 is a block diagram of an information reproducing apparatus according to a twelfth embodiment of this invention.

FIG. 25 shows an information reproducing apparatus according to a twelfth embodiment of this invention. The apparatus of FIG. 25 is similar to the apparatus of FIG. 24 except that a peak detector 103 is additionally provided, and the delay adjuster 22 is omitted.

The input terminal of the peak detector 103 is connected to the output terminal of the subtracter 31. The output terminal of the peak detector 103 is connected to the switch 101.

The peak detector 103 receives the output signal of the subtracter 31. The peak detector 103 calculates the slope (differential) of the level represented by the output signal of the subtracter 31 on the basis of two successive samples thereof. The peak detector 103 senses every inversion of the polarity of the calculated slope. The peak detector 103 senses a sample point immediately preceding the sample point corresponding to the sensed polarity inversion. The peak detector 103 sets a peak-point information value PK to "1" for the sensed sample point. The peak detector 103 sets the peak-point information value PK to "0" for the other sample points. Thus, the peak detector 103 generates peak-point information representing the value PK. The peak detector 103 outputs the peak-point information to the switch 101.

Thirteenth Embodiment

Figure 26:
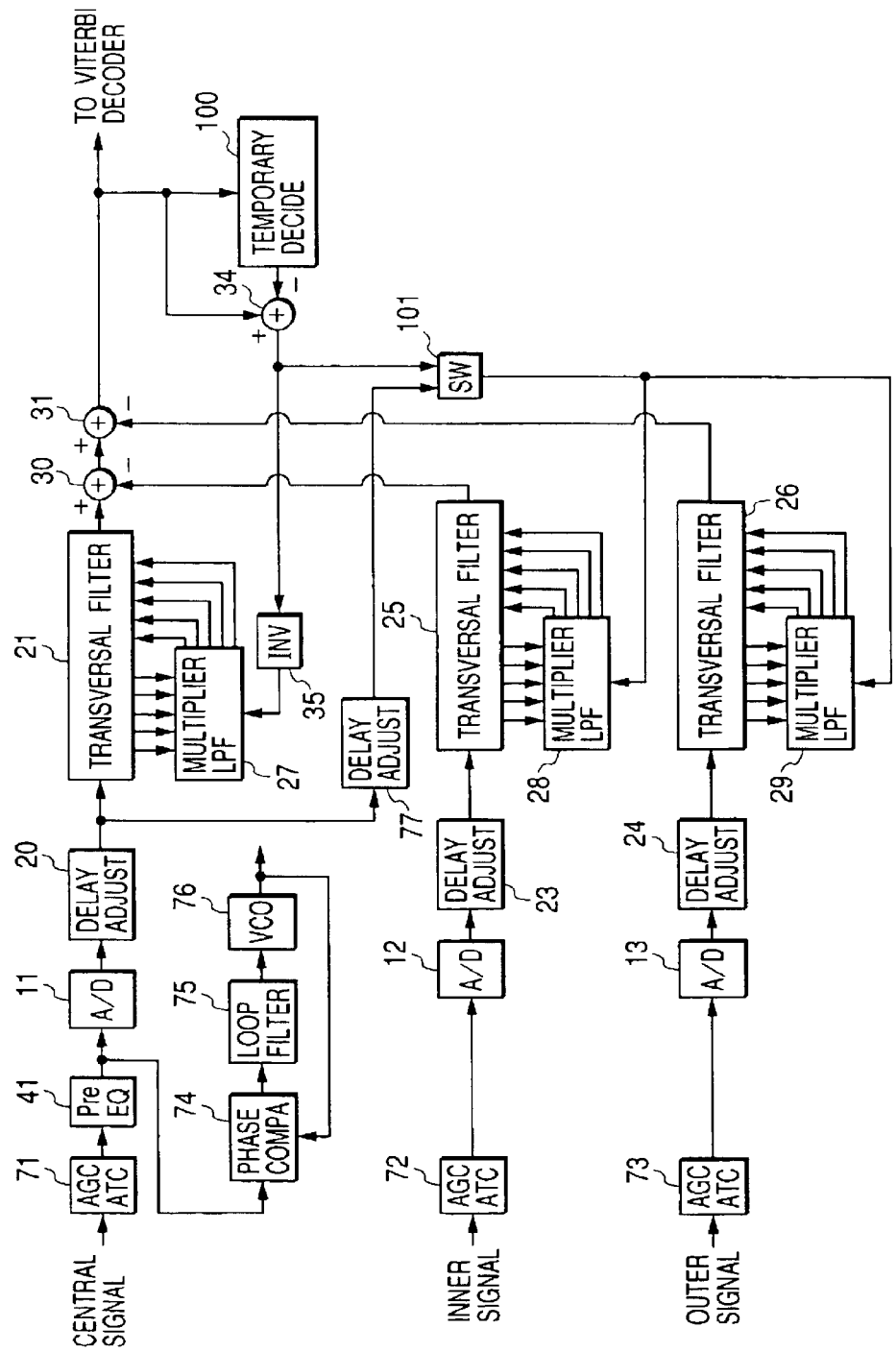
FIG. 26 is a block diagram of an information reproducing apparatus according to a thirteenth embodiment of this invention.

FIG. 26 shows an information reproducing apparatus according to a thirteenth embodiment of this invention. The apparatus of FIG. 26 is similar to the apparatus of FIG. 25 except for design changes mentioned hereafter.

The re-sampling DPLL section 17 and the re-sampling circuits 18 and 19 (see FIG. 25) are omitted from the apparatus of FIG. 26.

The apparatus of FIG. 26 includes an analog AGC/ATC circuit 71 and an analog fixed equalizer (an analog pre-equalizer) 41. The analog AGC/ATC circuit 71 follows the optical head 10B (see FIG. 1). The analog AGC/ATC circuit 71 is connected to the analog fixed equalizer 41. The analog fixed equalizer 41 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the analog fixed equalizer 41. The analog fixed equalizer 41 subjects the output signal of the analog AGC/ATC circuit 71 to a fixed equalization process. The analog fixed equalizer 41 outputs the equalization-resultant signal to the A/D converter 11. The A/D converter 11 changes the output signal of the analog fixed equalizer 41 into a corresponding digital signal. Specifically, the A/D converter 11 periodically samples the output signal of the analog fixed equalizer 41 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 26 includes an analog AGC/ATC circuit 72 which follows the optical head 10B (see FIG. 1).

The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 26 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 26 includes a phase comparator 74, a loop filter 75, and a voltage-controlled oscillator (VCO) 76 which are connected in a closed loop in that order. The phase comparator 74 is connected to the output side of the analog fixed equalizer 41. The device 74 compares the phase of the output signal of the analog fixed equalizer 41 and the phase of a system clock signal fed from the VCO 76, and generates a phase error signal in response to the result of the phase comparison. The phase comparator 74 outputs the phase error signal to the loop filter 75. The loop filter 75 converts the phase error signal into a control voltage. The loop filter 75 outputs the control voltage to the VCO 76. The VCO 76 oscillates at a frequency determined by the control voltage, and thereby generates the system clock signal. The VCO 76 outputs the system clock signal to the A/D converters 11, 12, and 13, and other devices and circuits within the apparatus. The system clock signal has a frequency equal to a predetermined natural number times the frequency of the bit clock signal.

The apparatus of FIG. 26 includes a peak detector 77 connected between the delay adjuster 20 and the switch 101. The peak detector 77 receives the output signal of the delay adjuster 20. The peak detector 77 calculates the slope (differential) of the level represented by the output signal of the delay adjuster 20 on the basis of two successive samples thereof. The peak detector 77 senses every inversion of the polarity of the calculated slope. The peak detector 77 senses a sample point immediately preceding the sample point corresponding to the sensed polarity inversion. The peak detector 77 sets a peak-point information value PK to "1" for the sensed sample point. The peak detector 77 sets the peak-point information value PK to "0" for the other sample points. Thus, the peak detector 77 generates peak-point information representing the value PK. The peak detector 77 outputs the peak-point information to the switch 101.

Fourteenth Embodiment

Figure 27:
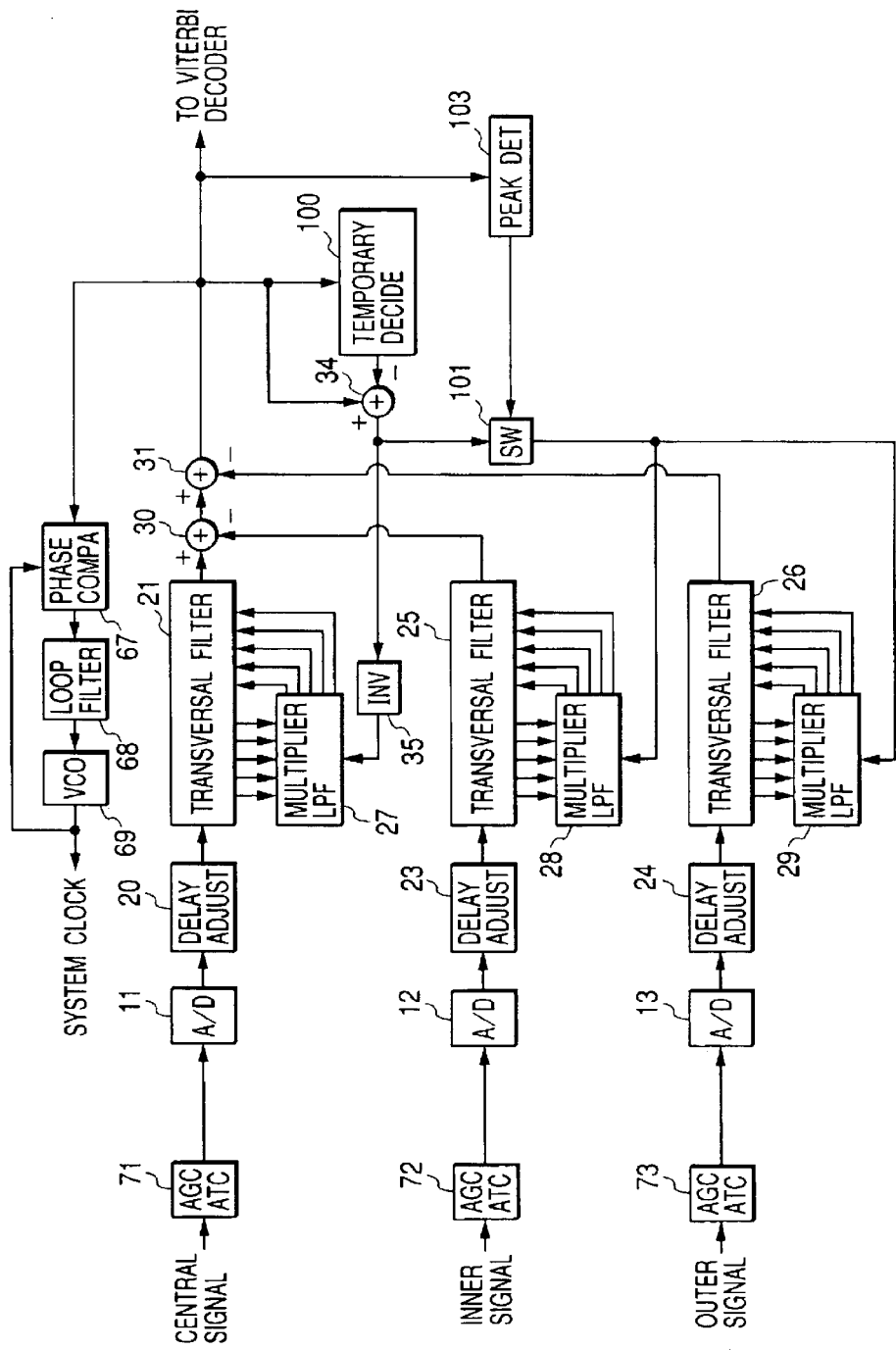
FIG. 27 is a block diagram of an information reproducing apparatus according to a fourteenth embodiment of this invention.

FIG. 27 shows an information reproducing apparatus according to a fourteenth embodiment of this invention. The apparatus of FIG. 27 is similar to the apparatus of FIG. 25 except for design changes mentioned hereafter.

The re-sampling DPLL section 17 and the re-sampling circuits 18 and 19 (see FIG. 25) are omitted from the apparatus of FIG. 27.

The apparatus of FIG. 27 includes an analog AGC/ATC circuit 71 which follows the optical head 10B (see FIG. 1). The analog AGC/ATC circuit 71 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the A/D converter 11. The A/D converter 11 changes the output signal of the analog AGC/ATC circuit 71 into a corresponding digital signal. Specifically, the A/D converter 11 periodically samples the output signal of the analog AGC/ATC circuit 71 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 27 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 27 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 27 includes a peak detection and phase comparison circuit 67, a loop filter 68, and a voltage-controlled oscillator (VCO) 69 which are connected in a closed loop in that order. The circuit 67 is connected to the subtracter 31. The circuit 67 detects every peak point of the output signal of the subtracter 31. The circuit 67 compares the phase of the detected peak point and the phase of a system clock signal fed from the VCO 69, and generates a phase error signal in response to the result of the phase comparison. The circuit 67 outputs the phase error signal to the loop filter 68. The loop filter 68 converts the phase error signal into a control voltage. The loop filter 68 outputs the control voltage to the VCO 69. The VCO 69 oscillates at a frequency determined by the control voltage, and thereby generates the system clock signal. The VCO 69 outputs the system clock signal to the A/D converters 11, 12, and 13, and other devices and circuits within the apparatus. The system clock signal has a frequency equal to a predetermined natural number times the frequency of the bit clock signal.

Fifteenth Embodiment

Figure 28:
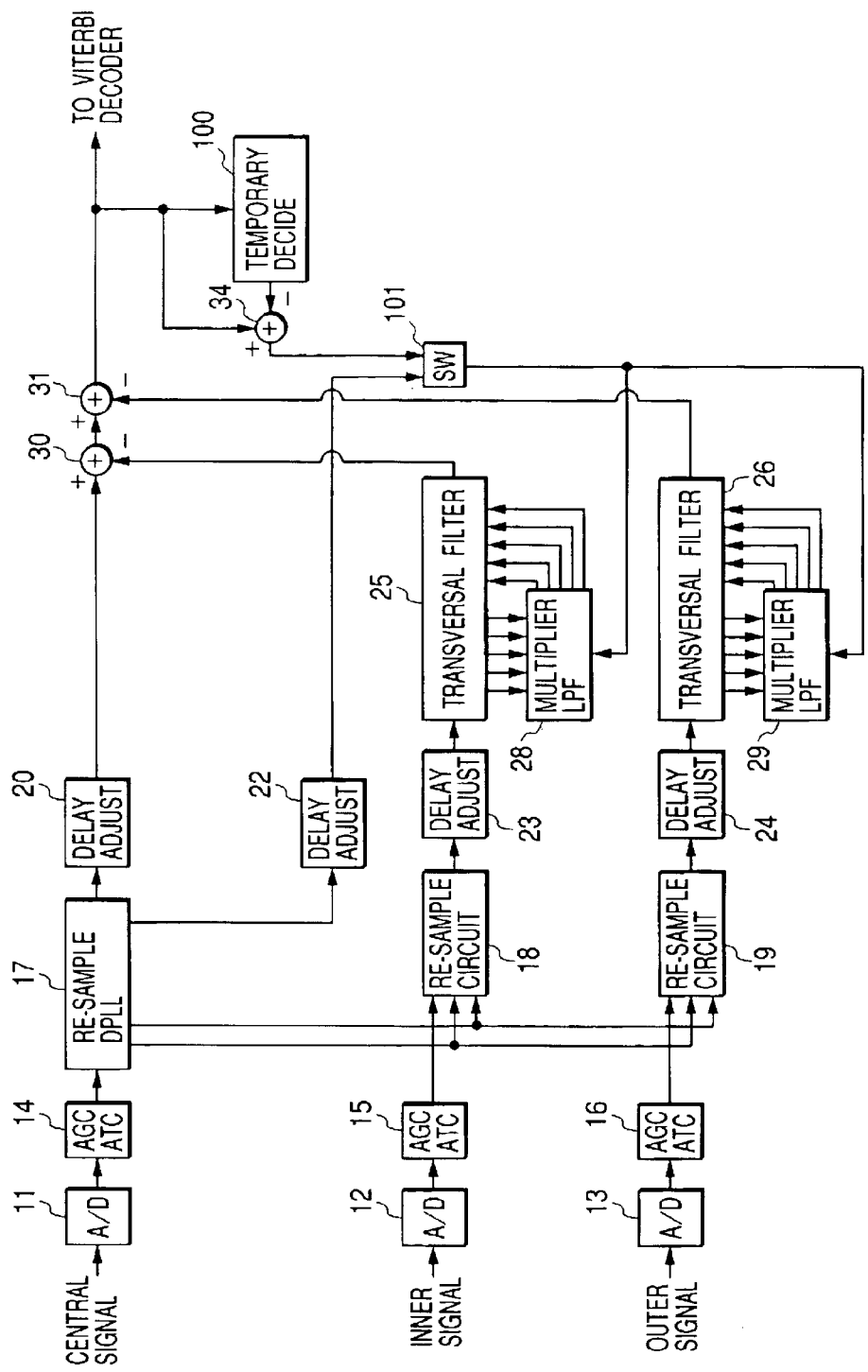
FIG. 28 is a block diagram of an information reproducing apparatus according to a fifteenth embodiment of this invention.

FIG. 28 shows an information reproducing apparatus according to a fifteenth embodiment of this invention. The apparatus of FIG. 28 is similar to the apparatus of FIG. 24 except for design changes mentioned hereafter.

The transversal filter 21, the multiplier and LPF section 27, and the inverter 35 (see FIG. 24) are omitted from the apparatus of FIG. 28. Accordingly, in the apparatus of FIG. 28, the delay adjuster 20 is directly connected to the subtracter 30. The second central digital signal is transmitted from the re-sampling DPLL section 17 to the subtracter 30 via the delay adjuster 20. The device 30 subtracts the output signal of the transversal filter 25 from the output signal of the delay adjuster 20.

The temporary decision circuit 100 may be replaced by a signal generator for producing and outputting a prescribed reference signal representing a target sample peak level (a desired sample peak level).

Sixteenth Embodiment

Figure 29:
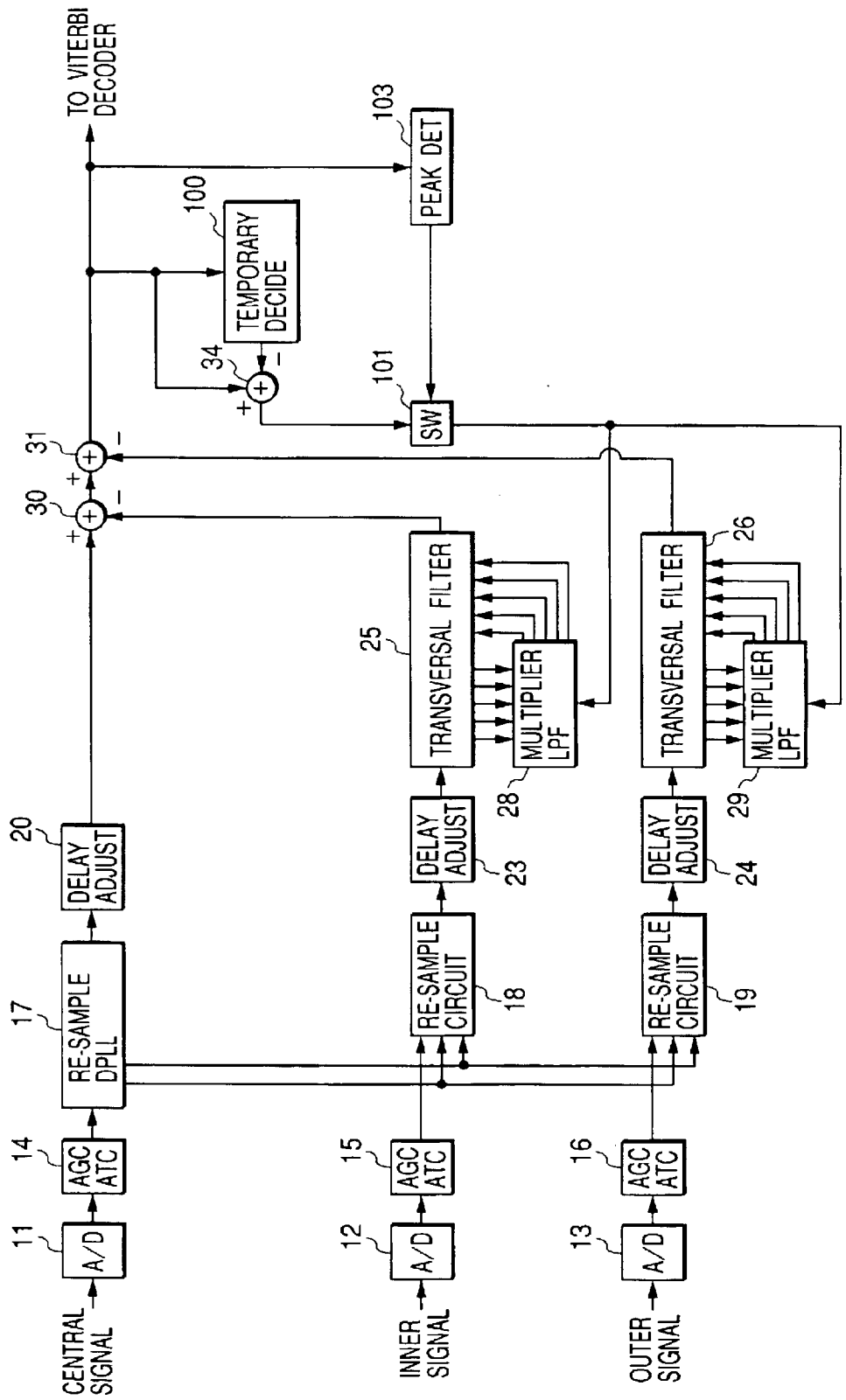
FIG. 29 is a block diagram of an information reproducing apparatus according to a sixteenth embodiment of this invention.

FIG. 29 shows an information reproducing apparatus according to a sixteenth embodiment of this invention. The apparatus of FIG. 29 is similar to the apparatus of FIG. 25 except for design changes mentioned hereafter.

The transversal filter 21, the multiplier and LPF section 27, and the inverter 35 (see FIG. 25) are omitted from the apparatus of FIG. 29. Accordingly, in the apparatus of FIG. 29, the delay adjuster 20 is directly connected to the subtracter 30. The second central digital signal is transmitted from the re-sampling DPLL section 17 to the subtracter 30 via the delay adjuster 20. The device 30 subtracts the output signal of the transversal filter 25 from the output signal of the delay adjuster 20.

The temporary decision circuit 100 may be replaced by a signal generator for producing and outputting a prescribed reference signal representing a target sample peak level (a desired sample peak level).

Seventeenth Embodiment

Figure 30:
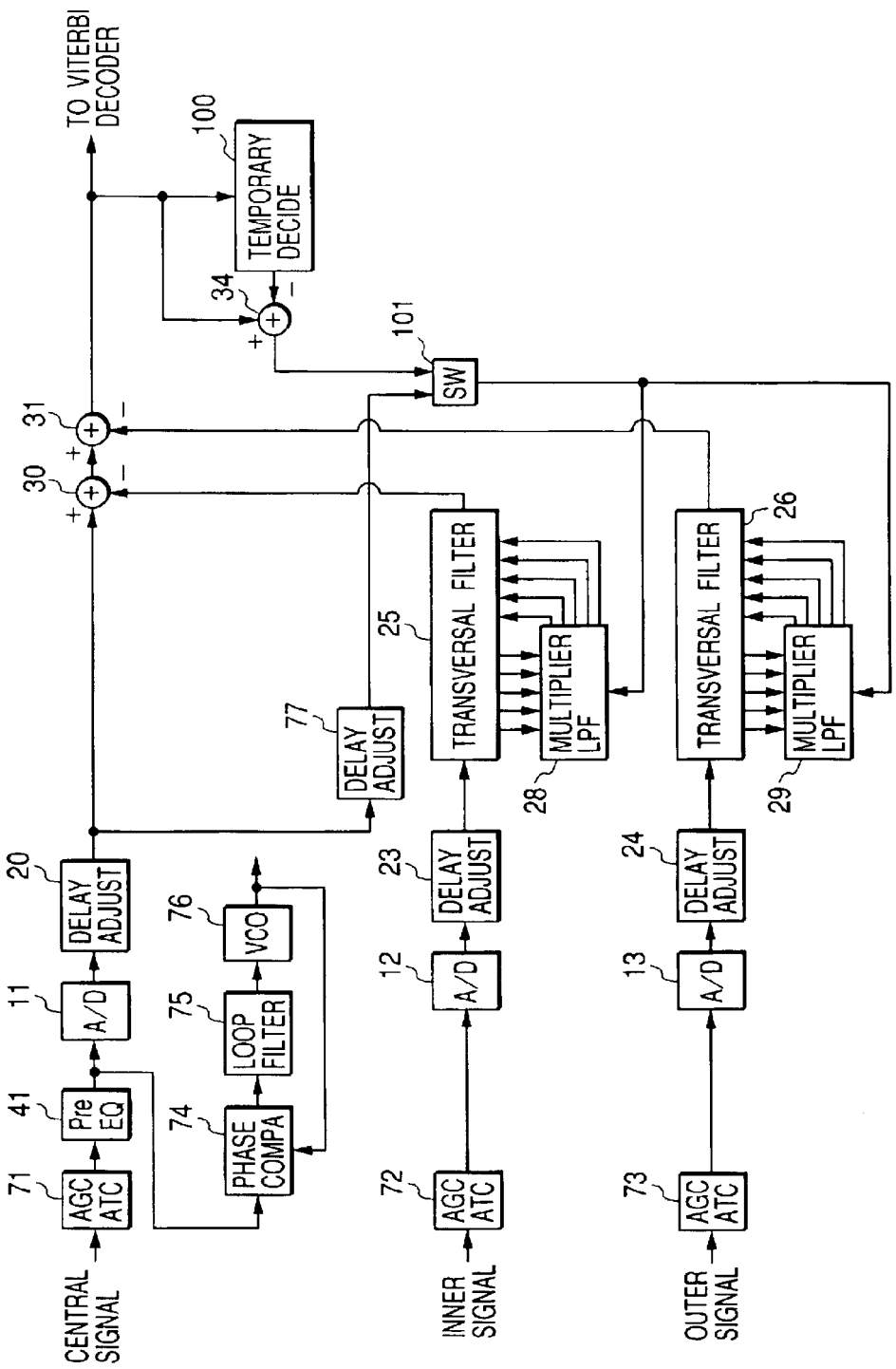
FIG. 30 is a block diagram of an information reproducing apparatus according to a seventeenth embodiment of this invention.

FIG. 30 shows an information reproducing apparatus according to a seventeenth embodiment of this invention. The apparatus of FIG. 30 is similar to the apparatus of FIG. 26 except for design changes mentioned hereafter.

The transversal filter 21, the multiplier and LPF section 27, and the inverter 35 (see FIG. 26) are omitted from the apparatus of FIG. 30. Accordingly, in the apparatus of FIG. 30, the delay adjuster 20 is directly connected to the subtracter 30. The central digital signal is transmitted from the A/D converter 11 to the subtracter 30 via the delay adjuster 20. The device 30 subtracts the output signal of the transversal filter 25 from the output signal of the delay adjuster 20.

The temporary decision circuit 100 may be replaced by a signal generator for producing and outputting a prescribed reference signal representing a target sample peak level (a desired sample peak level).

Eighteenth Embodiment

Figure 31:
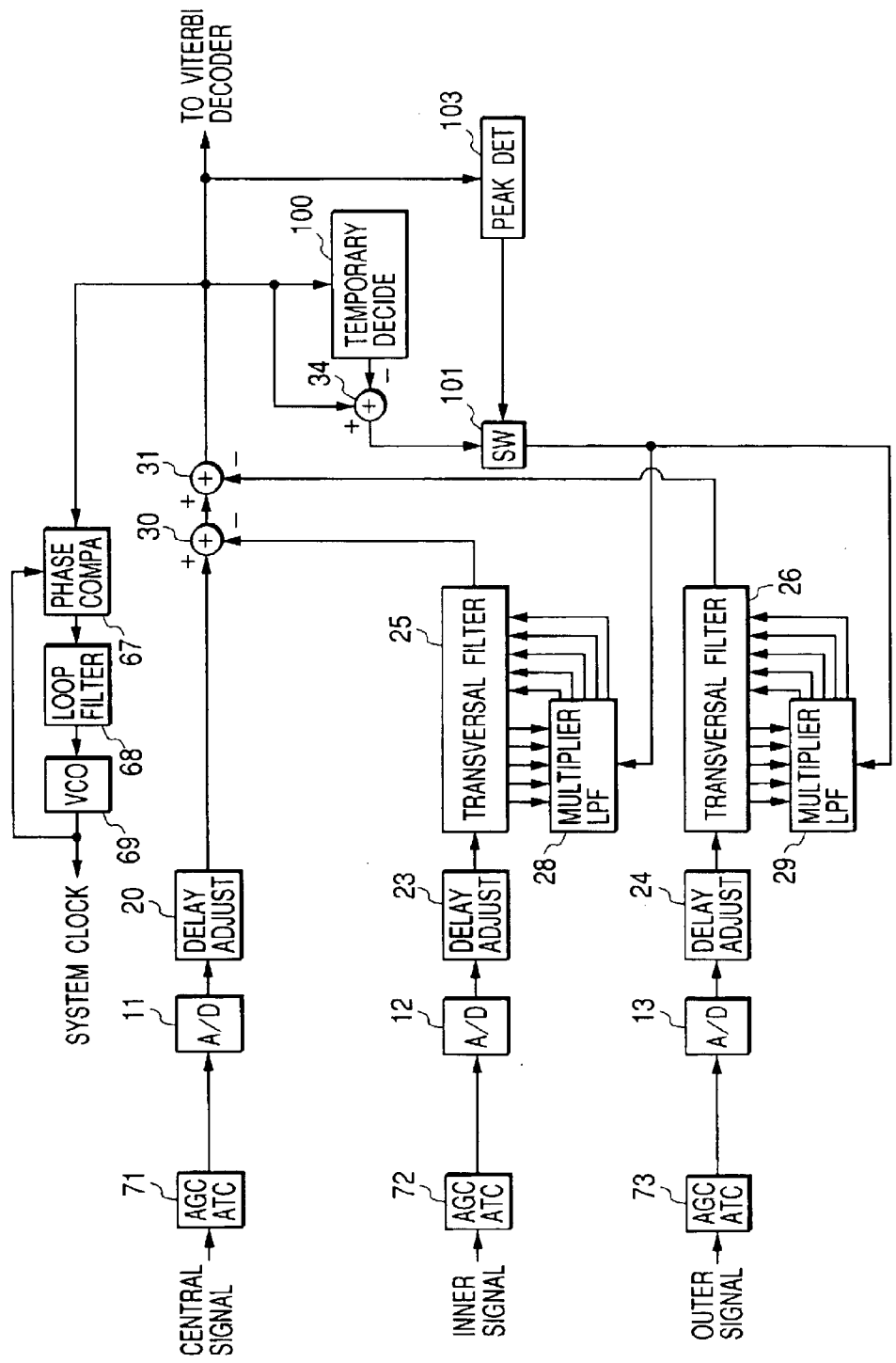
FIG. 31 is a block diagram of an information reproducing apparatus according to an eighteenth embodiment of this invention.

FIG. 31 shows an information reproducing apparatus according to an eighteenth embodiment of this invention. The apparatus of FIG. 31 is similar to the apparatus of FIG. 27 except for design changes mentioned hereafter.

The transversal filter 21, the multiplier and LPF section 27, and the inverter 35 (see FIG. 27) are omitted from the apparatus of FIG. 31. Accordingly, in the apparatus of FIG. 31, the delay adjuster 20 is directly connected to the subtracter 30. The central digital signal is transmitted from the A/D converter 11 to the subtracter 30 via the delay adjuster 20. The device 30 subtracts the output signal of the transversal filter 25 from the output signal of the delay adjuster 20.

The temporary decision circuit 100 may be replaced by a signal generator for producing and outputting a prescribed reference signal representing a target sample peak level (a desired sample peak level).

Nineteenth Embodiment

An information reproducing apparatus in a nineteenth embodiment of this invention is a modification of the apparatus of FIG. 1. In the apparatus of the nineteenth embodiment of this invention, the delay adjusters 20, 23, and 24 are located at stages immediately preceding the AGC/ATC circuits 14, 15, and 16, respectively. It should be noted that the delay adjusters 20, 23, and 24 may be omitted.

Twentieth Embodiment

An information reproducing apparatus in a twentieth embodiment of this invention is a modification of the apparatus in one of the first to nineteenth embodiments thereof. One of the two apparatus portions for generating the pseudo crosstalk signals is omitted from the apparatus of the twentieth embodiment of this invention.

The apparatus of the twentieth embodiment of this invention includes a tilt sensor for detecting an angle of the application of the forward laser beams to the optical disc 10A (see FIG. 1). The apparatus also includes a decision circuit (or a comparator) for deciding which of the inner and outer readout signals outputted from the optical head 10B (see FIG. 1) is richer in crosstalk components on the basis of the output signal of the tilt sensor. The decision circuit outputs a signal representing the result of the decision. The apparatus further includes a switch for selecting one of the inner and outer readout signals in response to the output signal of the decision circuit, and for feeding the selected readout signal to the apparatus portion for generating the pseudo crosstalk signal. Specifically, the switch selects one of the inner and outer readout signals which is decided to be richer in crosstalk components.

Twenty-First Embodiment

In general, the waveforms of signals reproduced from optical discs are of two types, that is, an integral type and a differential type (a derivative type). A twenty-first embodiment of this invention is designed to handle not only an integral-type reproduced signal but also a differential-type reproduced signal. The integral-type reproduced signal and the differential-type reproduced signal handled by the twenty-first embodiment of this invention may originate from first information and second information recorded on a single optical disc.

Figure 32:
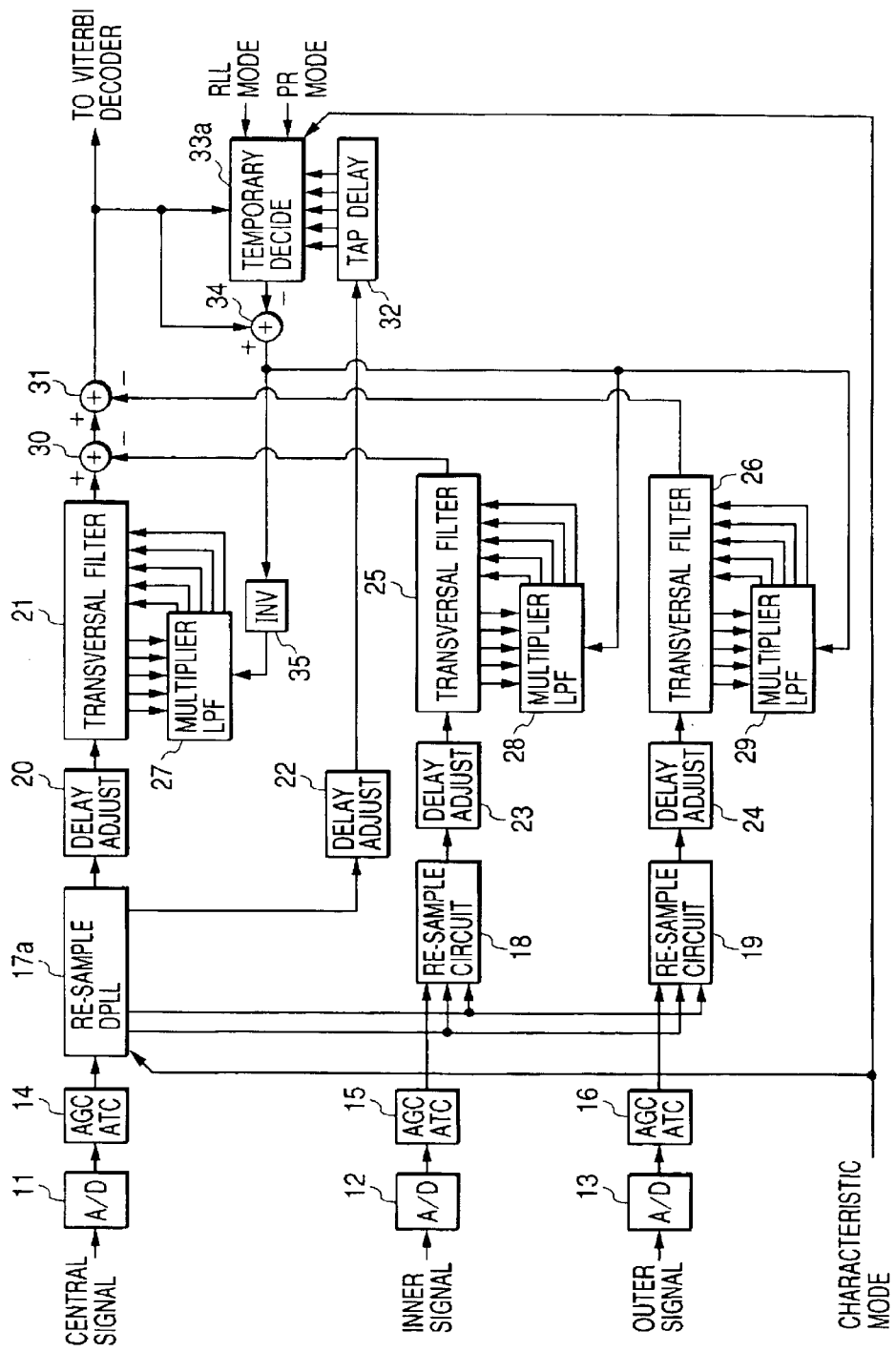
FIG. 32 is a block diagram of an information reproducing apparatus according to a twenty-first embodiment of this invention.

FIG. 32 shows an information reproducing apparatus according to the twenty-first embodiment of this invention. The apparatus of FIG. 32 is similar to the apparatus of FIG. 1 except that a re-sampling DPLL section 17a and a temporary decision circuit 33a replace the re-sampling DPLL section 17 and the temporary decision circuit 33 (see FIG. 1) respectively.

The re-sampling DPLL section 17a and the temporary decision circuit 33a receive a characteristic mode signal from a suitable device (not shown). The characteristic mode signal indicates whether the waveform of a signal reproduced from the optical disc 10A (see FIG. 1) is of the integral type or the differential type. The re-sampling DPLL section 17a and the temporary decision circuit 33a respond to the characteristic mode signal. Thus, the operation of the re-sampling DPLL section 17a and the temporary decision circuit 33a is controlled depending on whether the waveform of a signal reproduced from the optical disc 10A is of the integral type or the differential type.

The re-sampling DPLL section 17a converts the output signal of the AGC/ATC circuit 14 (the first central digital signal) into a second central digital signal by a re-sampling process. A timing related to samples of the output signal of the AGC/ATC circuit 14 (the first central digital signal) is determined by the system clock signal. A timing related to samples of the second central digital signal is determined by the bit clock signal. During the re-sampling process, the re-sampling DPLL section 17a generates samples of the second central digital signal from samples of the first central digital signal through at least one of interpolation and decimation.

The re-sampling DPLL section 17a includes two digital PLL (phase locked loop) circuits each having a closed loop. Each of the two digital PLL circuits generates a second central digital signal on the basis of the output signal of the AGC/ATC circuit 14 (the first central digital signal). The second central digital signal relates to a sampling frequency equal to a bit clock frequency. Specifically, samples of the second central digital signal are generated from samples of the output signal of the AGC/ATC circuit 14 through a PLL re-sampling process based on at least one of interpolation and decimation.

The two digital PLL circuits in the re-sampling DPLL section 17a include a zero-cross detector and a peak detector, respectively. One of the second central digital signals generated by the respective digital PLL circuits is selected in response to the characteristic mode signal. Specifically, the second central digital signal generated by the digital PLL circuit including the zero-cross detector is selected when the characteristic mode signal indicates that the waveform of a signal reproduced from the optical disc 10A is of the integral type. The second central digital signal generated by the digital PLL circuit including the peak detector is selected when the characteristic mode signal indicates that the waveform of a signal reproduced from the optical disc 10A is of the differential type. The re-sampling DPLL section 17a outputs the selected second central digital signal to the delay adjuster 20. The selected second central digital signal is transmitted via the delay adjuster 20 to the transversal filter 21.

The zero-cross detector in the corresponding digital PLL circuit within the re-sampling DPLL section 17a senses every point (every zero-cross point) at which the level represented by a stream of 0°-phase-point data samples (mentioned later) crosses a zero level. The zero-cross detector generates 0-point information representative of every sensed point. Specifically, the zero-cross detector decides whether or not every 0°-phase-point data sample corresponds to a zero-cross point. The zero-cross detector generates 0-point information in response to the result of the decision. The value Z represented by the 0-point information is "1" for each data sample corresponding to a zero-cross point. The 0-point information value Z is "0" for other data samples. In the present digital PLL circuit within the re-sampling DPLL section 17a, the timing of the re-sampling or the frequency and phase of the re-sampling are locked so that the levels represented by zero-cross-point-corresponding samples of the second central digital signal will be equal to "0".

The peak detector in the corresponding digital PLL circuit within the re-sampling DPLL section 17a senses every point (every peak point) at which the level represented by the second central digital signal (the re-sampling-resultant signal) peaks in a positive side or a negative side. The peak detector generates peak-point information representative of every sensed point. Specifically, the peak detector decides whether or not every sample of the second central digital signal corresponds to a positive or negative peak. Here, "negative peak" means "valley". The result of the decision is used in generating the peak-point information. The value PK represented by the peak-point information is "1" for each data sample corresponding to a positive or negative peak. The peak-point information value PK is "0" for other data samples. In the present digital PLL circuit within the re-sampling DPLL section 17a, the timing of the re-sampling or the frequency and phase of the re-sampling are locked so that the levels represented by positive-peak-point-corresponding samples of the second central digital signal will be maximized and the levels represented by negative-peak-point-corresponding samples of the second central digital signal will be minimized.

In the re-sampling DPLL section 17a, one of the 0-point information and the peak-point information generated by the zero-cross detector and the peak detector is selected in response to the characteristic mode signal. Specifically, when the characteristic mode signal indicates that the waveform of a signal reproduced from the optical disc 10A is of the integral type, the 0-point information is selected. In this case, the re-sampling DPLL section 17a outputs the 0-point information to the delay adjuster 22 as point information. The point information is transmitted via the delay adjuster 22 to the tap delay circuit 32. On the other hand, when the characteristic mode signal indicates that the waveform of a signal reproduced from the optical disc 10A is of the differential type, the peak-point information is selected. In this case, the re-sampling DPLL section 17a outputs the peak-point information to the delay adjuster 22 as point information. The point information is transmitted via the delay adjuster 22 to the tap delay circuit 32.

In the re-sampling DPLL section 17a, the digital PLL circuit including the zero-cross detector generates a first bit clock signal and a first parameter signal indicative of a first parameter T_ratio equal to an internal division ratio related to re-sampling. Generally, the first bit clock signal is a punctured clock signal. The digital PLL circuit including the peak detector generates a second bit clock signal and a second parameter signal indicative of a second parameter T_ratio equal to an internal division ratio related to re-sampling. Generally, the second bit clock signal is a punctured clock signal.

In the re-sampling DPLL section 17a, one of the first and second bit clock signals is selected in response to the characteristic mode signal. Specifically, when the characteristic mode signal indicates that the waveform of a signal reproduced from the optical disc 10A is of the integral type, the first bit clock signal is selected. When the characteristic mode signal indicates that the waveform of a signal reproduced from the optical disc 10A is of the differential type, the second bit clock signal is selected. The re-sampling DPLL section 17a outputs the selected bit clock signal to the re-sampling circuits 18 and 19.

In the re-sampling DPLL section 17a, one of the first and second parameter signals is selected in response to the characteristic mode signal. Specifically, when the characteristic mode signal indicates that the waveform of a signal reproduced from the optical disc 10A is of the integral type, the first parameter signal is selected. When the characteristic mode signal indicates that the waveform of a signal reproduced from the optical disc 10A is of the differential type, the second parameter signal is selected. The re-sampling DPLL section 17a outputs the selected parameter signal to the re-sampling circuits 18 and 19.

Figure 33:
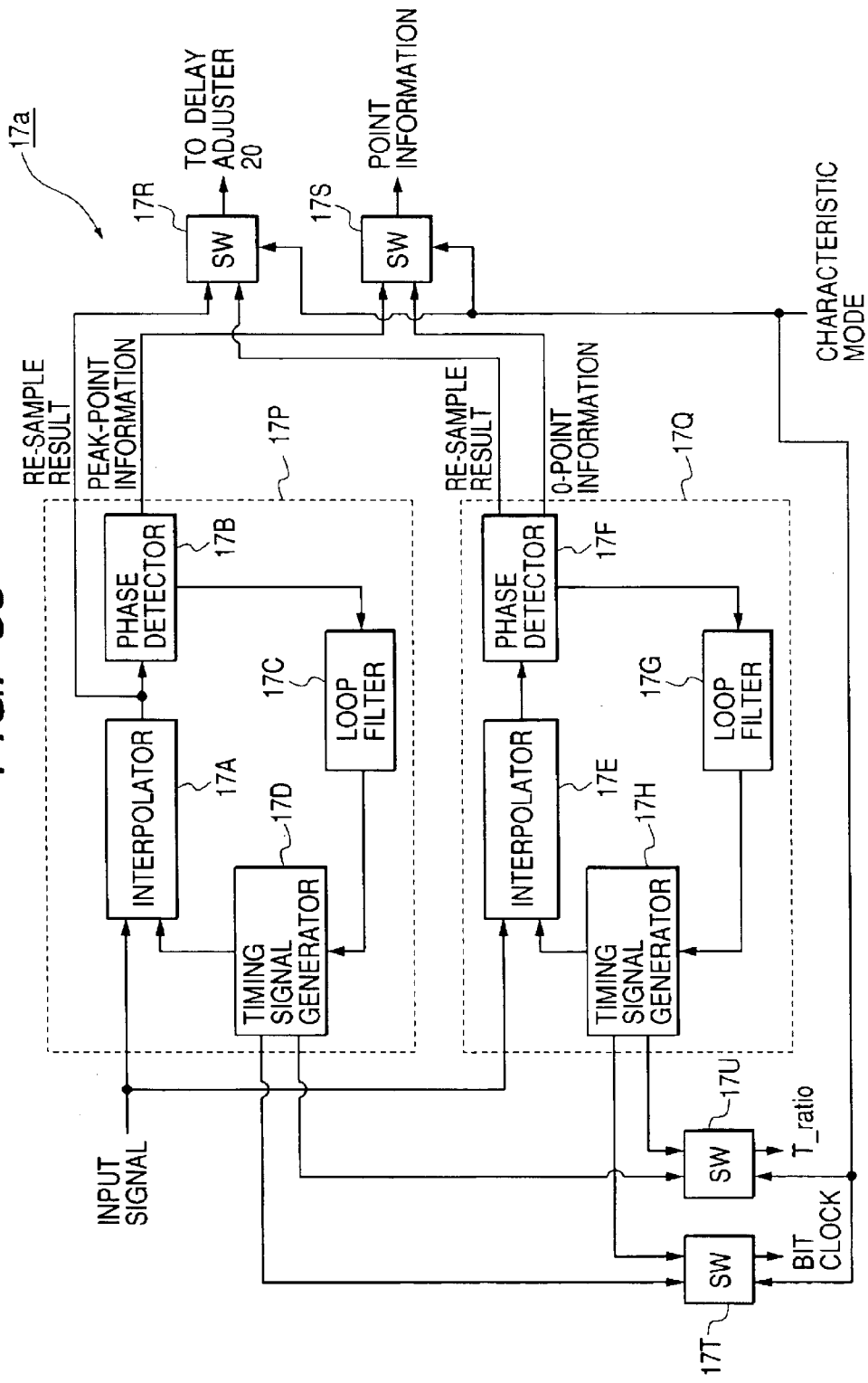
FIG. 33 is a block diagram of a re-sampling DPLL section in FIG. 32.

As shown in FIG. 33, the re-sampling DPLL section 17a includes a first PLL circuit 17P, a second PLL circuit 17Q, and switches 17R, 17S, 17T, and 17U. The first and second PLL circuits 17P and 17Q follow the AGC/ATC circuit 14. The first and second PLL circuits 17P and 17Q are connected to the switches 17R, 17S, 17T, and 17U. The switch 17R is connected to the delay adjuster 20. The switch 17S is connected to the delay adjuster 22. The switches 17T and 17U are connected to the re-sampling circuits 18 and 19.

The first PLL circuit 17P in the re-sampling DPLL section 17a includes an interpolator 17A, a phase detector 17B, a loop filter 17C, and a timing signal generator 17D which are connected in a closed loop in that order. The interpolator 17A is connected to the AGC/ATC circuit 14. The interpolator 17A receives the output signal of the AGC/ATC circuit 14. The first PLL circuit 17P is similar in structure and operation to the re-sampling DPLL section 17 in FIG. 4. Thus, the first PLL circuit 17P generates a second central digital signal, peak-point information, a bit clock signal, and a parameter signal on the basis of the output signal of the AGC/ATC circuit 14. The first PLL circuit 17P outputs the second central digital signal to the switch 17R. The first PLL circuit 17P outputs the peak-point information to the switch 17S. The first PLL circuit 17P outputs the bit clock signal to the switch 17T. The first PLL circuit 17P outputs the parameter signal to the switch 17U.

The second PLL circuit 17Q in the re-sampling DPLL section 17a includes an interpolator 17E, a phase detector 17F, a loop filter 17G, and a timing signal generator 17H which are connected in a closed loop in that order. The interpolator 17E is connected to the AGC/ATC circuit 14. The interpolator 17E receives the output signal of the AGC/ATC circuit 14. The interpolator 17E receives data point phase information and a bit clock signal from the timing signal generator 17H. The interpolator 17E estimates 0°-phase-point data samples from samples of the output signal of the AGC/ATC circuit 14 through interpolation responsive to the data point phase information and the bit clock signal. Here, "phase" is defined relative to the bit clock signal. The interpolator 17E outputs the estimated 0°-phase-point data samples to the phase detector 17F.

In the second PLL circuit 17Q, the phase detector 17F generates 180°-phase-point data samples from the 0°-phase-point data samples. Specifically, the phase detector 17F calculates a mean of a current 0°-phase-point data sample and an immediately preceding 0°-phase-point data sample, and uses the calculated mean as a current 180°-phase-point data sample. The phase detector 17F outputs the 180°-phase-point data samples to the switch 17R as a second central digital signal. The phase detector 17F includes a zero-cross detector for sensing zero-cross points from the 0°-phase-point data samples. The phase detector 17F detects a phase error in response to each of the sensed zero-cross points. Specifically, the zero-cross detector in the phase detector 17F senses a zero-cross point by referring to a current 0°-phase-point data sample and an immediately preceding 0°-phase-point data sample. When a zero-cross point is sensed, the phase detector 17F multiplies the polarity of the immediately preceding 0°-phase-point data sample by a mean of the current 0°-phase-point data sample and the immediately preceding 0°-phase-point data sample. The phase detector 17F uses the multiplication result as a phase error. The zero-cross detector in the phase detector 17F generates 0-point information representing the sensed zero-cross points. The phase detector 17F outputs the 0-point information to the switch 17S. The phase detector 17F generates a signal representing the phase error. The phase detector 17F outputs the phase error signal to the loop filter 17G. The loop filter 17G integrates the phase error signal. The loop filter 17G outputs the integration-resultant signal to the timing signal generator 17H. The timing signal generator 17H produces the data point phase information and the bit clock signal in response to the output signal of the loop filter 17G. Thus, the data point phase information and the bit clock signal are controlled in response to the phase error signal, that is, each sensed zero-cross point. This control is designed to implement frequency and phase lock. Specifically, the frequency and phase of the re-sampling by the interpolator 17E are locked so that the levels represented by zero-cross-point-corresponding samples of the second digital signal will be equal to "0".

The timing signal generator 17H outputs the bit clock signal to the switch 17T. The timing signal generator 17H produces a parameter signal indicative of a parameter T_ratio on the basis of the data point phase information. The timing signal generator 17H may use the data point phase information as the parameter signal. The timing signal generator 17H outputs the parameter signal to the switch 17U.

The interpolator 17E may generate the bit clock signal in response to the data point phase information fed from the timing signal generator 17H. In this case, the interpolator 17E outputs the bit clock signal to the switch 17T.

The switch 17R receives the second central digital signals from the first and second PLL circuits 17P and 17Q. The switch 17R receives the characteristic mode signal. The switch 17R selects one of the second central digital signals in response to the characteristic mode signal. Specifically, the switch 17R selects the second central digital signal from the first PLL circuit 17P when the characteristic mode signal indicates that the waveform of a signal reproduced from the optical disc 10A is of the differential type. The switch 17R selects the second central digital signal from the second PLL circuit 17Q when the characteristic mode signal indicates that the waveform of a signal reproduced from the optical disc 10A is of the integral type. The switch 17R outputs the selected second central digital signal to the delay adjuster 20. The selected second central digital signal is transmitted via the delay adjuster 20 to the transversal filter 21.

The switch 17S receives the peak-point information from the first PLL circuit 17P. The switch 17S receives the 0-point information from the second PLL circuit 17Q. The switch 17S receives the characteristic mode signal. The switch 17S selects either the peak-point information or the 0-point information in response to the characteristic mode signal. Specifically, the switch 17S selects the peak-point information when the characteristic mode signal indicates that the waveform of a signal reproduced from the optical disc 10A is of the differential type. The switch 17S selects the 0-point information when the characteristic mode signal indicates that the waveform of a signal reproduced from the optical disc 10A is of the integral type. The switch 10A outputs the selected point information to the delay adjuster 22. The selected point information is transmitted via the delay adjuster 22 to the tap delay circuit 32.

The switch 17T receives the bit clock signals from the first and second PLL circuits 17P and 17Q. The switch 17T receives the characteristic mode signal. The switch 17T selects one of the bit clock signals in response to the characteristic mode signal. Specifically, the switch 17T selects the bit clock signal from the first PLL circuit 17P when the characteristic mode signal indicates that the waveform of a signal reproduced from the optical disc 10A is of the differential type. The switch 17T selects the bit clock signal from the second PLL circuit 17Q when the characteristic mode signal indicates that the waveform of a signal reproduced from the optical disc 10A is of the integral type. The switch 17T outputs the selected bit clock signal to the re-sampling circuits 18 and 19.

The switch 17U receives the parameter signals from the first and second PLL circuits 17P and 17Q. The switch 17U receives the characteristic mode signal. The switch 17U selects one of the parameter signals in response to the characteristic mode signal. Specifically, the switch 17U selects the parameter signal from the first PLL circuit 17P when the characteristic mode signal indicates that the waveform of a signal reproduced from the optical disc 10A is of the differential type. The switch 17U selects the parameter signal from the second PLL circuit 17Q when the characteristic mode signal indicates that the waveform of a signal reproduced from the optical disc 10A is of the integral type. The switch 17U outputs the selected parameter signal to the re-sampling circuits 18 and 19.

The transversal filter 21, the multiplier and LPF section 27, the subtracters 30 and 31, the tap delay circuit 32, the temporary decision circuit 33a, the subtracter 34, and the inverter 35 compose an adaptive equalization circuit which follows the delay adjusters 20 and 22. The adaptive equalization circuit subjects the output signal of the delay adjuster 20 to automatic waveform equalization in response to the characteristic mode signal and the point information fed from the delay adjuster 22. The automatic waveform equalization corresponds to a process of providing the signal in question with a partial-response (PR) characteristic determined by the characteristic mode signal. The adaptive equalization circuit outputs the equalization-resultant signal to the viterbi decoder (not shown).

In the adaptive equalization circuit, the transversal filter 21 implements waveform equalization responsive to tap coefficients. The temporary decision circuit 33a implements a temporary decision about the output signal of the sub-tracter 31 in response to the characteristic mode signal, the point information, the RLL mode signal, and the PR mode signal. The temporary decision circuit 33a outputs a signal representative of the result of the temporary decision to the subtracter 34. The equalization-resultant signal is transmitted from the transversal filter 21 to the subtracter 34 via the subtracters 30 and 31. The subtracter 34 generates an error signal between the temporary decision result signal and the equalization-resultant signal. The error signal is transmitted from the subtracter 34 to the transversal filter 21 via the inverter 35. The tap coefficients used by the transversal filter 21 are controlled in response to the error signal on a feedback basis so as to nullify or minimize the error signal.

The temporary decision circuit 33a receives the characteristic mode signal. The temporary decision circuit 33a responds to the characteristic mode signal. In other points, the temporary decision circuit 33a is basically similar to the temporary decision circuit 33 (see FIG. 1).

Figure 34:
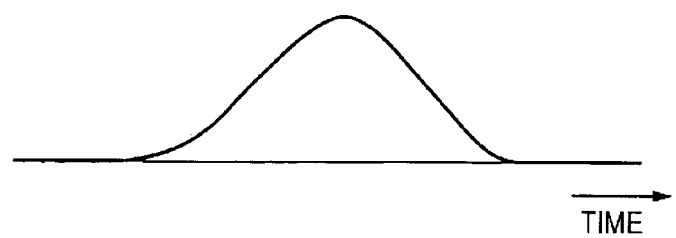
FIG. 34 is a time-domain diagram of an example of an integral-type isolated waveform.
Figure 35:
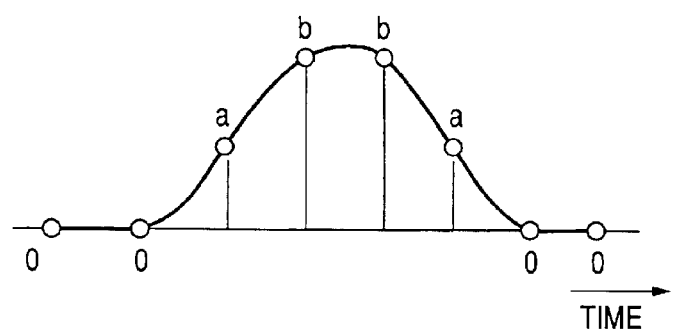
FIG. 35 is a time-domain diagram of a waveform (an equalization-resultant waveform) which results from equalization of the integral-type isolated waveform in FIG. 34.
Figure 36:
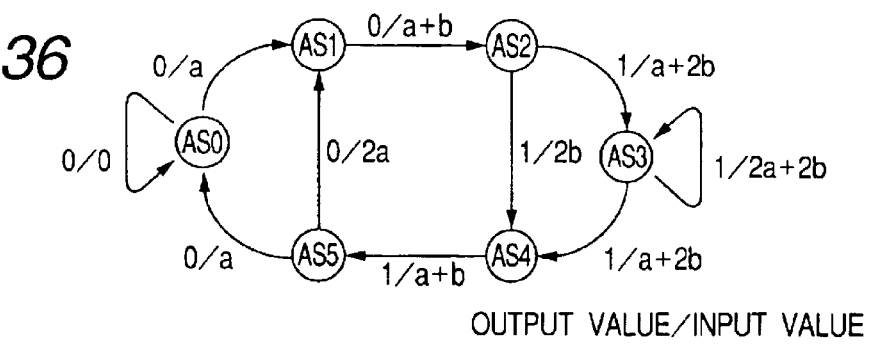
FIG. 36 is a diagram of signal state transitions regarding a partial-response (PR) characteristic and a run-length-limited (RLL) code corresponding to PR (a, b, b, a) and RLL (1, X) respectively.

Integral-type partial-response (PR) characteristics will be explained below. When an integral-type isolated waveform in FIG. 34 is subjected to equalization accorded with the characteristic of PR (a, b, b, a), the equalization-resultant waveform in FIG. 35 is provided. A waveform resulting from the PR (a, b, b, a) equalization of a continuous waveform takes one of seven different values, that is, "0", "a", "a+b", "2a", "2b", "a+2b", and "2a+2b". It is assumed that the 7-value signal of the (1, X) run-length-limited code is inputted into a viterbi decoder. The state of a current sample of an original signal (an input value) and the state of a current sample of a reproduced signal (an output value) resulting from PR equalization are restricted by the states of previous samples. In the input signal, two successive samples of "1" will not occur. FIG. 36 shows signal state transitions available in this case.

In FIG. 36, AS0, AS1, AS2, AS3, AS4, and AS5 denote signal states determined by immediately-preceding output values. Transitions from the state AS2 will be taken as an example. When the input value is "a+2b", the output value becomes "1" and a transition to the state AS3 from the state AS2 occurs. When the input value is "2b", the output value becomes "1" and a transition to the state AS4 from the state AS2 occurs. Under normal conditions, regarding the state AS2, the input value different from "a+2b" and "2b" does not occur. Thus, the input value different from "a+2b" and "2b" is an error.

Figure 37:
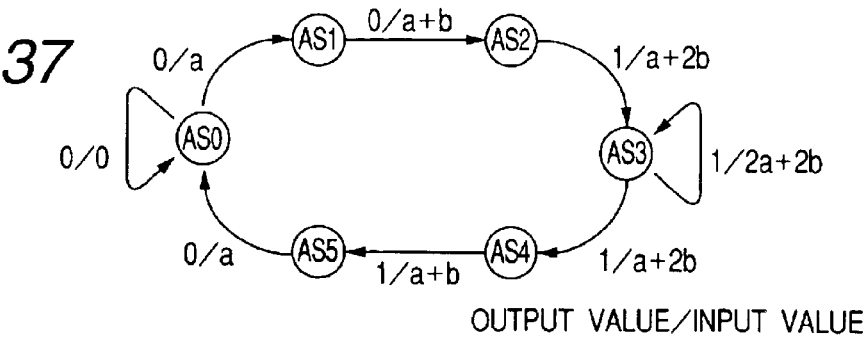
FIG. 37 is a diagram of signal state transitions regarding a partial-response (PR) characteristic and a run-length-limited (RLL) code corresponding to PR (a, b, b, a) and RLL (2, X) respectively.

FIG. 37 shows signal state transitions available in the case of a (2, X) run-length-limited code rather than the (1, X) run-length-limited code. The signal state transitions in FIG. 37 include neither a transition from the state AS5 to the state AS1 nor a transition from the state AS2 to the state AS4.

FIG. 38 shows the relation among the integral-type PR mode, the RLL mode (the run-length-limited mode), and the decision result value outputted from the temporary decision circuit 33a. The integral-type PR mode is represented by the PR mode signal inputted into the temporary decision circuit 33a.

With reference to FIG. 38, the integral-type PR mode can be changed among identification numbers "1", "2", "3", "4", "5", and "6" assigned to PR (1, 1), PR (1, 1, 1, 1), PR (1, 2, 2, 1), PR (1, 3, 3, 1), PR (2, 3, 3, 2), and PR (3, 4, 4, 3) respectively. The RLL mode can be changed between RLL (1, X) and RLL (2, X). Here, RLL (1, X) means run-length limiting rules such that the minimum transition interval is equal to "2", and the maximum transition interval is equal to a given value X depending on the modulation format. On the other hand, RLL (2, X) means run-length limiting rules such that the minimum transition interval is equal to "3", and the maximum transition interval is equal to a given value X depending on the modulation format.

In the case of RLL (1, X), the waveform resulting from the PR (a, b, b, a) equalization takes one of seven different values "0", "a", "a+b", "2a", "2b", "a+2b", and "2a+2b". In FIG. 38, the decision result values outputted from the temporary decision circuit 33a in correspondence with these values "0", "a", "a+b", "2a", "2b", "a+2b", and "2a+2b" are listed for PR (1, 2, 2, 1), PR (1, 3, 3, 1), PR (2, 3, 3, 2), and PR (3, 4, 4, 3). Each of the related cells indicates two decision result values, that is, a left-hand value and a right-hand value. The left-hand value is a non-offset decision result value while the right-hand value is a decision result value provided by an offset for equalizing the central value "a+b" to "0". The decision result values for RLL (2, X) are similar to those for RLL (1, X) except for the following point. In the case of RLL (2, X), the equalization-resultant waveform takes neither the value "2a" nor the value "2b". Accordingly, the decision result values corresponding to the values "2a" and "2b" are absent from the case of RLL (2, X).

In FIG. 38, PR (1, 1) means PR (a, b, b, a) in which a=0 and b=1. The gain or gain factor G is a multiplication coefficient A/(a+b)* for normalizing the maximum (a+b)* of the absolute after-offset decision result value, where "A" denotes an arbitrary level.

The PR mode signal inputted into the temporary decision circuit 33a represents not only the integral-type PR mode but also the differential-type PR mode. Examples of the differential-type PR mode are PR (1, −1), PR (1, 1, −1, −1), PR (1, 2, −2, −1), PR (1, 3, −3, −1), PR (2, 3, −3, −2), and PR (3, 4, −4, −3). The relation among the differential-type PR mode, the RLL mode, and the decision result value outputted from the temporary decision circuit 33a is similar to that in the first embodiment of this invention (see FIG. 10).

With reference back to FIG. 32, the temporary decision circuit 33a receives the output signal of the subtracter 31. The temporary decision circuit 33a receives the output signals of the tap delay circuit 32 which represent successive samples of the selected point information. The temporary decision circuit 33a receives the PR mode signal and the RLL mode signal. The temporary decision circuit 33a implements a temporary decision in response to the received signals according to an algorithm. As previously mentioned, the temporary decision circuit 33a receives the characteristic mode signal. The temporary decision algorithm is changed between one for an integral-type reproduced signal and one for a differential-type reproduced signal in response to the characteristic mode signal. Specifically, the integral-type-signal algorithm is used in the temporary decision circuit 33a when the characteristic mode signal indicates that the waveform of a signal reproduced from the optical disc 10A is of the integral type. The differential-type-signal algorithm is used in the temporary decision circuit 33a when the characteristic mode signal indicates that the waveform of a signal reproduced from the optical disc 10A is of the differential type.

The differential-type-signal algorithm used in the temporary decision circuit 33a is similar to that in the first embodiment of this invention (see FIG. 11).

In the case of an integral-type reproduced signal, the re-sampling DPLL section 17a outputs the 0-point information to the delay adjuster 22, and the 0-point information is transmitted via the delay adjuster 22 to the tap delay circuit 32. The 0-point information whose value Z is "1" indicates a zero-cross point. The 0-point information value Z being "1" corresponds to the value "a+b" in FIG. 36, and occurs in the transition from the state AS1 to the state AS2 and the transition from the state AS4 to the state AS5. In FIG. 36, transitions from the right-hand states AS2, AS3, and AS4 pass through positive values ("a+2b", "2a+2b", and "2b" when normalization is done so that a+b=0), while transitions from the left-hand states AS0, AS1, and AS5 pass through negative values ("0", "a", and "2a" when normalization is done so that a+b=0). Therefore, a decision as to whether the zero-cross point is in a positive-going path or a negative-going path can be implemented by referring to a value temporally preceding or following the zero-cross point.

In the case where the interval from one zero-cross point to the next zero-cross point is known, or in the case where the number of transitions occurring for the interval from the state AS2 to the state AS5 or the interval from the state AS5 to the state AS2 is known, the path is settled and hence values to be taken at respective sample points are definite.

In FIG. 36, the values different from "a+b" do not correspond to the zero-cross point. For the values different from "a+b", the 0-point information value Z is equal to "0". Two or more zero-cross points (Z=1) will not occur in succession. In the case of RLL (1, X, at least one "0" point (Z=0 point) exists between two adjacent zero-cross points (Z=1). For example, the 0-point information value Z changes as 1→0→1 (the state changes as AS2→AS4→AS5 or AS5→AS1→AS2). In the case of RLL (2, X), at least two "0" points (Z=0 points) exist between two adjacent zero-cross points (Z=1) since the values "2a" and "2b" are absent.

Figure 39:
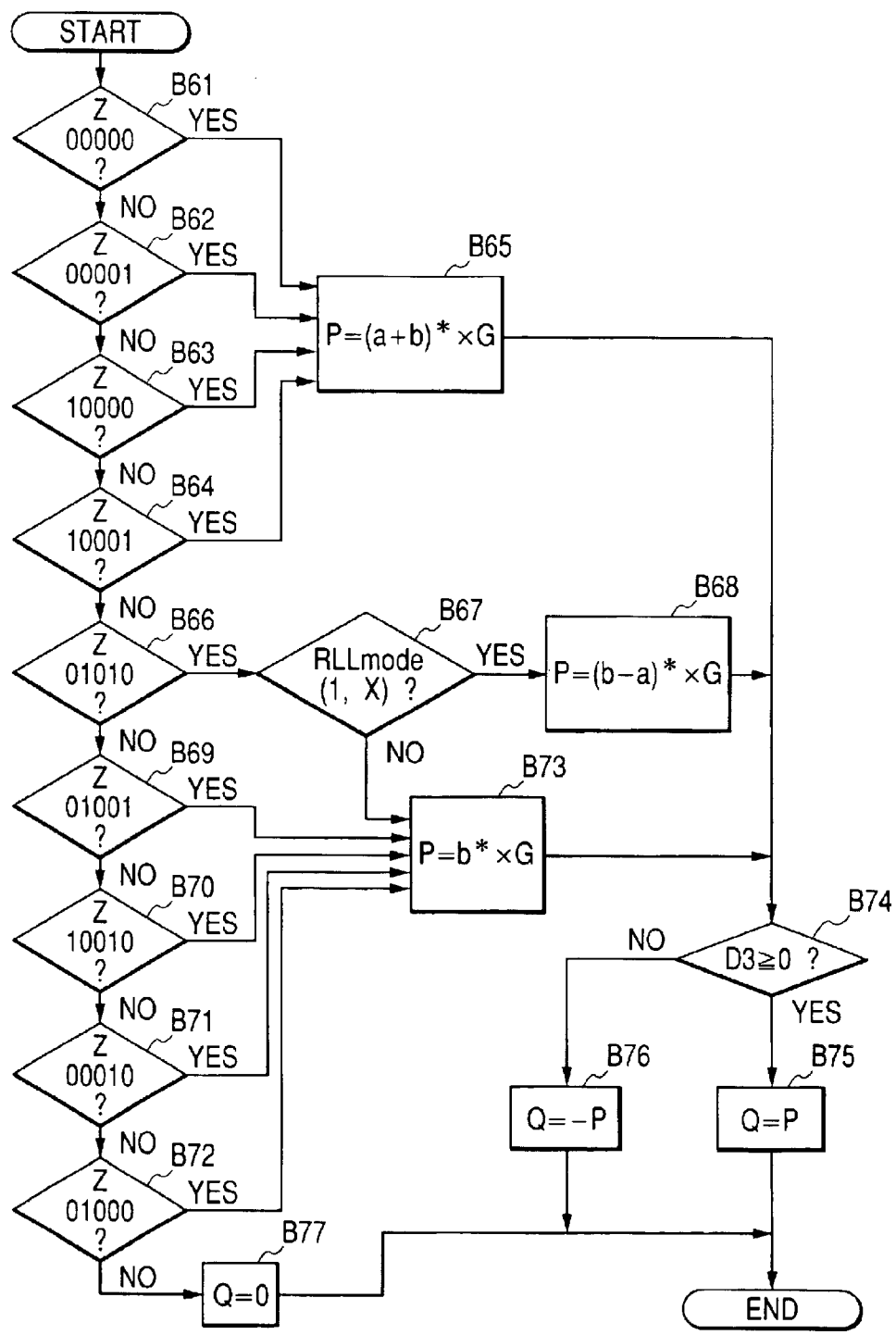
FIG. 39 is a flowchart of an algorithm of a temporary decision by a temporary decision circuit in FIG. 32.

FIG. 39 is a flowchart of the integral-type-signal algorithm of the temporary decision by the temporary decision circuit 33a. The temporary decision is executed for every period of the bit clock signal. The integral-type-signal algorithm in FIG. 39 refers to five successive 0-point information values Z represented by the output signals of the tap delay circuit 32. The central-place value (the third-place value) among the five successive 0-point information values Z corresponds to a sample point of interest.

As shown in FIG. 39, a first step B61 of the integral-type-signal algorithm decides whether or not five successive 0-point information values Z represented by the output signals of the tap delay circuit 32 are "00000". When the five successive 0-point information values Z are "00000", the algorithm advances from the step B61 to a step B65. Otherwise, the algorithm advances from the step B61 to a step B62.

The step B62 decides whether or not the five successive 0-point information values Z are "00001". When the five successive 0-point information values Z are "00001", the algorithm advances from the step B62 to the step B65. Otherwise, the algorithm advances from the step B62 to a step B63.

The step B63 decides whether or not the five successive 0-point information values Z are "10000". When the five successive 0-point information values Z are "10000", the algorithm advances from the step B63 to the step B65. Otherwise, the algorithm advances from the step B63 to a step B64.

The step B64 decides whether or not the five successive 0-point information values Z are "10001". When the five successive 0-point information values Z are "10001", the algorithm advances from the step B64 to the step B65. Otherwise, the algorithm advances from the step B64 to a step B66.

In the case where the five successive 0-point information values Z are "00000", "00001", "10000", or "10001", the before-equalization signal waveform is fixed in a positive side or a negative side for a long time interval centered at the sample point of interest. Thus, in this case, the step B65 calculates a relatively large value P according to the following equation.

$$P=(a+b)*\cdot G \tag{11}$$

where G denotes the gain (the gain factor) shown in FIG. 38, and a* and b* denote values derived from the values "a" and "b" by an offset for equalizing the central value "a+b" to "0". The values G, a*, and b* are known values designated by the PR mode signal and the RLL mode signal. After the step B65, the algorithm advances to a step B74.

The step B66 decides whether or not the five successive 0-point information values Z are "01010". When the five successive 0-point information values Z are "01010", the algorithm advances from the step B66 to a step B67. Otherwise, the algorithm advances from the step B66 to a step B69.

The step B67 decides whether or not the RLL mode signal represents RLL (1, X). When the RLL mode signal represents RLL (1, X), the algorithm advances from the step B67 to a step B68. Otherwise, the program advances from the step B67 to a step B73.

Five successive 0-point information values Z being "01010" can occur only in the case of RLL (1, X). According to the before-equalization signal waveform which corresponds to five successive 0-point information values Z being "01010", the signal polarity changes at an early stage, specifically at a second bit clock pulse. Thus, in this case, the step B68 calculates a relatively small value P according to the following equation.

$$P=(b-a)*\cdot G \tag{12}$$

After the step B68, the algorithm advances to the step B74.

The step B69 decides whether or not the five successive 0-point information values Z are "01001". When the five successive 0-point information values Z are "01001", the algorithm advances from the step B69 to the step B73. Otherwise, the algorithm advances from the step B69 to a step B70.

The step B70 decides whether or not the five successive 0-point information values Z are "10010". When the five successive 0-point information values Z are "10010", the algorithm advances from the step B70 to the step B73. Otherwise, the algorithm advances from the step B70 to a step B71.

The step B71 decides whether or not the five successive 0-point information values Z are "00010". When the five successive 0-point information values Z are "00010", the algorithm advances from the step B71 to the step B73. Otherwise, the algorithm advances from the step B71 to a step B72.

The step B72 decides whether or not the five successive 0-point information values Z are "01000". When the five successive 0-point information values Z are "01000", the algorithm advances from the step B72 to the step B73. Otherwise, the algorithm advances from the step B72 to a step B77.

In the case where the five successive 0-point information values Z are "01010" and the RLL mode signal does not represent RLL (1, X), and in the case where the five successive 0-point information values Z are "01001", "10010", "00010", or "01000", the before-equalization signal level remains in the same for a short time interval centered at the sample point of interest. Thus, in this case, the step B73 calculates an intermediate value P according to the following equation.

$$P=b*\cdot G \tag{13}$$

After the step B73, the algorithm advances to the step B74.

The step B74 detects the polarity of the present-moment signal D3 (the output signal of the subtracter 31). Specifically, the step B74 decides whether or not the present-moment signal D3 is smaller than "0". When the present-moment signal D3 is equal to or greater than "0", the algorithm advances from the step B74 to a step B75. When the present-moment signal D3 is smaller than "0", the algorithm advances from the step B74 to a step B76.

The step B75 sets a temporary decision level (a temporary decision value or a temporary decision result value) Q equal to the value P. In other words, the step B75 executes the statement "Q=P". On the other hand, the step B76 sets the temporary decision level Q equal to the value −P (the value P multiplied by −1). In other words, the step B76 executes the statement "Q=−P". After the steps B75 and B76, the current execution cycle of the temporary decision ends.

The step B77 sets the temporary decision level Q to "0" according to the statement "Q=0". The algorithm advances to the step B77 in cases including the case where the central-place one (the third-place one) among the the five successive 0-point information values Z is "1". After the step B77, the current execution cycle of the temporary decision ends.

In this way, the temporary decision circuit 33a determines the temporary decision level (the temporary decision value) Q according to the integral-type-signal algorithm. The temporary decision circuit 33a outputs a signal representative of the temporary decision level (the temporary decision value) Q to the subtracter 34 as a temporary decision result signal. The temporary decision value Q is determined on the basis of one of the previously-indicated equations (11), (12), and (13) and the previously-indicated equation "Q=0". Accordingly, the equalization by the transversal filter 21 for an integral-type reproduced signal is based on one of the equations (11), (12), and (13) and the equation "Q=0". The equalization based on one of the equations (11), (12), and (13) and the equation "Q=0" is periodically executed in response to the polarity of the present-moment signal D3 at a timing of the central-place one (the third-place one) among five successive 0-point information values Z.

Figure 40:
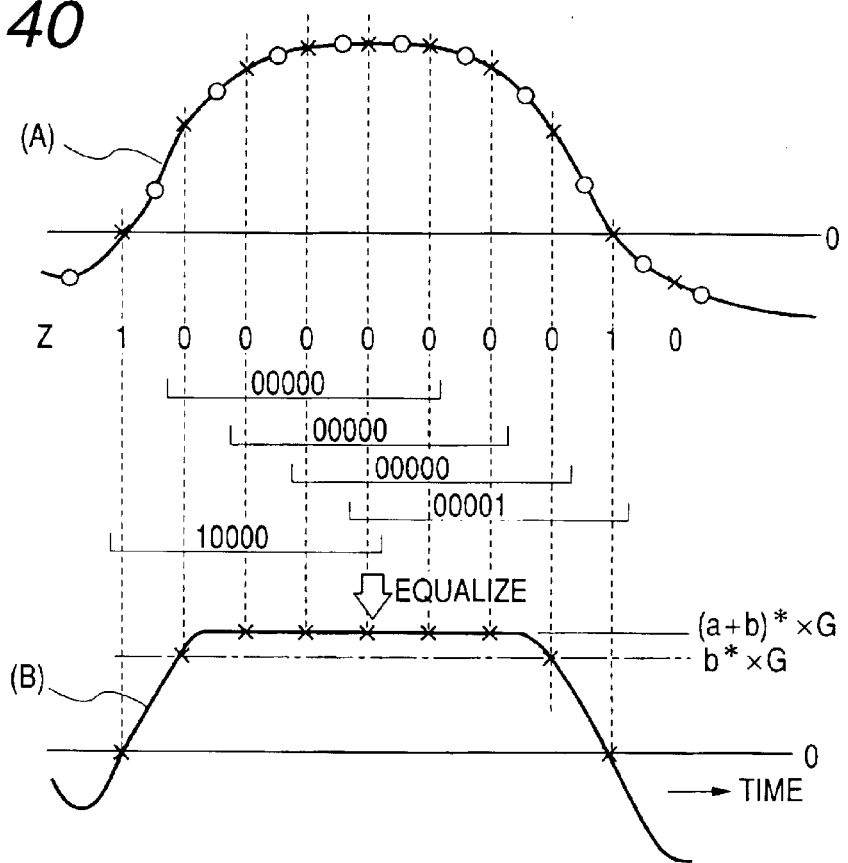
FIG. 40 is a time-domain diagram of a first example of an original waveform and an equalization-resultant waveform in the twenty-first embodiment of this invention.

The waveform equalization for an integral-type reproduced signal will be described below in more detail. FIG. 40 shows an example of a waveform (A) of original data points "○" which are represented by respective data segments recorded on the optical disc 10A. Sample points "×" on the waveform (A) which are given for the PR equalization are temporally distant from the original data points "○" by angular or phase intervals of 180° with respect to the bit clock signal. Values Z of the 0-point information are generated coincidently with sample points "×", respectively. According to the waveform (A), five successive 0-point information values Z change as "10000"→"00000"→"00000"→"00000"→"00001". FIG. 40 also shows an example of an equalization-resultant waveform (B) of sample points "×" which originates from the waveform (A). In the case where the five successive 0-point information values Z are "00000", "10000", or "00001", the waveform equalization is executed on the basis of the previously-indicated equation (11) and the polarity of the present-moment signal D3 at a timing of the central-place one among the five successive 0-point information values Z. In FIG. 40, since the polarity of the present-moment signal D3 at a timing of the central-place one among the five successive 0-point information values Z ("00000", "10000", or "00001") is positive, the waveform equalization reflects the positive value P equal to (a+b)*·G. Specifically, the waveform equalization reflects the tempo-rary decision value Q. The equalization-resultant waveform (B) is basically similar to the original waveform (A).

Figure 41:
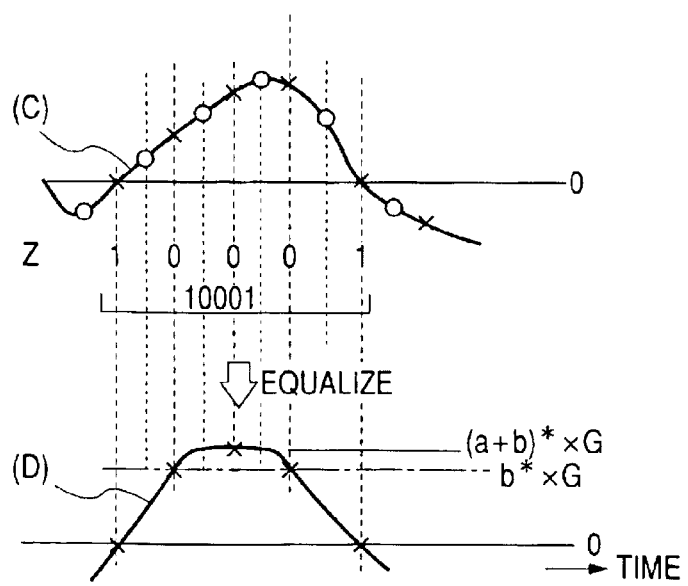
FIG. 41 is a time-domain diagram of a second example of an original waveform and an equalization-resultant waveform in the twenty-first embodiment of this invention.

FIG. 41 shows an example of a waveform (C) of original data points "○" which are represented by respective data segments recorded on the optical disc 10A. Sample points "×" on the waveform (C) are given for the PR equalization. Values Z of the 0-point information are generated coinci-dently with sample points "×", respectively. According to the waveform (C), five successive 0-point information val-ues Z are "10001". FIG. 41 also shows an example of an equalization-resultant waveform (D) of sample points "×" which originates from the waveform (C). In the case where the five successive 0-point information values Z are "10001", the waveform equalization is executed on the basis of the previously-indicated equation (11) and the polarity of the present-moment signal D3 at a timing of the central-place one among the five successive 0-point information values Z. In FIG. 41, since the polarity of the present-moment signal D3 at a timing of the central-place one among the five successive 0-point information values Z ("10001") is positive, the waveform equalization reflects the positive value P equal to (a+b)*·G. Specifically, the wave-form equalization reflects the temporary decision value Q. The equalization-resultant waveform (D) is basically similar to the original waveform (C).

Figure 42:
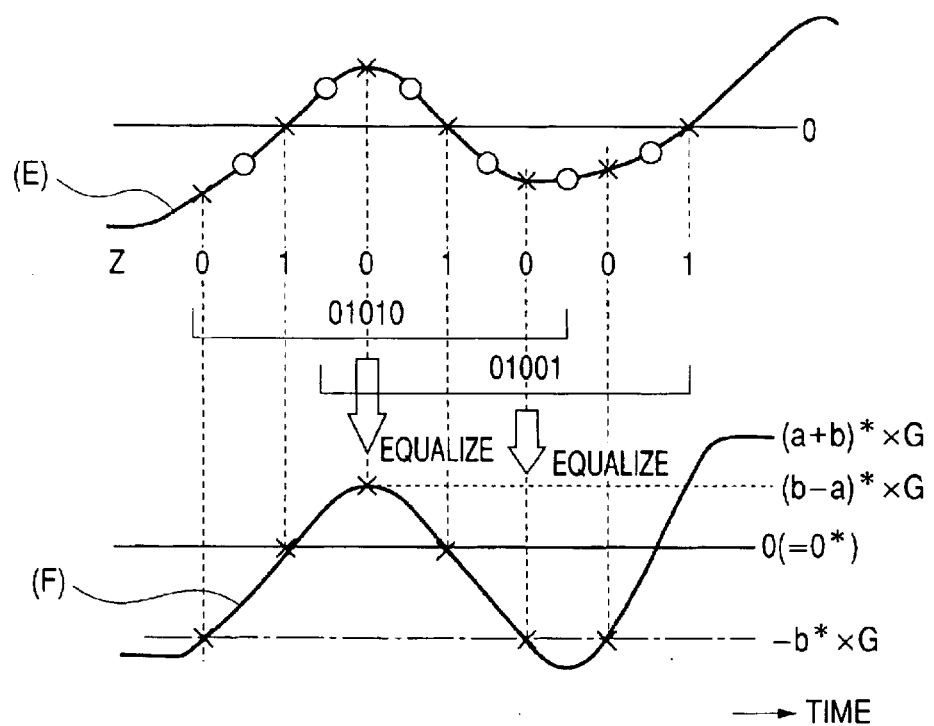
FIG. 42 is a time-domain diagram of a third example of an original waveform and an equalization-resultant waveform in the twenty-first embodiment of this invention.

FIG. 42 shows an example of a waveform (E) of original data points "○" which are represented by respective RLL (1, X) data segments recorded on the optical disc 10A. Sample points "×" on the waveform (E) are given for the PR equalization. Values Z of the 0-point information are gen-erated coincidently with sample points "×", respectively. According to the waveform (E), five successive 0-point information values Z change as "01010"→"10100"→"01001". FIG. 42 also shows an example of an equalization-resultant waveform (F) of sample points "×" which originates from the waveform (E). In the case where the five successive 0-point information values Z are "01010", the waveform equalization is executed on the basis of the previously-indicated equation (12) and the polarity of the present-moment signal D3 at a timing of the central-place one among the five successive 0-point information values Z. In FIG. 42, since the polarity of the present-moment signal D3 at a timing of the central-place one among the five successive 0-point information values Z ("01010") is positive, the waveform equalization reflects the positive value P equal to (b−a)*·G. Specifically, the wave-form equalization reflects the temporary decision value Q. In the case where the five successive 0-point information values Z are "01001", the waveform equalization is executed on the basis of the previously-indicated equation (13) and the polarity of the present-moment signal D3 at a timing of the central-place one among the five successive 0-point information values Z. In FIG. 42, since the polarity of the present-moment signal D3 at a timing of the central-place one among the five successive 0-point information values Z ("01001") is negative, the waveform equalization reflects the negative value −P equal to −b*·G. Specifically, the waveform equalization reflects the temporary decision value Q. The equalization-resultant waveform (E) is basically similar to the original waveform (F).

Figure 43:
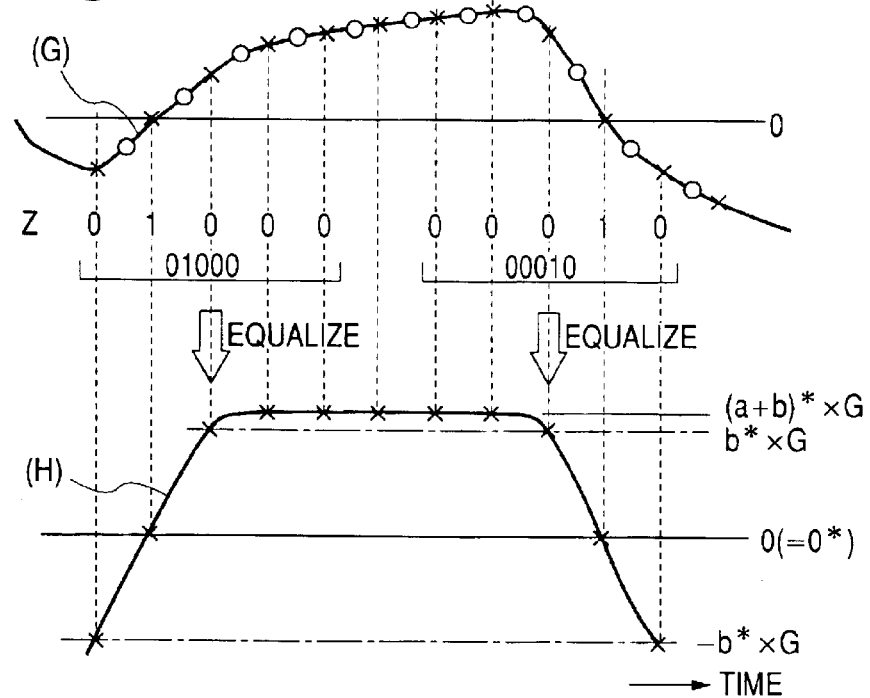
FIG. 43 is a time-domain diagram of a fourth example of an original waveform and an equalization-resultant waveform in the twenty-first embodiment of this invention.

FIG. 43 shows an example of a waveform (G) of original data points "○"which are represented by data segments recorded on the optical disc 10A. Sample points "×" on the waveform (G) are given for the PR equalization. Values Z of the 0-point information are generated coincidently with sample points "×", respectively. According to the waveform (G), five successive 0-point information values Z change as "01000"→"10000"→"00000"→"00000"→"00000"→ "00001"→"00010". FIG. 43 also shows an example of an equalization-resultant waveform (H) of sample points "×" which originates from the waveform (G). In the case where the five successive 0-point information values Z are "01000" or "00010", the waveform equalization is executed on the basis of the previously-indicated equation (13) and the polarity of the present-moment signal D3 at a timing of the central-place one among the five successive 0-point infor-mation values Z. In FIG. 43, since the polarity of the present-moment signal D3 at a timing of the central-place one among the five successive 0-point information values Z ("01000" or "00010") is positive, the waveform equalization reflects the positive value P equal to b*·G. Specifically, the waveform equalization reflects the temporary decision value Q. The equalization-resultant waveform (H) is basically similar to the original waveform (G).

Figure 44:
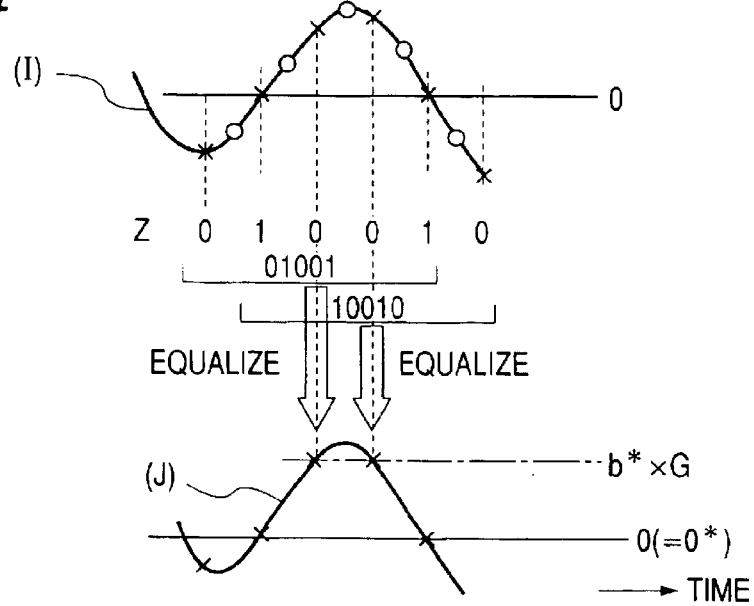
FIG. 44 is a time-domain diagram of a fifth example of an original waveform and an equalization-resultant waveform in the twenty-first embodiment of this invention.

FIG. 44 shows an example of a waveform (I) of original data points "○" which are represented by data segments recorded on the optical disc 10A. Sample points "×" on the waveform (I) are given for the PR equalization. Values Z of the 0-point information are generated coincidently with sample points "×", respectively. According to the waveform (I), five successive 0-point information values Z change as "01001"→"10010". FIG. 44 also shows an example of an equalization-resultant waveform (J) of sample points "×" which originates from the waveform (I). In the case where the five successive 0-point information values Z are "01001" or "10010", the waveform equalization is executed on the basis of the previously-indicated equation (13) and the polarity of the present-moment signal D3 at a timing of the central-place one among the five successive 0-point infor-mation values Z. In FIG. 44, since the polarity of the present-moment signal D3 at a timing of the central-place one among the five successive 0-point information values Z ("01001" or "10010") is positive, the waveform equalization reflects the positive value P equal to b*·G. Specifically, the waveform equalization reflects the temporary decision value Q. The equalization-resultant waveform (J) is basically similar to the original waveform (I).

The waveform equalization for an integral-type repro-duced signal is executed in response to five successive 0-point information values Z and also the state transition diagram of FIG. 36. Therefore, the executed waveform equalization is less adversely affected by the level repre-sented by a current signal sample. Thus, the executed waveform equalization is reliable. Furthermore, the executed waveform equalization can be changed among different PR equalizations in response to the PR mode signal and the RLL mode signal. It should be noted that the present embodiment of this invention can be applied to RLL (2, X) since the RLL (2, X) signal state transitions in FIG. 37 are similar to the RLL (1, X) signal state transitions in FIG. 36.

Twenty-Second Embodiment

Figure 45:
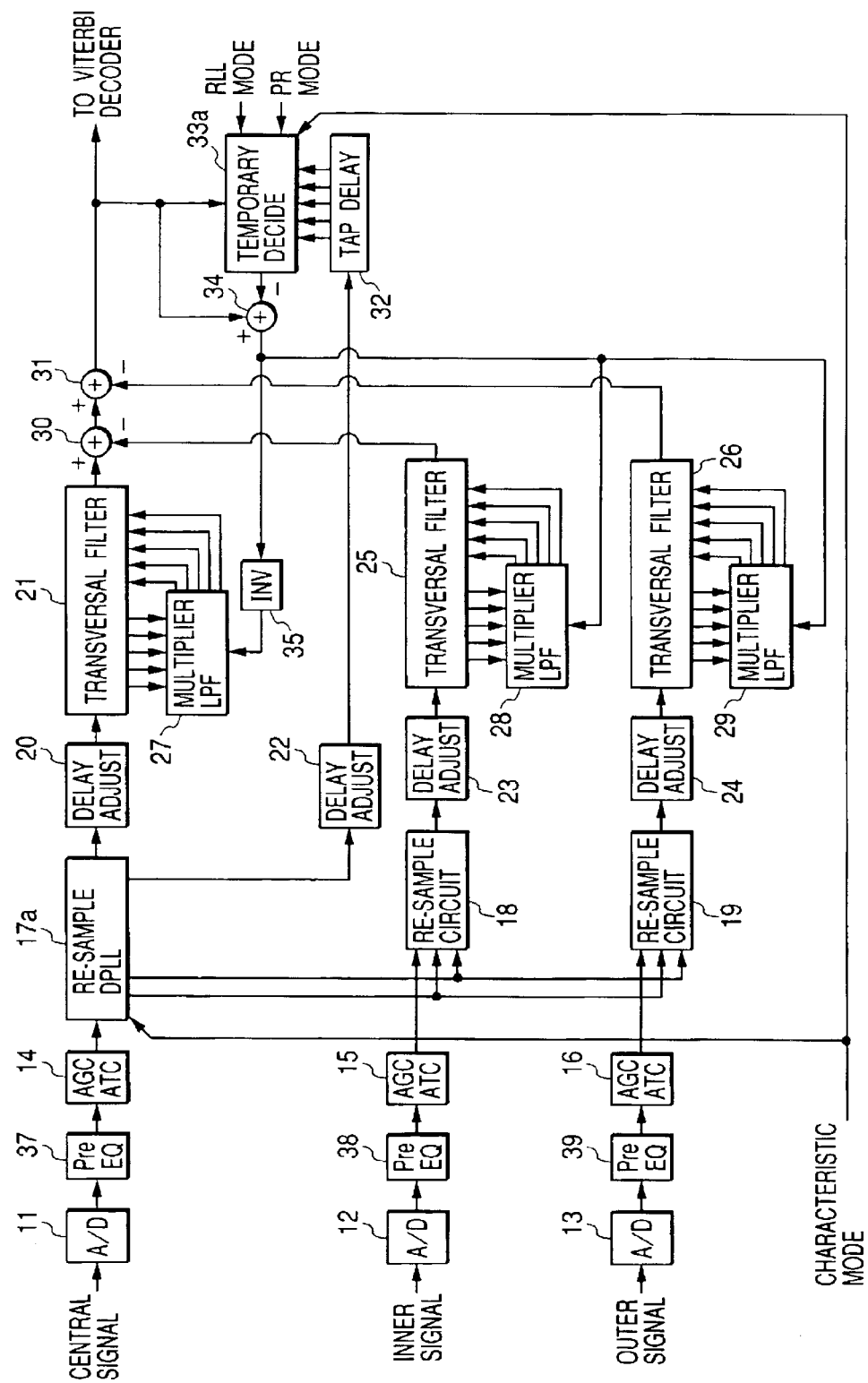
FIG. 45 is a block diagram of an information reproducing apparatus according to a twenty-second embodiment of this invention.

FIG. 45 shows an information reproducing apparatus according to a twenty-second embodiment of this invention. The apparatus of FIG. 45 is similar to the apparatus of FIG. 32 except that digital pre-equalizers 37, 38, and 39 are additionally provided. The digital pre-equalizer 37 is connected between the A/D converter 11 and the AGC/ATC circuit 14. The digital pre-equalizer 38 is connected between the A/D converter 12 and the AGC/ATC circuit 15. The digital pre-equalizer 39 is connected between the A/D converter 13 and the AGC/ATC circuit 16.

Twenty-Third Embodiment

Figure 46:
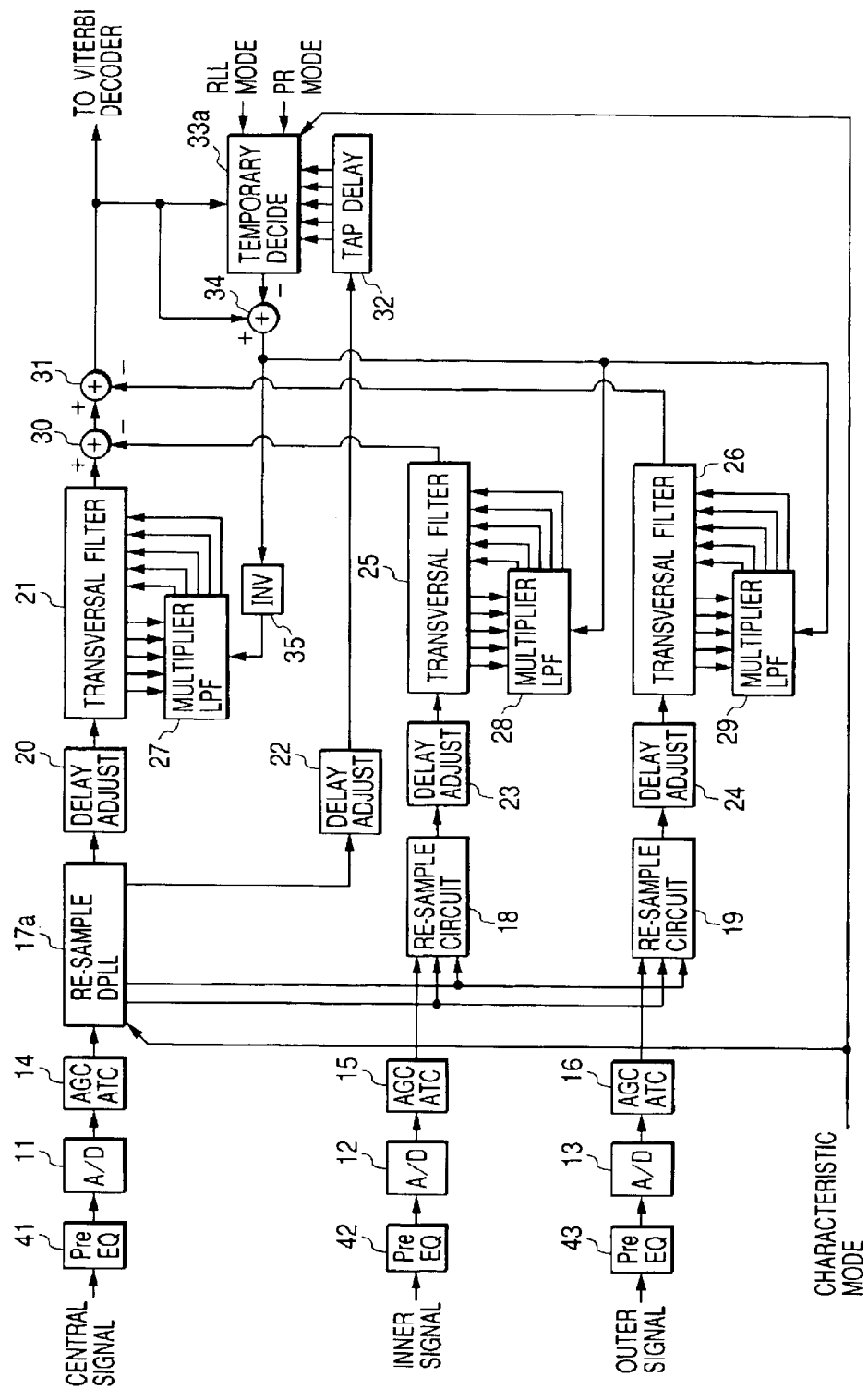
FIG. 46 is a block diagram of an information reproducing apparatus according to a twenty-third embodiment of this invention.

FIG. 46 shows an information reproducing apparatus according to a twenty-third embodiment of this invention. The apparatus of FIG. 46 is similar to the apparatus of FIG. 32 except that analog pre-equalizers (analog fixed equalizers) 41, 42, and 43 are additionally provided. The analog pre-equalizer 41 is located in a stage immediately preceding the A/D converter 11. The analog pre-equalizer 42 is located in a stage immediately preceding the A/D converter 12. The analog pre-equalizer 43 is located in a stage immediately preceding the A/D converter 13.

Twenty-Fourth Embodiment

Figure 47:
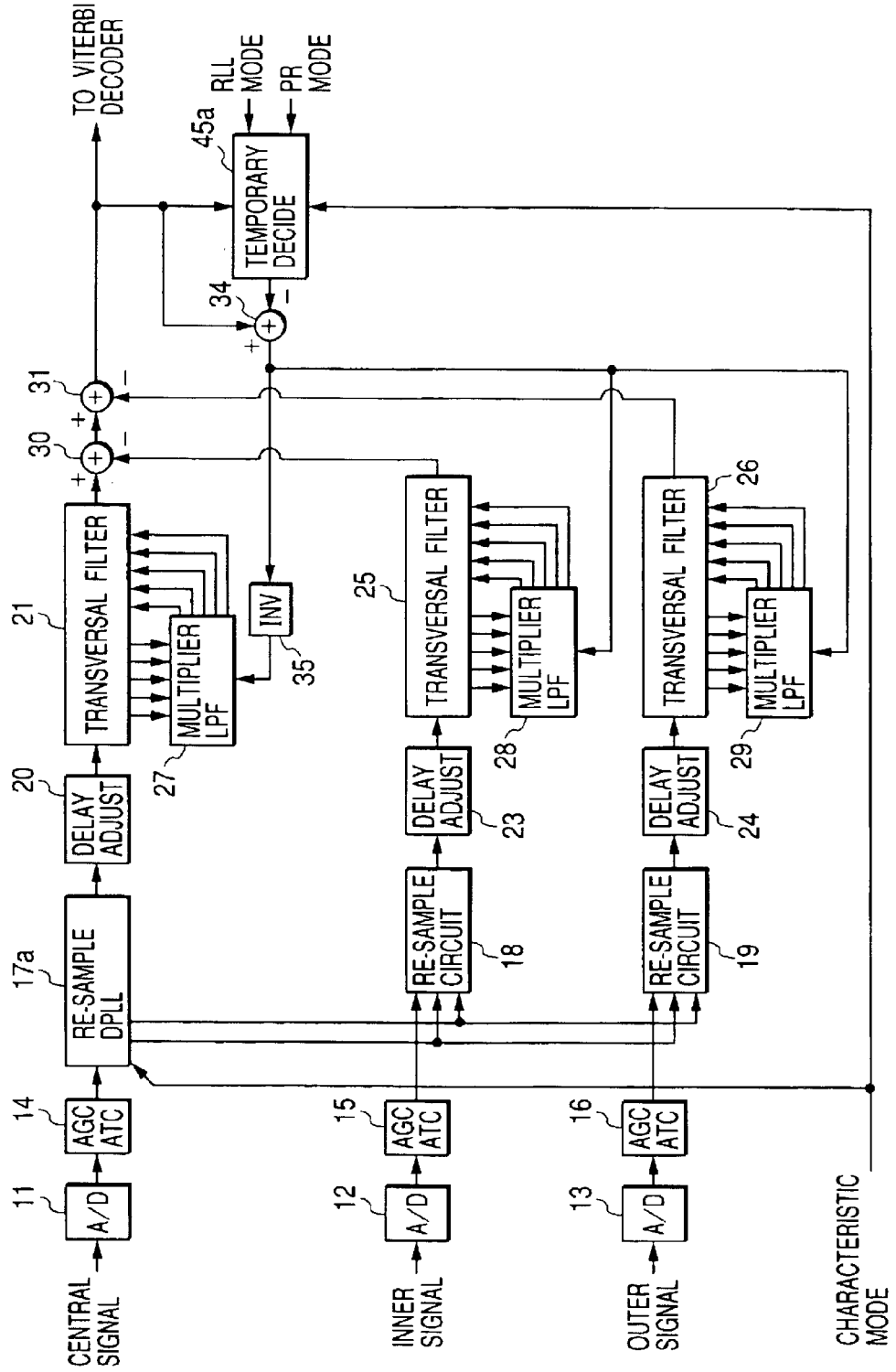
FIG. 47 is a block diagram of an information reproducing apparatus according to a twenty-fourth embodiment of this invention.

FIG. 47 shows an information reproducing apparatus according to a twenty-fourth embodiment of this invention. The apparatus of FIG. 47 is similar to the apparatus of FIG. 32 except that a temporary decision circuit 45a replaces the temporary decision circuit 33a (see FIG. 32), and the delay adjuster 22 and the tap delay circuit 32 (see FIG. 32) are omitted.

The temporary decision circuit 45a receives the output signal of the subtracter 31. The temporary decision circuit 45a compares the output signal of the subtracter 31 with a reference signal representative of a predetermined threshold value, thereby detecting every peak point or every zero-cross point and generating peak-point information or 0-point information. The temporary decision circuit 45a implements a temporary decision about the output signal of the subtracter 31 in response to five successive samples of the peak-point information or the 0-point information, the RLL mode signal, the PR mode signal, and the characteristic mode signal according to a predetermined algorithm similar to that used by the temporary decision circuit 33a (see FIG. 32). The temporary decision circuit 45a generates a signal representing the result of the temporary decision. The temporary decision circuit 45a outputs the temporary decision result signal to the subtracter 34.

Twenty-Fifth Embodiment

Figure 48:
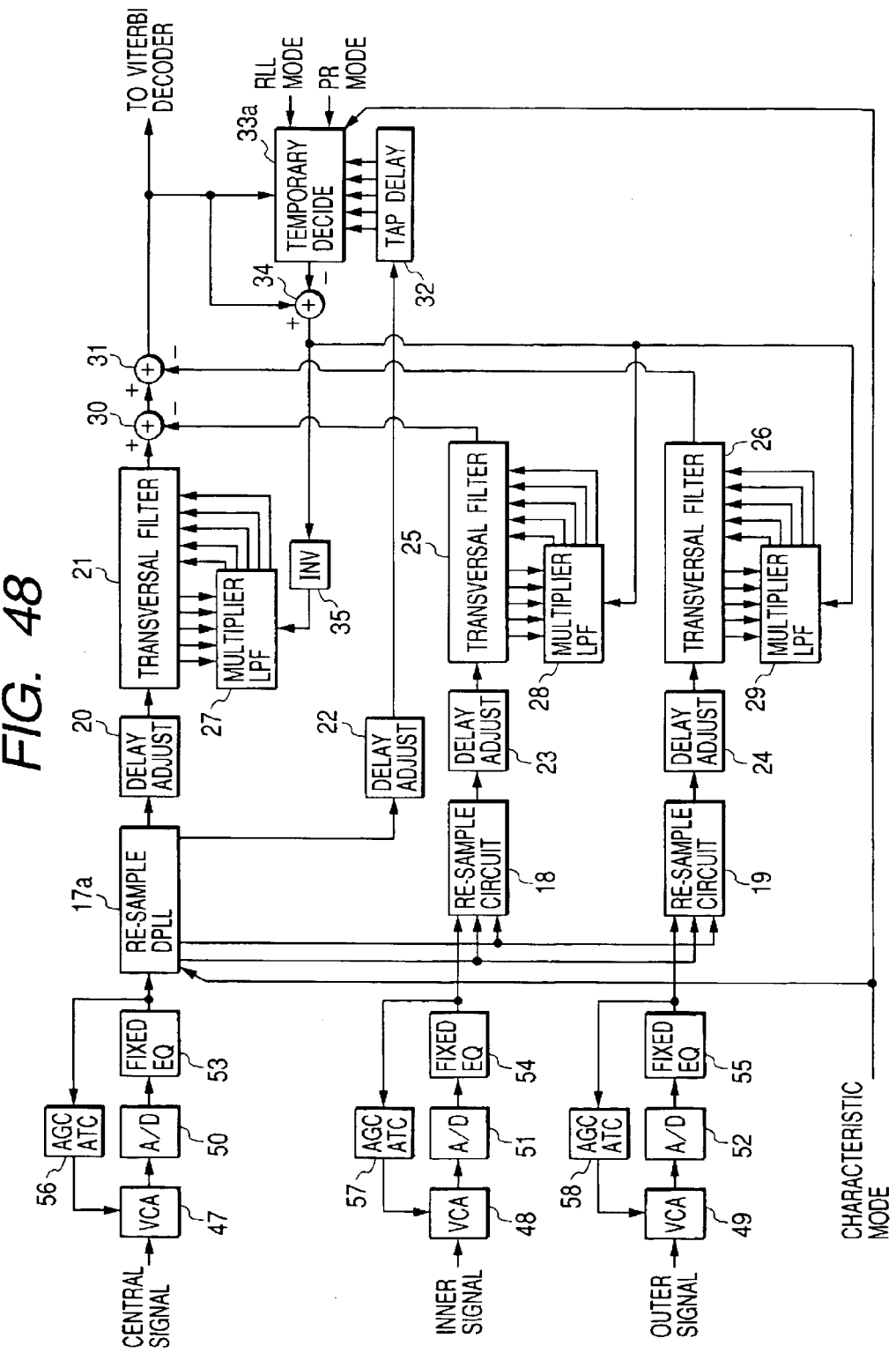
FIG. 48 is a block diagram of an information reproducing apparatus according to a twenty-fifth embodiment of this invention.

FIG. 48 shows an information reproducing apparatus according to a twenty-fifth embodiment of this invention. The apparatus of FIG. 48 is similar to the apparatus of FIG. 32 except for design changes mentioned hereafter.

The apparatus of FIG. 48 includes a voltage-controlled amplifier (VCA) 47, an A/D converter 50, a fixed equalizer 53, and an AGC/ATC detection circuit 56. The VCA 47 follows the optical head 10B (see FIG. 1). The VCA 47 is connected to the A/D converter 50 and the AGC/ATC detection circuit 56. The A/D converter 50 is connected to the fixed equalizer 53. The fixed equalizer 53 is connected to the AGC/ATC detection circuit 56 and the re-sampling DPLL section 17a. The combination of the devices 47, 50, 53, and 56 replaces the combination of the devices 11 and 14 in FIG. 32.

The apparatus of FIG. 48 includes a VCA 48, an A/D converter 51, a fixed equalizer 54, and an AGC/ATC detection circuit 57. The VCA 48 follows the optical head 10B (see FIG. 1). The VCA 48 is connected to the A/D converter 51 and the AGC/ATC detection circuit 57. The A/D converter 51 is connected to the fixed equalizer 54. The fixed equalizer 54 is connected to the AGC/ATC detection circuit 57 and the re-sampling circuit 18. The combination of the devices 48, 51, 54, and 57 replaces the combination of the devices 12 and 15 in FIG. 32.

The apparatus of FIG. 48 includes a VCA 49, an A/D converter 52, a fixed equalizer 55, and an AGC/ATC detection circuit 58. The VCA 49 follows the optical head 10B (see FIG. 1). The VCA 49 is connected to the A/D converter 52 and the AGC/ATC detection circuit 58. The A/D converter 52 is connected to the fixed equalizer 55. The fixed equalizer 55 is connected to the AGC/ATC detection circuit 58 and the re-sampling circuit 19. The combination of the devices 49, 52, 55, and 58 replaces the combination of the devices 13 and 16 in FIG. 32.

The VCA 47 receives the central readout signal from the optical head 10B (see FIG. 1). The VCA 47 amplifies the central readout signal at a controllable gain. The VCA 47 outputs the amplification-resultant signal to the A/D converter 50. The A/D converter 50 changes the output signal of the VCA 47 into a corresponding digital signal. Specifically, the A/D converter 50 periodically samples the output signal of the VCA 47 in response to a master clock signal (a system clock signal), and converts every resultant sample into a digital sample. The A/D converter 50 outputs the resultant sequence of digital samples to the fixed equalizer 53. The fixed equalizer 53 subjects the output signal of the A/D converter 50 to a fixed equalization process. The fixed equalizer 53 outputs the equalization-resultant signal to the AGC/ATC detection circuit 56 and the re-sampling DPLL section 17a. The AGC/ATC detection circuit 56 generates a control voltage in response to the output signal of the fixed equalizer 53. The AGC/ATC detection circuit 56 outputs the control voltage to the VCA 47. The gain of the VCA 47 is controlled in response to the voltage outputted from the AGC/ATC detection circuit 56. The control of the gain of the VCA 47 is designed to implement AGC control, DC control, and ATC control.

The VCA 48 receives the inner readout signal from the optical head 10B (see FIG. 1). The VCA 48 amplifies the inner readout signal at a controllable gain. The VCA 48 outputs the amplification-resultant signal to the A/D converter 51. The A/D converter 51 changes the output signal of the VCA 48 into a corresponding digital signal. Specifically, the A/D converter 51 periodically samples the output signal of the VCA 48 in response to the master clock signal (the system clock signal), and converts every resultant sample into a digital sample. The A/D converter 51 outputs the resultant sequence of digital samples to the fixed equalizer 54. The fixed equalizer 54 subjects the output signal of the A/D converter 51 to a fixed equalization process. The fixed equalizer 54 outputs the equalization-resultant signal to the AGC/ATC detection circuit 57 and the re-sampling circuit 18. The AGC/ATC detection circuit 57 generates a control voltage in response to the output signal of the fixed equalizer 54. The AGC/ATC detection circuit 57 outputs the control voltage to the VCA 48. The gain of the VCA 48 is controlled in response to the voltage outputted from the AGC/ATC detection circuit 57. The control of the gain of the VCA 48 is designed to implement AGC control, DC control, and ATC control.

The VCA 49 receives the outer readout signal from the optical head 10B (see FIG. 1). The VCA 49 amplifies the outer readout signal at a controllable gain. The VCA 49 outputs the amplification-resultant signal to the A/D converter 52. The A/D converter 52 changes the output signal of the VCA 49 into a corresponding digital signal. Specifically, the A/D converter 52 periodically samples the output signal of the VCA 49 in response to the master clock signal (the system clock signal), and converts every resultant sample into a digital sample. The A/D converter 52 outputs the resultant sequence of digital samples to the fixed equalizer 55. The fixed equalizer 55 subjects the output signal of the A/D converter 52 to a fixed equalization process. The fixed equalizer 55 outputs the equalization-resultant signal to the AGC/ATC detection circuit 58 and the re-sampling circuit 19. The AGC/ATC detection circuit 58 generates a control voltage in response to the output signal of the fixed equalizer 55. The AGC/ATC detection circuit 58 outputs the control voltage to the VCA 49. The gain of the VCA 49 is controlled in response to the voltage outputted from the AGC/ATC detection circuit 58. The control of the gain of the VCA 49 is designed to implement AGC control, DC control, and ATC control.

Twenty-Sixth Embodiment

Figure 49:
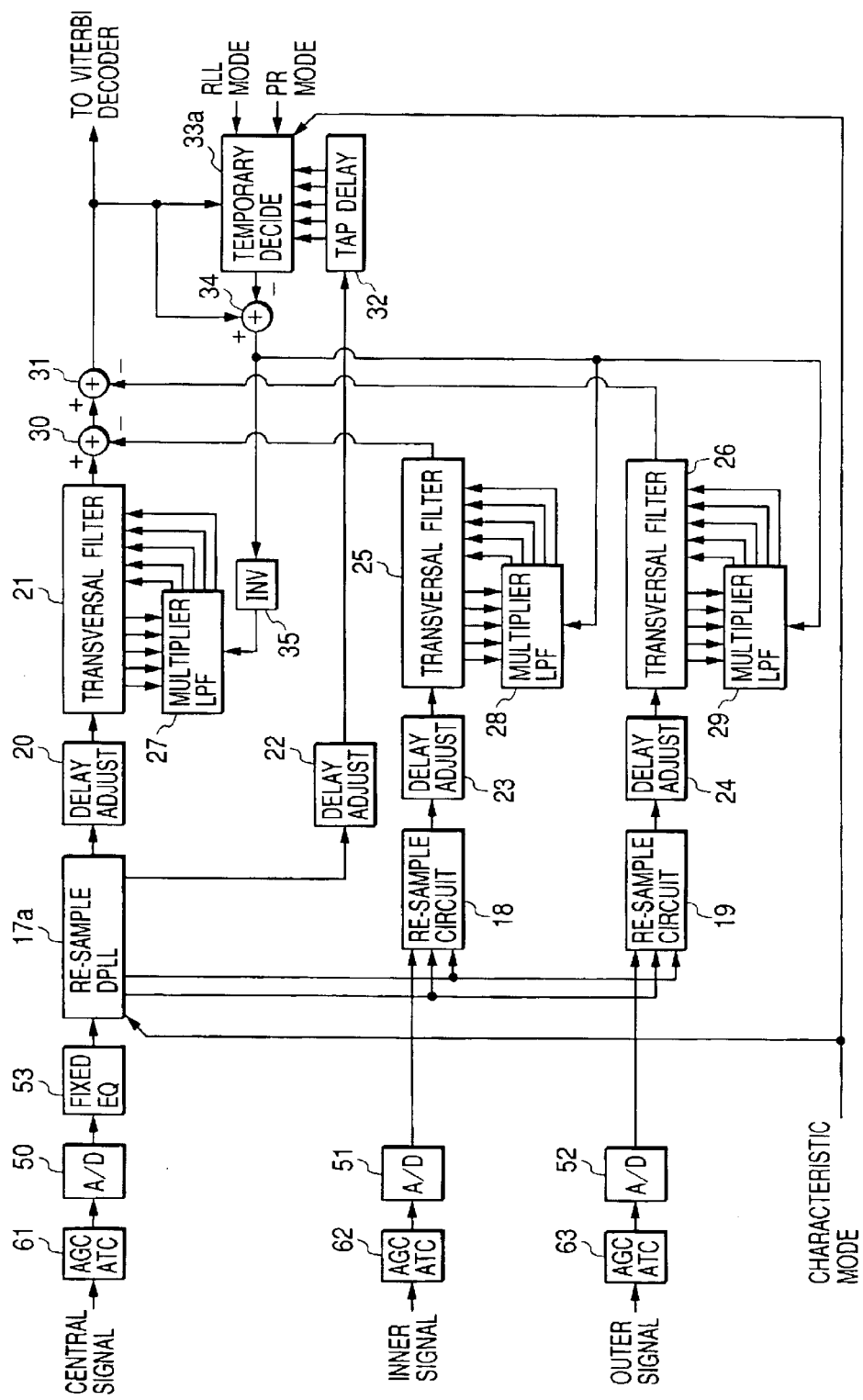
FIG. 49 is a block diagram of an information reproducing apparatus according to a twenty-sixth embodiment of this invention.

FIG. 49 shows an information reproducing apparatus according to a twenty-sixth embodiment of this invention. The apparatus of FIG. 49 is similar to the apparatus of FIG. 32 except for design changes mentioned hereafter.

The apparatus of FIG. 49 includes an analog AGC/ATC circuit 61, an A/D converter 50, and a fixed equalizer 53. The analog AGC/ATC circuit 61 follows the optical head 10B (see FIG. 1). The analog AGC/ATC circuit 61 is connected to the A/D converter 50. The A/D converter 50 is connected to the fixed equalizer 53. The fixed equalizer 53 is connected to the re-sampling DPLL section 17a. The combination of the devices 61, 50, and 53 replaces the combination of the devices 11 and 14 in FIG. 32.

The apparatus of FIG. 49 includes an analog AGC/ATC circuit 62 and an A/D converter 51. The analog AGC/ATC circuit 62 follows the optical head 10B (see FIG. 1). The analog AGC/ATC circuit 62 is connected to the A/D converter 51. The A/D converter 51 is connected to the re-sampling circuit 18. The combination of the devices 62 and 51 replaces the combination of the devices 12 and 15 in FIG. 32.

The apparatus of FIG. 49 includes an analog AGC/ATC circuit 63 and an A/D converter 52. The analog AGC/ATC circuit 63 follows the optical head 10B (see FIG. 1). The analog AGC/ATC circuit 63 is connected to the A/D converter 52. The A/D converter 52 is connected to the re-sampling circuit 19. The combination of the devices 63 and 52 replaces the combination of the devices 13 and 16 in FIG. 32.

The analog AGC/ATC circuit 61 receives the central readout signal from the optical head 10B (see FIG. 1). The analog AGC/ATC circuit 61 subjects the central readout signal to an AGC/ATC process of controlling a signal amplitude at a constant level. The analog AGC/ATC circuit 61 outputs the resultant signal to the A/D converter 50. The A/D converter 50 changes the output signal of the analog AGC/ATC circuit 61 into a corresponding digital signal. Specifically, the A/D converter 50 periodically samples the output signal of the analog AGC/ATC circuit 61 in response to a master clock signal (a system clock signal), and converts every resultant sample into a digital sample. The A/D converter 50 outputs the resultant sequence of digital samples to the fixed equalizer 53. The fixed equalizer 53 subjects the output signal of the A/D converter 50 to a fixed equalization process. The fixed equalizer 53 outputs the equalization-resultant signal to the re-sampling DPLL section 17a.

The analog AGC/ATC circuit 62 receives the inner readout signal from the optical head 10B (see FIG. 1). The analog AGC/ATC circuit 62 subjects the inner readout signal to an AGC/ATC process of controlling a signal amplitude at a constant level. The analog AGC/ATC circuit 62 outputs the resultant signal to the A/D converter 51. The A/D converter 51 changes the output signal of the analog AGC/ATC circuit 62 into a corresponding digital signal. Specifically, the A/D converter 51 periodically samples the output signal of the analog AGC/ATC circuit 62 in response to the master clock signal (the system clock signal), and converts every resultant sample into a digital sample. The A/D converter 51 outputs the resultant sequence of digital samples to the re-sampling circuit 18.

The analog AGC/ATC circuit 63 receives the outer readout signal from the optical head 10B (see FIG. 1). The analog AGC/ATC circuit 63 subjects the outer readout signal to an AGC/ATC process of controlling a signal amplitude at a constant level. The analog AGC/ATC circuit 63 outputs the resultant signal to the A/D converter 52. The A/D converter 52 changes the output signal of the analog AGC/ATC circuit 63 into a corresponding digital signal. Specifically, the A/D converter 52 periodically samples the output signal of the analog AGC/ATC circuit 63 in response to the master clock signal (the system clock signal), and converts every resultant sample into a digital sample. The A/D converter 52 outputs the resultant sequence of digital samples to the re-sampling circuit 19.

Twenty-Seventh Embodiment

Figure 50:
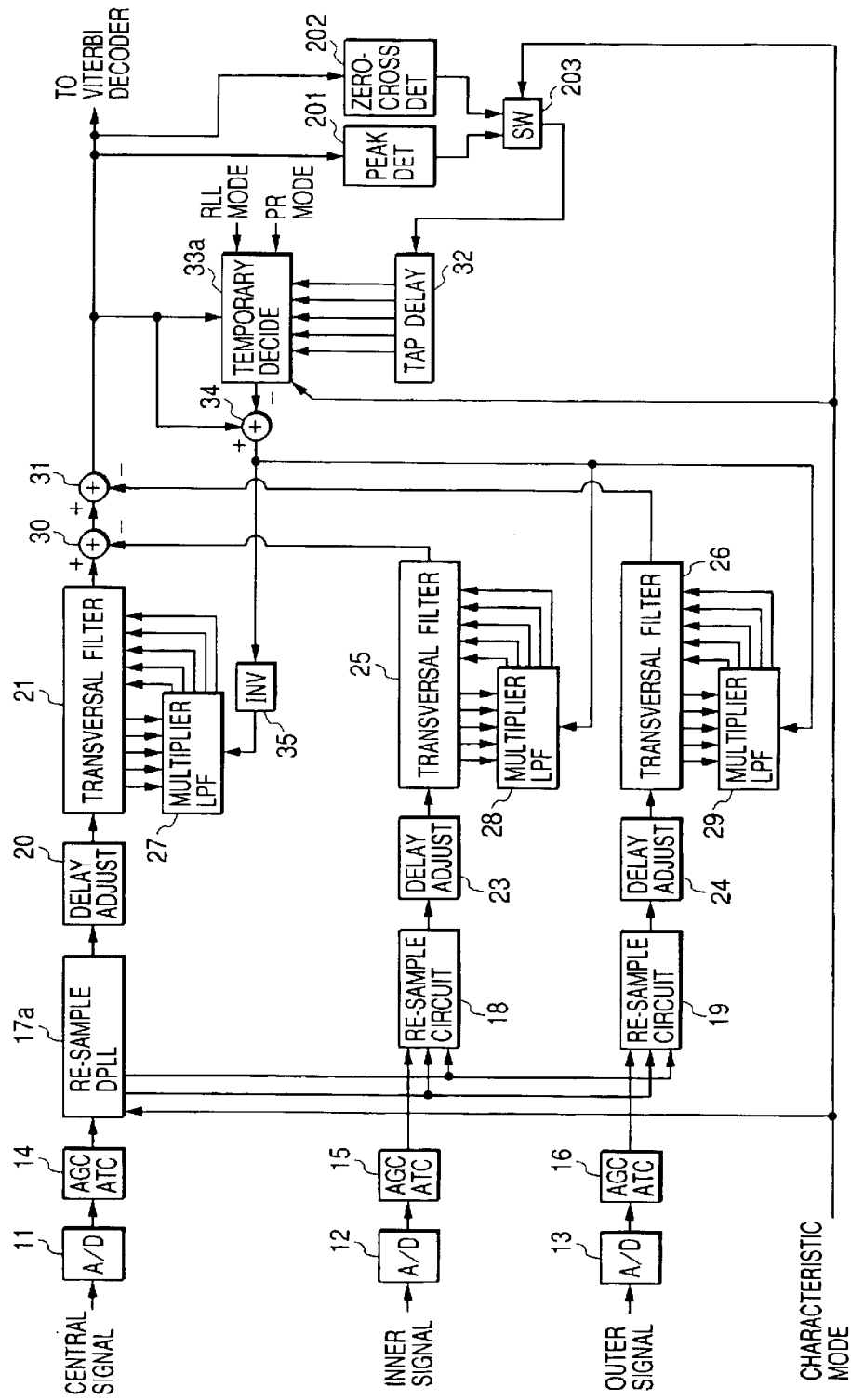
FIG. 50 is a block diagram of an information reproducing apparatus according to a twenty-seventh embodiment of this invention.

FIG. 50 shows an information reproducing apparatus according to a twenty-seventh embodiment of this invention. The apparatus of FIG. 50 is similar to the apparatus of FIG. 32 except for design changes mentioned hereafter.

The apparatus of FIG. 50 includes a peak detector 201, a zero-cross detector 202, and a switch 203. The delay adjuster 22 (see FIG. 32) is omitted from the apparatus of FIG. 50.

The input terminal of the peak detector 201 is connected to the output terminal of the subtracter 31. The output terminal of the peak detector 201 is connected to the switch 203. The input terminal of the zero-cross detector 202 is connected to the output terminal of the subtracter 31. The output terminal of the zero-cross detector 202 is connected to the switch 203. The switch 203 is connected to the input terminal of the tap delay circuit 32.

The peak detector 201 receives the output signal of the subtracter 31. The peak detector 201 calculates the slope (differential) of the level represented by the output signal of the subtracter 31 on the basis of two successive samples thereof. The peak detector 201 senses every inversion of the polarity of the calculated slope. The peak detector 201 senses a sample point immediately preceding the sample point corresponding to the sensed polarity inversion. The peak detector 201 sets a peak-point information value PK to "1" for the sensed sample point. The peak detector 201 sets the peak-point information value PK to "0" for the other sample points. Thus, the peak detector 201 generates peak-point information representing the value PK. The peak detector 201 outputs the peak-point information to the switch 203.

The zero-cross detector 202 receives the output signal of the subtracter 31. The zero-cross detector 202 senses every inversion of the polarity of the output signal of the subtracter 31 by referring to two successive samples thereof. For every sensed polarity inversion, the zero-cross detector 202 selects one from among two related signal samples which is closer to "0". The zero-cross detector 202 sets a 0-point information value Z to "1" for the selected signal sample. The zero-cross detector 202 sets the 0-point information value Z to "0" for the other signal sample (the unselected signal sample). In the absence of a sensed polarity inversion, the zero-cross detector 202 continuously sets the 0-point information value Z to "0". Thus, the zero-cross detector 202 generates 0-point information representing the value Z. The zero-cross detector 202 outputs the 0-point information to the switch 203.

The switch 203 receives the characteristic mode signal. The switch 203 selects either the peak-point information or the 0-point information in response to the characteristic mode signal. Specifically, the switch 203 selects the peak-point information when the characteristic mode signal indicates that the waveform of a signal reproduced from the optical disc 10A (see FIG. 1) is of the differential type. The switch 203 selects the 0-point information when the characteristic mode signal indicates that the waveform of a signal reproduced from the optical disc 10A is of the integral type. The switch 203 outputs the selected point information to the tap delay circuit 32.

Twenty-Eighth Embodiment

Figure 51:
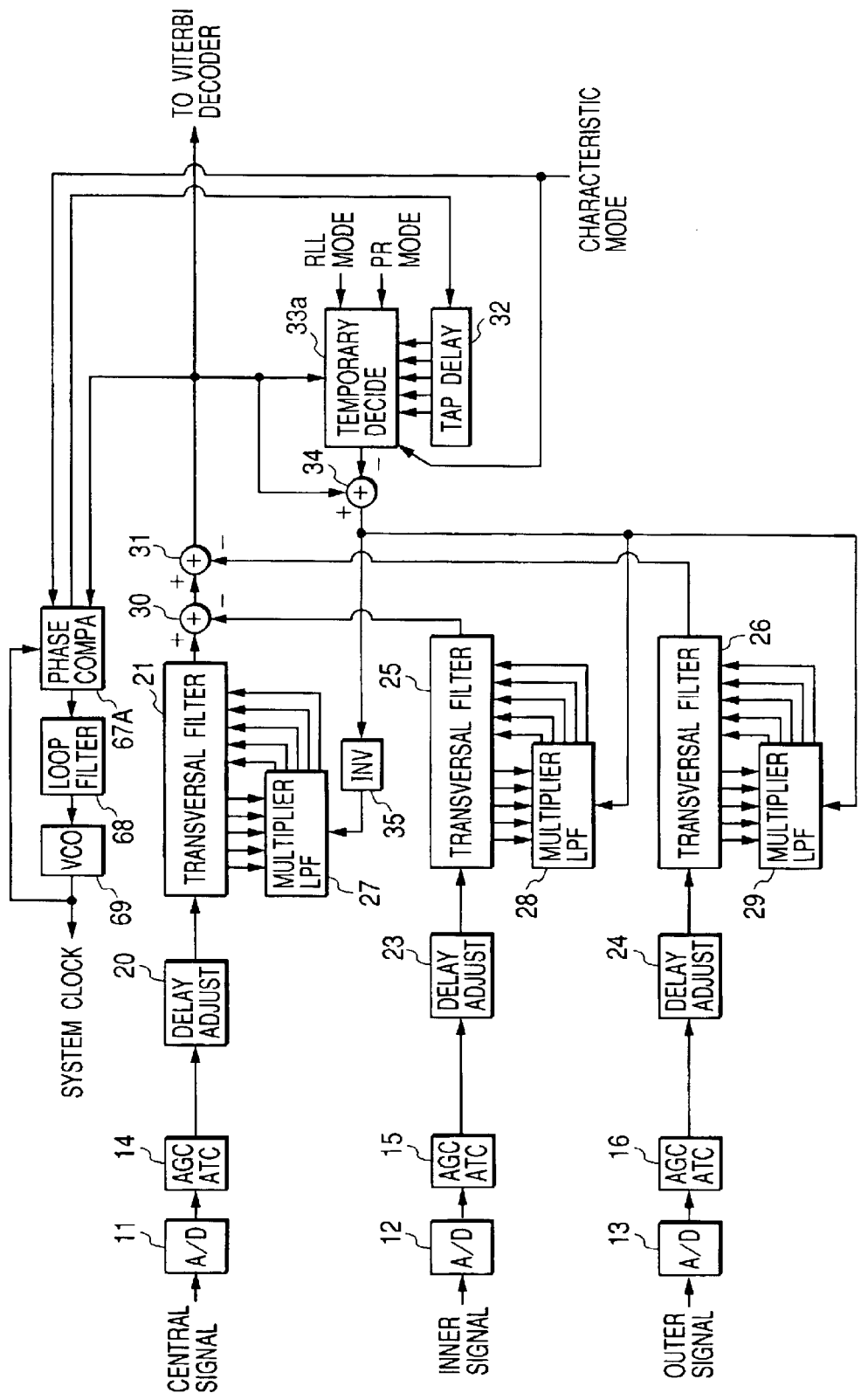
FIG. 51 is a block diagram of an information reproducing apparatus according to a twenty-eighth embodiment of this invention.

FIG. 51 shows an information reproducing apparatus according to a twenty-eighth embodiment of this invention. The apparatus of FIG. 51 is similar to the apparatus of FIG. 32 except for design changes mentioned hereafter.

The re-sampling DPLL section 17a, the re-sampling circuits 18 and 19, and the delay adjuster 22 (see FIG. 32) are omitted from the apparatus of FIG. 51. Thus, in the apparatus of FIG. 51, the AGC/ATC circuit 14 and the delay adjuster 20 are directly connected to each other. The AGC/ATC circuit 15 and the delay adjuster 23 are directly connected to each other. The AGC/ATC circuit 16 and the delay adjuster 24 are directly connected to each other. The output signals of the AGC/ATC circuits 14, 15, and 16 are fed to the transversal filters 21, 25, and 26 via the delay adjusters 20, 23, and 24, respectively.

The apparatus of FIG. 51 includes a phase comparison circuit 67A, a loop filter 68, and a voltage-controlled oscillator (VCO) 69 which are connected in a closed loop in that order. The phase comparison circuit 67A is connected to the output terminal of the subtracter 31. The phase comparison circuit 67A receives the output signal of the subtracter 31. The circuit 67A detects every peak point or every zero-cross point of the output signal of the subtracter 31. The circuit 67A compares the phase of the detected point and the phase of a system clock signal fed from the VCO 69, and generates a phase error signal in response to the result of the phase comparison. The phase comparison circuit 67A compares the phase of the output signal of the subtracter 31 and the phase of a system clock signal fed from the VCO 69, and generates a phase error signal in response to the result of the phase comparison. The phase comparison circuit 67A outputs the phase error signal to the loop filter 68. The loop filter 68 converts the phase error signal into a control voltage. The loop filter 68 outputs the control voltage to the VCO 69. The VCO 69 oscillates at a frequency determined by the control voltage, and thereby generates the system clock signal. The VCO 69 outputs the system clock signal to the A/D converters 11, 12, and 13, and other devices and circuits within the apparatus. The system clock signal has a frequency equal to a predetermined natural number times the frequency of a bit clock signal.

The phase comparison circuit 67A includes a peak detector and a zero-cross detector. The peak detector in the phase comparison circuit 67A calculates the slope (differential) of the level represented by the output signal of the subtracter 31 on the basis of two successive samples thereof. The peak detector senses every inversion of the polarity of the calculated slope. The peak detector senses a sample point immediately preceding the sample point corresponding to the sensed polarity inversion. The peak detector sets a peak-point information value PK to "1" for the sensed sample point. The peak detector sets the peak-point information value PK to "0" for the other sample points. Thus, the peak detector generates peak-point information representing the value PK.

The zero-cross detector in the phase comparison circuit 67A senses every inversion of the polarity of the output signal of the subtracter 31 by referring to two successive samples thereof. For every sensed polarity inversion, the zero-cross detector selects one from among two related signal samples which is closer to "0". The zero-cross detector sets a 0-point information value Z to "1" for the selected signal sample. The zero-cross detector sets the 0-point information value Z to "0" for the other signal sample (the unselected signal sample). In the absence of a sensed polarity inversion, the zero-cross detector continuously sets the 0-point information value Z to "0". Thus, the zero-cross detector generates 0-point information representing the value Z.

The phase comparison circuit 67A includes a switch which receives the characteristic mode signal. The switch selects either the peak-point information or the 0-point information in response to the characteristic mode signal. Specifically, the switch selects the peak-point information when the characteristic mode signal indicates that the waveform of a signal reproduced from the optical disc 10A (see FIG. 1) is of the differential type. The switch selects the 0-point information when the characteristic mode signal indicates that the waveform of a signal reproduced from the optical disc 10A is of the integral type. The switch outputs the selected point information to the tap delay circuit 32.

Twenty-Ninth Embodiment

Figure 52:
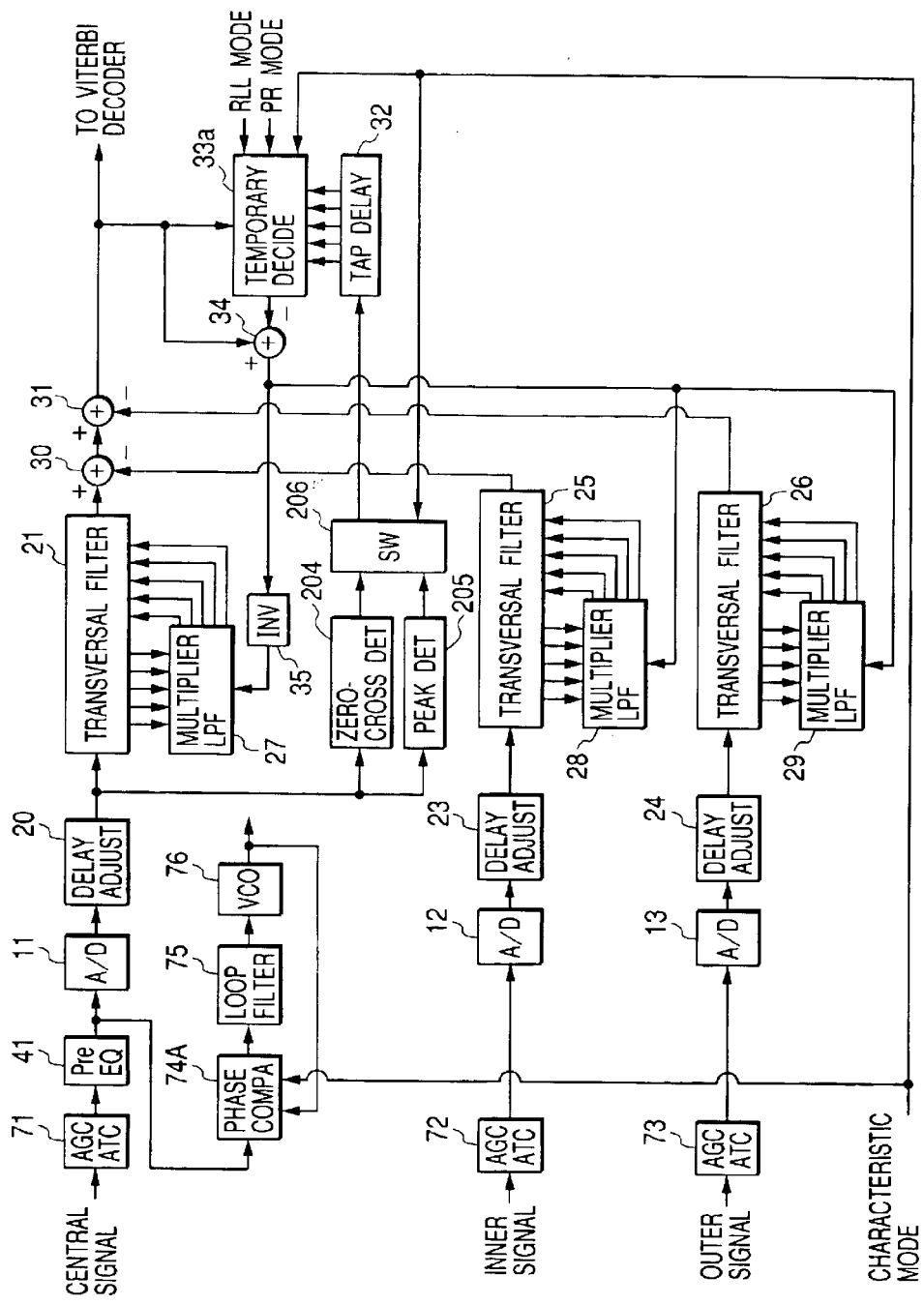
FIG. 52 is a block diagram of an information reproducing apparatus according to a twenty-ninth embodiment of this invention.

FIG. 52 shows an information reproducing apparatus according to a twenty-ninth embodiment of this invention. The apparatus of FIG. 52 is similar to the apparatus of FIG. 32 except for design changes mentioned hereafter.

The re-sampling DPLL section 17a, the re-sampling circuits 18 and 19, and the delay adjuster 22 (see FIG. 1) are omitted from the apparatus of FIG. 52.

The apparatus of FIG. 52 includes an analog AGC/ATC circuit 71 and an analog fixed equalizer (an analog pre-equalizer) 41. The analog AGC/ATC circuit 71 follows the optical head 10B (see FIG. 1). The analog AGC/ATC circuit 71 is connected to the analog fixed equalizer 41. The analog fixed equalizer 41 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the analog fixed equalizer 41. The analog fixed equalizer 41 subjects the output signal of the analog AGC/ATC circuit 71 to a fixed equalization process. The analog fixed equalizer 41 outputs the equalization-resultant signal to the A/D converter 11. The A/D converter 11 changes the output signal of the analog fixed equalizer 41 into a corresponding digital signal. Specifically, the A/D converter 11 periodically samples the output signal of the analog fixed equalizer 41 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 52 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 52 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 52 includes a phase comparator 74A, a loop filter 75, and a voltage-controlled oscillator (VCO) 76 which are connected in a closed loop in that order. The phase comparator 74A is connected to the output side of the analog fixed equalizer 41. The device 74A compares the phase of the output signal of the analog fixed equalizer 41 and the phase of a system clock signal fed from the VCO 76, and generates a phase error signal in response to the result of the phase comparison. The phase comparator 74 outputs the phase error signal to the loop filter 75. The loop filter 75 converts the phase error signal into a control voltage. The loop filter 75 outputs the control voltage to the VCO 76. The VCO 76 oscillates at a frequency determined by the control voltage, and thereby generates the system clock signal. The VCO 76 outputs the system clock signal to the A/D converters 11, 12, and 13, and other devices and circuits within the apparatus. The system clock signal has a frequency equal to a predetermined natural number times the frequency of the bit clock signal.

The phase comparator 74A receives the characteristic mode signal. The operation of the phase comparator 74A responds to the characteristic mode signal. When the characteristic mode signal indicates that the waveform of a signal reproduced from the optical disc 10A (see FIG. 1) is of the differential type, the phase comparator 74A implements phase comparison suited for a differential-type waveform. When the characteristic mode signal indicates that the waveform of a signal reproduced from the optical disc 10A (see FIG. 1) is of the integral type, the phase comparator 74A implements phase comparison suited for an integral-type waveform.

The apparatus of FIG. 52 includes a zero-cross detector 204, a peak detector 205, and a switch 206. The input terminal of the zero-cross detector 204 is connected to the output terminal of the delay adjuster 20. The output terminal of the zero-cross detector 204 is connected to the switch 206. The input terminal of the peak detector 205 is connected to the output terminal of the delay adjuster 20. The output terminal of the peak detector 205 is connected to the switch 206. The switch 206 is connected to the input terminal of the tap delay circuit 32.

The zero-cross detector 204 receives the output signal of the delay adjuster 20. The zero-cross detector 204 senses every inversion of the polarity of the output signal of the delay adjuster 20 by referring to two successive samples thereof. For every sensed polarity inversion, the zero-cross detector 204 selects one from among two related signal samples which is closer to "0". The zero-cross detector 204 sets a 0-point information value Z to "1" for the selected signal sample. The zero-cross detector 204 sets the 0-point information value Z to "0" for the other signal sample (the unselected signal sample). In the absence of a sensed polarity inversion, the zero-cross detector 204 continuously sets the 0-point information value Z to "0". Thus, the zero-cross detector 204 generates 0-point information representing the value Z. The zero-cross detector 204 outputs the 0-point information to the switch 206.

The peak detector 205 receives the output signal of the delay adjuster 20. The peak detector 205 calculates the slope (differential) of the level represented by the output signal of the delay adjuster 20 on the basis of two successive samples thereof. The peak detector 205 senses every inversion of the polarity of the calculated slope. The peak detector 205 senses a sample point immediately preceding the sample point corresponding to the sensed polarity inversion. The peak detector 205 sets a peak-point information value PK to "1" for the sensed sample point. The peak detector 205 sets the peak-point information value PK to "0" for the other sample points. Thus, the peak detector 205 generates peak-point information representing the value PK. The peak detector 205 outputs the peak-point information to the switch 206.

The switch 206 receives the characteristic mode signal. The switch 206 selects either the peak-point information or the 0-point information in response to the characteristic mode signal. Specifically, the switch 206 selects the peak-point information when the characteristic mode signal indicates that the waveform of a signal reproduced from the optical disc 10A (see FIG. 1) is of the differential type. The switch 206 selects the 0-point information when the characteristic mode signal indicates that the waveform of a signal reproduced from the optical disc 10A is of the integral type. The switch 206 outputs the selected point information to the tap delay circuit 32.

Thirtieth Embodiment

Figure 53:
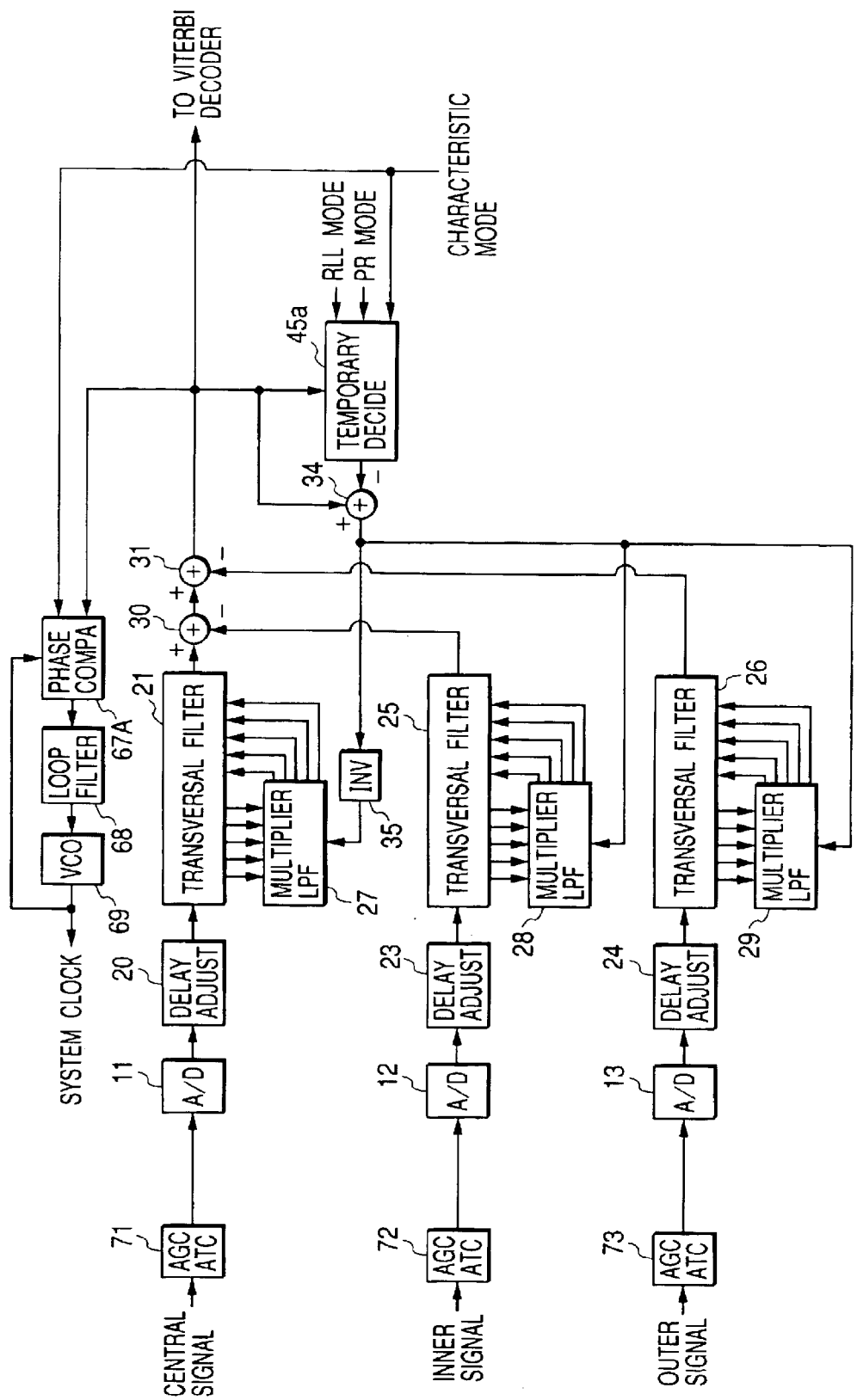
FIG. 53 is a block diagram of an information reproducing apparatus according to a thirtieth embodiment of this invention.

FIG. 53 shows an information reproducing apparatus according to a thirtieth embodiment of this invention. The apparatus of FIG. 53 is similar to the apparatus of FIG. 47 except for design changes mentioned hereafter.

The re-sampling DPLL section 17a and the re-sampling circuits 18 and 19 (see FIG. 17) are omitted from the apparatus of FIG. 53.

The apparatus of FIG. 53 includes an analog AGC/ATC circuit 71 which follows the optical head 10B (see FIG. 1). The analog AGC/ATC circuit 71 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the A/D converter 11. The A/D converter 11 changes the output signal of the analog AGC/ATC circuit 71 into a corresponding digital signal. Specifically, the A/D converter 11 periodically samples the output signal of the analog AGC/ATC circuit 71 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 53 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 53 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 53 includes a phase comparison circuit 67A, a loop filter 68, and a voltage-controlled oscillator (VCO) 69 which are connected in a closed loop in that order. The phase comparison circuit 67A is connected to the output terminal of the subtracter 31. The phase comparison circuit 67A receives the output signal of the subtracter 31. The circuit 67A detects every peak point or every zero-cross point of the output signal of the subtracter 31. The circuit 67A compares the phase of the detected point and the phase of a system clock signal fed from the VCO 69, and generates a phase error signal in response to the result of the phase comparison. The phase comparison circuit 67A compares the phase of the output signal of the subtracter 31 and the phase of a system clock signal fed from the VCO 69, and generates a phase error signal in response to the result of the phase comparison. The phase comparison circuit 67A outputs the phase error signal to the loop filter 68. The loop filter 68 converts the phase error signal into a control voltage. The loop filter 68 outputs the control voltage to the VCO 69. The VCO 69 oscillates at a frequency determined by the control voltage, and thereby generates the system clock signal. The VCO 69 outputs the system clock signal to the A/D converters 11, 12, and 13, and other devices and circuits within the apparatus. The system clock signal has a frequency equal to a predetermined natural number times the frequency of a bit clock signal.

The phase comparison circuit 67A includes a peak detector and a zero-cross detector. The peak detector in the phase comparison circuit 67A calculates the slope (differential) of the level represented by the output signal of the subtracter 31 on the basis of two successive samples thereof. The peak detector senses every inversion of the polarity of the calculated slope. The peak detector senses a sample point immediately preceding the sample point corresponding to the sensed polarity inversion. The peak detector sets a peak-point information value PK to "1" for the sensed sample point. The peak detector sets the peak-point information value PK to "0" for the other sample points. Thus, the peak detector generates peak-point information representing the value PK.

The zero-cross detector in the phase comparison circuit 67A senses every inversion of the polarity of the output signal of the subtracter 31 by referring to two successive samples thereof. For every sensed polarity inversion, the zero-cross detector selects one from among two related signal samples which is closer to "0". The zero-cross detector sets a 0-point information value Z to "1" for the selected signal sample. The zero-cross detector sets the 0-point information value Z to "0" for the other signal sample (the unselected signal sample). In the absence of a sensed polarity inversion, the zero-cross detector continuously sets the 0-point information value Z to "0". Thus, the zero-cross detector generates 0-point information representing the value Z.

The phase comparison circuit 67A includes a switch which receives the characteristic mode signal. The switch selects either the peak-point information or the 0-point information in response to the characteristic mode signal. Specifically, the switch selects the peak-point information when the characteristic mode signal indicates that the waveform of a signal reproduced from the optical disc 10A (see FIG. 1) is of the differential type. In this case, the phase error signal is generated on the basis of the peak-point information. The switch selects the 0-point information when the characteristic mode signal indicates that the waveform of a signal reproduced from the optical disc 10A is of the integral type. In this case, the phase error signal is generated on the basis of the 0-point information.

Thirty-First Embodiment

Figure 54:
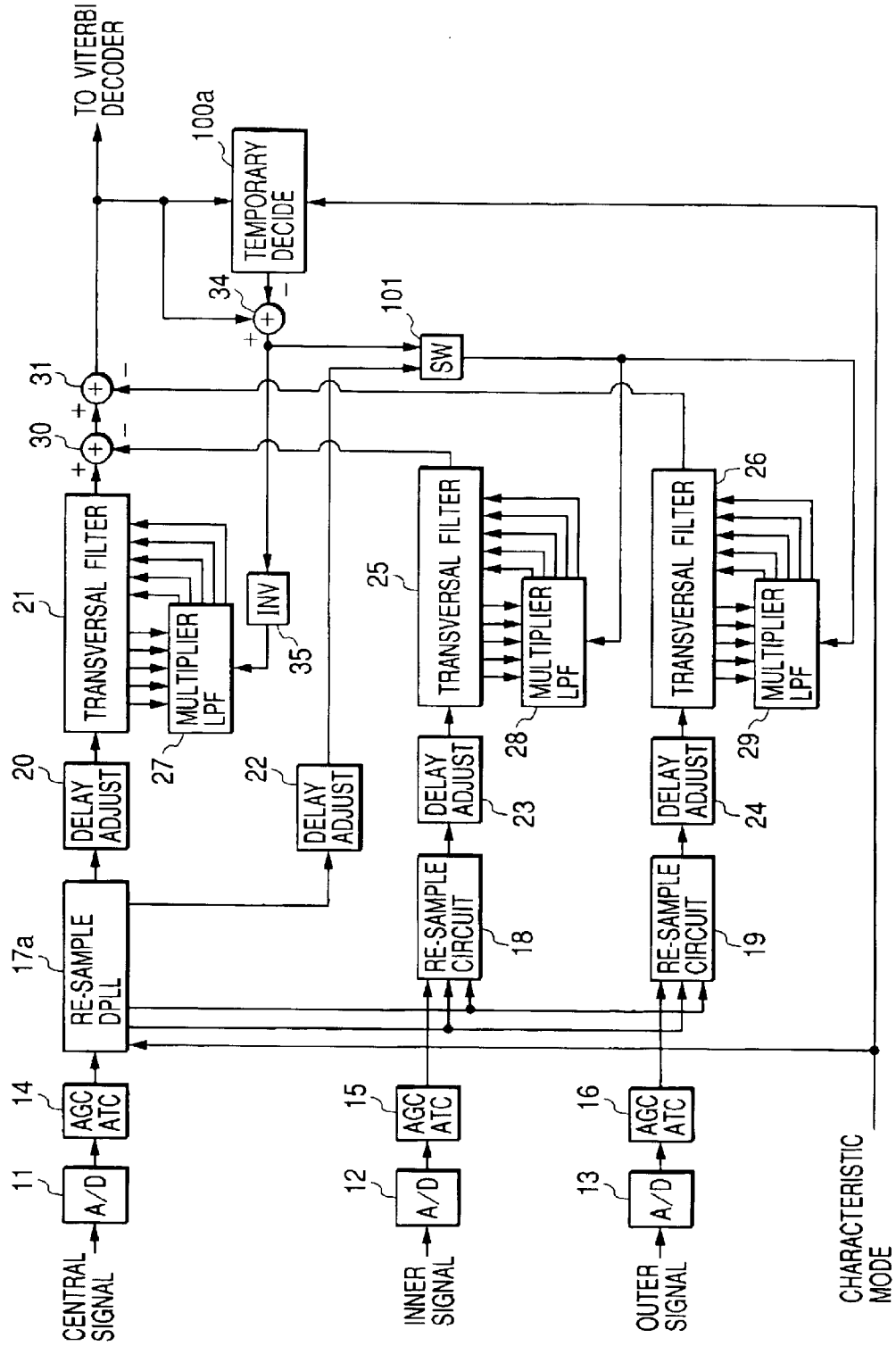
FIG. 54 is a block diagram of an information reproducing apparatus according to a thirty-first embodiment of this invention.

FIG. 54 shows an information reproducing apparatus according to a thirty-first embodiment of this invention. The apparatus of FIG. 54 is similar to the apparatus of FIG. 32 except that a temporary decision circuit 100a replaces the temporary decision circuit 33a (see FIG. 32), the tap delay circuit 32 (see FIG. 32) is omitted, and a switch 101 is additionally provided.

The temporary decision circuit 100a receives the output signal of the subtracter 31. The temporary decision circuit 100a implements a temporary decision about the output signal of the subtracter 31 by referring to a first group of predetermined threshold values for an integral-type waveform or a second group of predetermined threshold values for a differential-type waveform. Specifically, the predetermined threshold values in the first group correspond to first target levels (first desired levels) among which the level represented by the output signal of the subtracter 31 is changed in the case of an integral-type waveform. The predetermined threshold values in the second group correspond to second target levels (second desired levels) among which the level represented by the output signal of the subtracter 31 is changed in the case of a differential-type waveform. The temporary decision circuit 100a receives the characteristic mode signal. The operation of the temporary decision circuit 100a responds to the characteristic mode signal. When the characteristic mode signal indicates that the waveform of a signal reproduced from the optical disc 10A (see FIG. 1) is of the integral type, the temporary decision circuit 100a compares the current output signal of the subtracter 31 with the predetermined threshold values in the first group, and thereby selects one of the first target levels which best matches with the current output signal of the subtracter 31. The temporary decision circuit 100a generates a temporary decision result signal in accordance with the selected first target level. The temporary decision circuit 100a outputs the temporary decision result signal to the subtracter 34. On the other hand, when the characteristic mode signal indicates that the waveform of a signal reproduced from the optical disc 10A (see FIG. 1) is of the differential type, the temporary decision circuit 100a compares the current output signal of the subtracter 31 with the predetermined threshold values in the second group, and thereby selects one of the second target levels which best matches with the current output signal of the subtracter 31. The temporary decision circuit 100a generates a temporary decision result signal in accordance with the selected second target level. The temporary decision circuit 100a outputs the temporary decision result signal to the subtracter 34.

The switch 101 is connected to the subtracter 34, the delay adjuster 22, and the multiplier and LPF sections 28 and 29. The switch 101 receives the error signal from the subtracter 34. The switch 101 receives the point information from the delay adjuster 22. The switch 101 passes the error signal to the multiplier and LPF sections 28 and 29 when the value PK or Z represented by the point information is "1". The switch 101 inhibits the transmission of the error signal to the multiplier and LPF sections 28 and 29 when the value PK or Z represented by the point information is "0". Accordingly, the switch 101 selects only the error signal which corresponds to the timings of signal level peaks or zero-crosses.

Thirty-Second Embodiment

Figure 55:
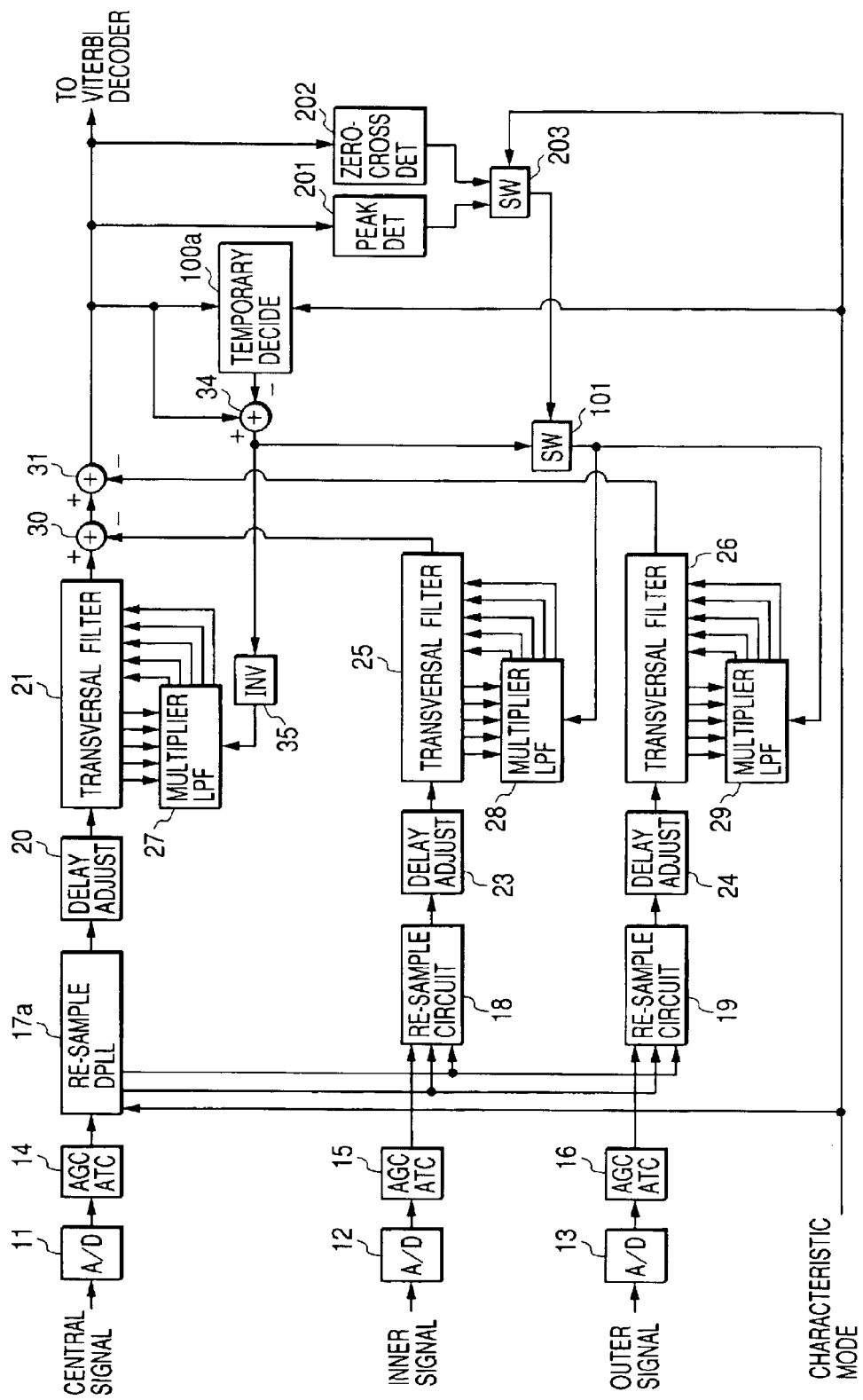
FIG. 55 is a block diagram of an information reproducing apparatus according to a thirty-second embodiment of this invention.

FIG. 55 shows an information reproducing apparatus according to a thirty-second embodiment of this invention. The apparatus of FIG. 55 is similar to the apparatus of FIG. 54 except for design changes mentioned hereafter.

The apparatus of FIG. 55 includes a peak detector 201, a zero-cross detector 202, and a switch 203. The delay adjuster 22 (see FIG. 32) is omitted from the apparatus of FIG. 55.

The input terminal of the peak detector 201 is connected to the output terminal of the subtracter 31. The output terminal of the peak detector 201 is connected to the switch 203. The input terminal of the zero-cross detector 202 is connected to the output terminal of the subtracter 31. The output terminal of the zero-cross detector 202 is connected to the switch 203. The switch 203 is connected to the switch 101.

The peak detector 201 receives the output signal of the subtracter 31. The peak detector 201 calculates the slope (differential) of the level represented by the output signal of the subtracter 31 on the basis of two successive samples thereof. The peak detector 201 senses every inversion of the polarity of the calculated slope. The peak detector 201 senses a sample point immediately preceding the sample point corresponding to the sensed polarity inversion. The peak detector 201 sets a peak-point information value PK to "1" for the sensed sample point. The peak detector 201 sets the peak-point information value PK to "0" for the other sample points. Thus, the peak detector 201 generates peak-point information representing the value PK. The peak detector 201 outputs the peak-point information to the switch 203.

The zero-cross detector 202 receives the output signal of the subtracter 31. The zero-cross detector 202 senses every inversion of the polarity of the output signal of the subtracter 31 by referring to two successive samples thereof. For every sensed polarity inversion, the zero-cross detector 202 selects one from among two related signal samples which is closer to "0". The zero-cross detector 202 sets a 0-point information value Z to "1" for the selected signal sample. The zero-cross detector 202 sets the 0-point information value Z to "0" for the other signal sample (the unselected signal sample). In the absence of a sensed polarity inversion, the zero-cross detector 202 continuously sets the 0-point information value Z to "0". Thus, the zero-cross detector 202 generates 0-point information representing the value Z. The zero-cross detector 202 outputs the 0-point information to the switch 203.

The switch 203 receives the characteristic mode signal. The switch 203 selects either the peak-point information or the 0-point information in response to the characteristic mode signal. Specifically, the switch 203 selects the peak-point information when the characteristic mode signal indicates that the waveform of a signal reproduced from the optical disc 10A (see FIG. 1) is of the differential type. The switch 203 selects the 0-point information when the characteristic mode signal indicates that the waveform of a signal reproduced from the optical disc 10A is of the integral type. The switch 203 outputs the selected point information to the switch 101.

Thirty-Third Embodiment

Figure 56:
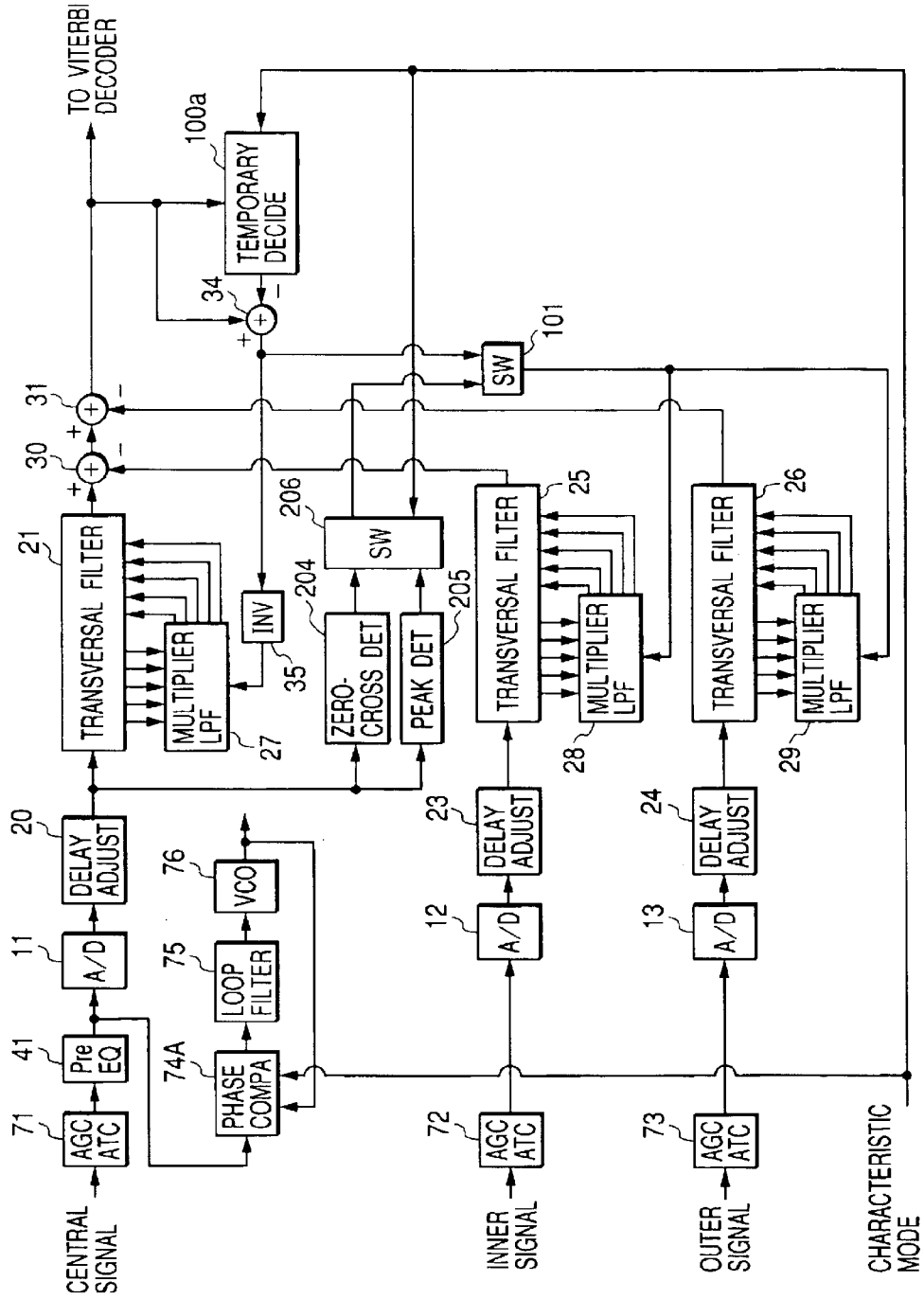
FIG. 56 is a block diagram of an information reproducing apparatus according to a thirty-third embodiment of this invention.

FIG. 56 shows an information reproducing apparatus according to a thirty-third embodiment of this invention. The apparatus of FIG. 56 is similar to the apparatus of FIG. 55 except for design changes mentioned hereafter.

The re-sampling DPLL section 17a and the re-sampling circuits 18 and 19 (see FIG. 55) are omitted from the apparatus of FIG. 56.

The apparatus of FIG. 56 includes an analog AGC/ATC circuit 71 and an analog fixed equalizer (an analog pre-equalizer) 41. The analog AGC/ATC circuit 71 follows the optical head 10B (see FIG. 1). The analog AGC/ATC circuit 71 is connected to the analog fixed equalizer 41. The analog fixed equalizer 41 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the analog fixed equalizer 41. The analog fixed equalizer 41 subjects the output signal of the analog AGC/ATC circuit 71 to a fixed equalization process. The analog fixed equalizer 41 outputs the equalization-resultant signal to the A/D converter 11. The A/D converter 11 changes the output signal of the analog fixed equalizer 41 into a corresponding digital signal. Specifically, the A/D converter 11 periodically samples the output signal of the analog fixed equalizer 41 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 56 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 56 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 56 includes a phase comparator 74A, a loop filter 75, and a voltage-controlled oscillator (VCO) 76 which are connected in a closed loop in that order. The phase comparator 74A is connected to the output side of the analog fixed equalizer 41. The device 74A compares the phase of the output signal of the analog fixed equalizer 41 and the phase of a system clock signal fed from the VCO 76, and generates a phase error signal in response to the result of the phase comparison. The phase comparator 74 outputs the phase error signal to the loop filter 75. The loop filter 75 converts the phase error signal into a control voltage. The loop filter 75 outputs the control voltage to the VCO 76. The VCO 76 oscillates at a frequency determined by the control voltage, and thereby generates the system clock signal. The VCO 76 outputs the system clock signal to the A/D converters 11, 12, and 13, and other devices and circuits within the apparatus. The system clock signal has a frequency equal to a predetermined natural number times the frequency of the bit clock signal.

The phase comparator 74A receives the characteristic mode signal. The operation of the phase comparator 74A responds to the characteristic mode signal. When the characteristic mode signal indicates that the waveform of a signal reproduced from the optical disc 10A (see FIG. 1) is of the differential type, the phase comparator 74A implements phase comparison suited for a differential-type waveform. When the characteristic mode signal indicates that the waveform of a signal reproduced from the optical disc 10A (see FIG. 1) is of the integral type, the phase comparator 74A implements phase comparison suited for an integral-type waveform.

The apparatus of FIG. 56 includes a zero-cross detector 204, a peak detector 205, and a switch 206. The input terminal of the zero-cross detector 204 is connected to the output terminal of the delay adjuster 20. The output terminal of the zero-cross detector 204 is connected to the switch 206. The input terminal of the peak detector 205 is connected to the output terminal of the delay adjuster 20. The output terminal of the peak detector 205 is connected to the switch 206. The switch 206 is connected to the switch 101.

The zero-cross detector 204 receives the output signal of the delay adjuster 20. The zero-cross detector 204 senses every inversion of the polarity of the output signal of the delay adjuster 20 by referring to two successive samples thereof. For every sensed polarity inversion, the zero-cross detector 204 selects one from among two related signal samples which is closer to "0". The zero-cross detector 204 sets a 0-point information value Z to "1" for the selected signal sample. The zero-cross detector 204 sets the 0-point information value Z to "0" for the other signal sample (the unselected signal sample). In the absence of a sensed polarity inversion, the zero-cross detector 204 continuously sets the 0-point information value Z to "0". Thus, the zero-cross detector 204 generates 0-point information representing the value Z. The zero-cross detector 204 outputs the 0-point information to the switch 206.

The peak detector 205 receives the output signal of the delay adjuster 20. The peak detector 205 calculates the slope (differential) of the level represented by the output signal of the delay adjuster 20 on the basis of two successive samples thereof. The peak detector 205 senses every inversion of the polarity of the calculated slope. The peak detector 205 senses a sample point immediately preceding the sample point corresponding to the sensed polarity inversion. The peak detector 205 sets a peak-point information value PK to "1" for the sensed sample point. The peak detector 205 sets the peak-point information value PK to "0" for the other sample points. Thus, the peak detector 205 generates peak-point information representing the value PK. The peak detector 205 outputs the peak-point information to the switch 206.

The switch 206 receives the characteristic mode signal. The switch 206 selects either the peak-point information or the 0-point information in response to the characteristic mode signal. Specifically, the switch 206 selects the peak-point information when the characteristic mode signal indicates that the waveform of a signal reproduced from the optical disc 10A (see FIG. 1) is of the differential type. The switch 206 selects the 0-point information when the characteristic mode signal indicates that the waveform of a signal reproduced from the optical disc 10A is of the integral type. The switch 206 outputs the selected point information to the switch 101.

Thirty-Fourth Embodiment

Figure 57:
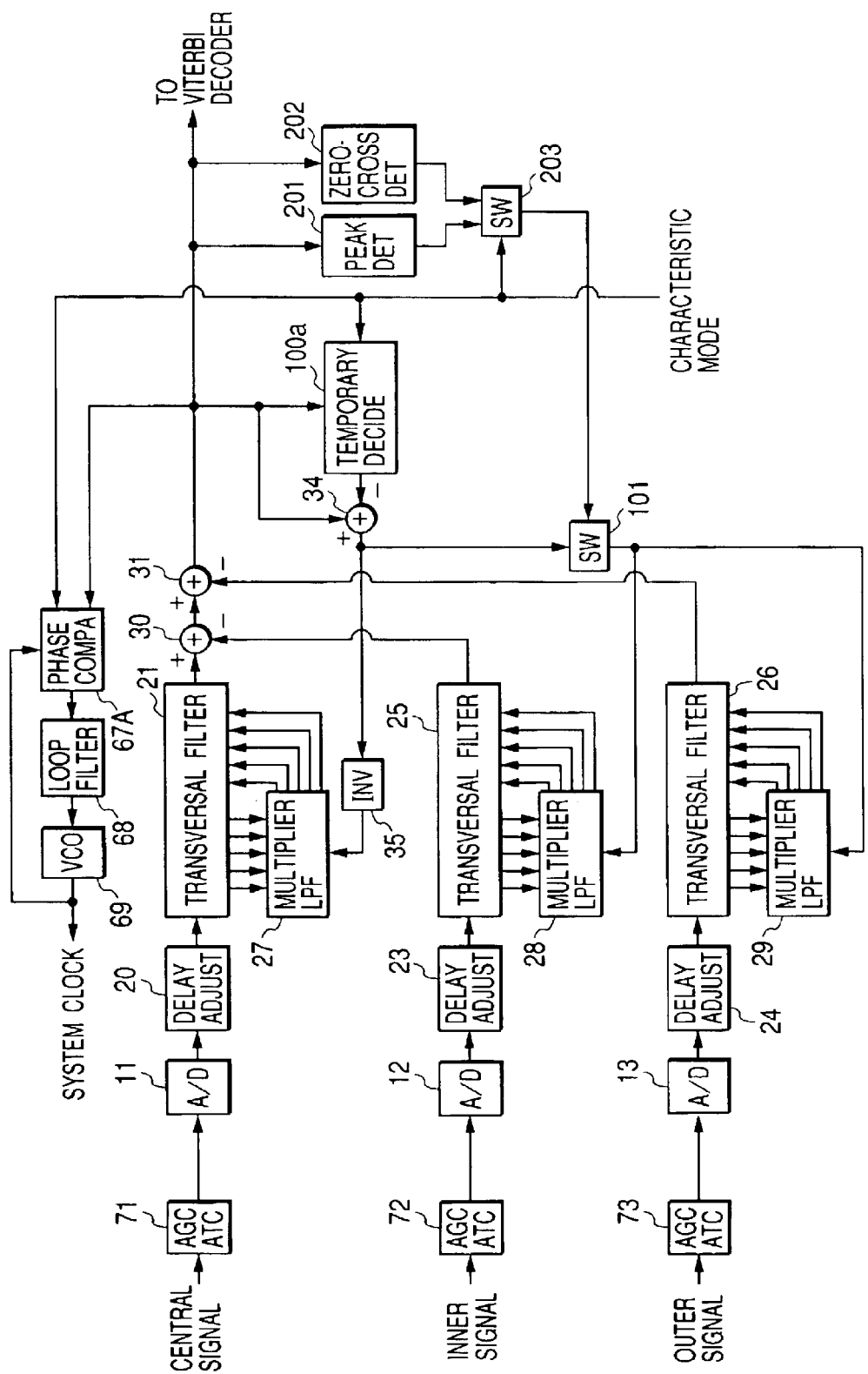
FIG. 57 is a block diagram of an information reproducing apparatus according to a thirty-fourth embodiment of this invention.

FIG. 57 shows an information reproducing apparatus according to a thirty-fourth embodiment of this invention. The apparatus of FIG. 57 is similar to the apparatus of FIG. 55 except for design changes mentioned hereafter.

The re-sampling DPLL section 17a and the re-sampling circuits 18 and 19 (see FIG. 55) are omitted from the apparatus of FIG. 57.

The apparatus of FIG. 57 includes an analog AGC/ATC circuit 71 which follows the optical head 10B (see FIG. 1). The analog AGC/ATC circuit 71 is connected to the A/D converter 11. The A/D converter 11 is directly connected to the delay adjuster 20.

The analog AGC/ATC circuit 71 receives the central readout signal from the optical head 10B (see FIG. 1). The analog AGC/ATC circuit 71 subjects the central readout signal to an AGC/ATC process of controlling a signal amplitude at a constant level. The analog AGC/ATC circuit 71 outputs the resultant signal to the A/D converter 11. The A/D converter 11 changes the output signal of the analog AGC/ATC circuit 71 into a corresponding digital signal. Specifically, the A/D converter 11 periodically samples the output signal of the analog AGC/ATC circuit 71 in response to a system clock signal (or a bit clock signal), and converts every resultant sample into a digital sample. The resultant digital signal is transmitted from the A/D converter 11 to the transversal filter 21 via the delay adjuster 20.

The apparatus of FIG. 57 includes an analog AGC/ATC circuit 72 which follows the optical head 10B (see FIG. 1). The analog AGC/ATC circuit 72 is connected to the A/D converter 12. The A/D converter 12 is directly connected to the delay adjuster 23.

The analog AGC/ATC circuit 72 receives the inner readout signal from the optical head 10B (see FIG. 1). The analog AGC/ATC circuit 72 subjects the inner readout signal to an AGC/ATC process of controlling a signal amplitude at a constant level. The analog AGC/ATC circuit 72 outputs the resultant signal to the A/D converter 12. The A/D converter 12 changes the output signal of the analog AGC/ATC circuit 72 into a corresponding digital signal. Specifically, the A/D converter 12 periodically samples the output signal of the analog AGC/ATC circuit 72 in response to the system clock signal (or the bit clock signal), and converts every resultant sample into a digital sample. The resultant digital signal is transmitted from the A/D converter 12 to the transversal filter 25 via the delay adjuster 23.

The apparatus of FIG. 57 includes an analog AGC/ATC circuit 73 which follows the optical head 10B (see FIG. 1). The analog AGC/ATC circuit 73 is connected to the A/D converter 13. The A/D converter 13 is directly connected to the delay adjuster 24.

The analog AGC/ATC circuit 73 receives the outer readout signal from the optical head 10B (see FIG. 1). The analog AGC/ATC circuit 73 subjects the outer readout signal to an AGC/ATC process of controlling a signal amplitude at a constant level. The analog AGC/ATC circuit 73 outputs the resultant signal to the A/D converter 13. The A/D converter 13 changes the output signal of the analog AGC/ATC circuit 73 into a corresponding digital signal. Specifically, the A/D converter 13 periodically samples the output signal of the analog AGC/ATC circuit 73 in response to the system clock signal (or the bit clock signal), and converts every resultant sample into a digital sample. The resultant digital signal is transmitted from the A/D converter 13 to the transversal filter 26 via the delay adjuster 24.

The apparatus of FIG. 57 includes a phase comparison circuit 67A, a loop filter 68, and a voltage-controlled oscillator (VCO) 69 which are connected in a closed loop in that order. The phase comparison circuit 67A is connected to the output terminal of the subtracter 31. The phase comparison circuit 67A receives the output signal of the subtracter 31. The circuit 67A detects every peak point or every zero-cross point of the output signal of the subtracter 31. The circuit 67A compares the phase of the detected point and the phase of a system clock signal fed from the VCO 69, and generates a phase error signal in response to the result of the phase comparison. The phase comparison circuit 67A compares the phase of the output signal of the subtracter 31 and the phase of a system clock signal fed from the VCO 69, and generates a phase error signal in response to the result of the phase comparison. The phase comparison circuit 67A outputs the phase error signal to the loop filter 68. The loop filter 68 converts the phase error signal into a control voltage. The loop filter 68 outputs the control voltage to the VCO 69. The VCO 69 oscillates at a frequency determined by the control voltage, and thereby generates the system clock signal. The VCO 69 outputs the system clock signal to the A/D converters 11, 12, and 13, and other devices and circuits within the apparatus. The system clock signal has a frequency equal to a predetermined natural number times the frequency of a bit clock signal.

The phase comparison circuit 67A includes a peak detector and a zero-cross detector. The peak detector in the phase comparison circuit 67A calculates the slope (differential) of the level represented by the output signal of the subtracter 31 on the basis of two successive samples thereof. The peak detector senses every inversion of the polarity of the calculated slope. The peak detector senses a sample point immediately preceding the sample point corresponding to the sensed polarity inversion. The peak detector sets a peak-point information value PK to "1" for the sensed sample point. The peak detector sets the peak-point information value PK to "0" for the other sample points. Thus, the peak detector generates peak-point information representing the value PK.

The zero-cross detector in the phase comparison circuit 67A senses every inversion of the polarity of the output signal of the subtracter 31 by referring to two successive samples thereof. For every sensed polarity inversion, the zero-cross detector selects one from among two related signal samples which is closer to "0". The zero-cross detector sets a 0-point information value Z to "1" for the selected signal sample. The zero-cross detector sets the 0-point information value Z to "0" for the other signal sample (the unselected signal sample). In the absence of a sensed polarity inversion, the zero-cross detector continuously sets the 0-point information value Z to "0". Thus, the zero-cross detector generates 0-point information representing the value Z.

The phase comparison circuit 67A includes a switch which receives the characteristic mode signal. The switch selects either the peak-point information or the 0-point information in response to the characteristic mode signal. Specifically, the switch selects the peak-point information when the characteristic mode signal indicates that the waveform of a signal reproduced from the optical disc 10A (see FIG. 1) is of the differential type. In this case, the phase error signal is generated on the basis of the peak-point information. The switch selects the 0-point information when the characteristic mode signal indicates that the waveform of a signal reproduced from the optical disc 10A is of the integral type. In this case, the phase error signal is generated on the basis of the 0-point information.

Thirty-Fifth Embodiment

Figure 58:
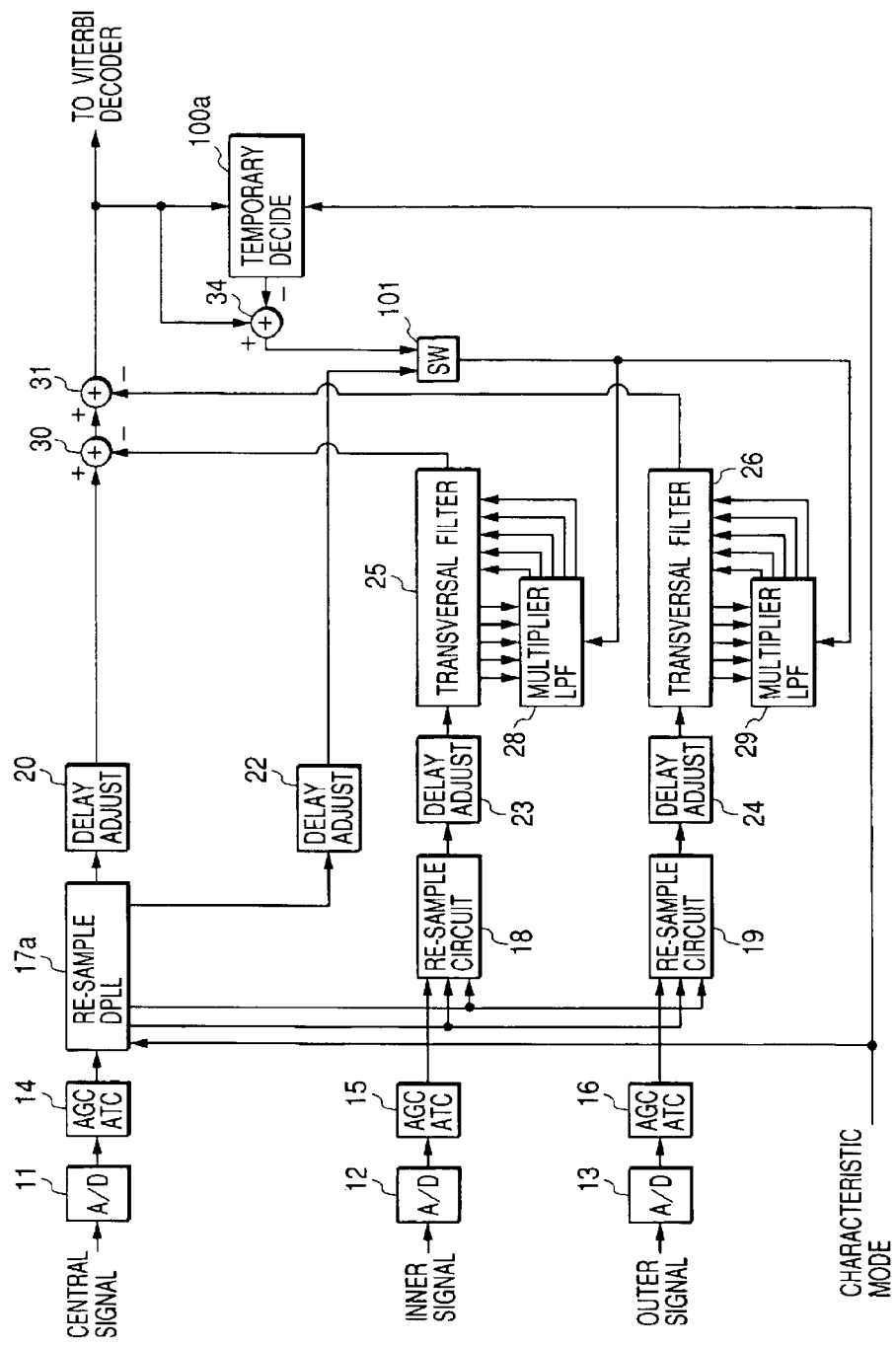
FIG. 58 is a block diagram of an information reproducing apparatus according to a thirty-fifth embodiment of this invention.

FIG. 58 shows an information reproducing apparatus according to a thirty-fifth embodiment of this invention. The apparatus of FIG. 58 is similar to the apparatus of FIG. 54 except for design changes mentioned hereafter.

The transversal filter 21, the multiplier and LPF section 27, and the inverter 35 (see FIG. 54) are omitted from the apparatus of FIG. 58. Accordingly, in the apparatus of FIG. 58, the delay adjuster 20 is directly connected to the subtracter 30. The second central digital signal is transmitted from the re-sampling DPLL section 17a to the subtracter 30 via the delay adjuster 20. The device 30 subtracts the output signal of the transversal filter 25 from the output signal of the delay adjuster 20.

The temporary decision circuit 100a may be replaced by a signal generator which responds to the characteristic mode signal as follows. When the characteristic mode signal indicates that the waveform of a signal reproduced from the optical disc 10A (see FIG. 1) is of the differential type, the signal generator produces and outputs a prescribed reference signal representing a target sample peak level (a desired sample peak level). When the characteristic mode signal indicates that the waveform of a signal reproduced from the optical disc 10A (see FIG. 1) is of the integral type, the signal generator produces and outputs a prescribed reference signal representing a target zero level (a desired zero level).

Thirty-Sixth Embodiment

Figure 59:
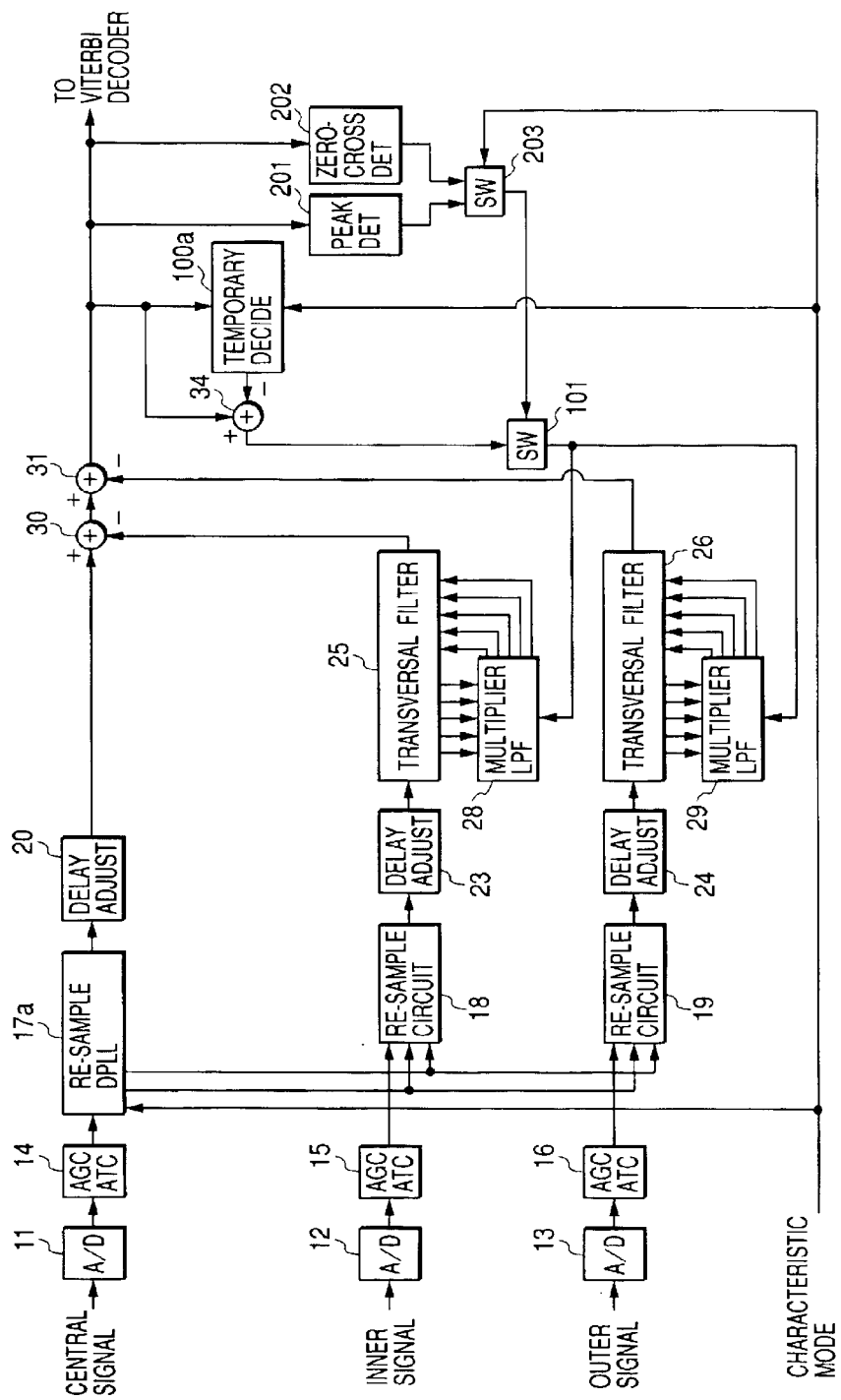
FIG. 59 is a block diagram of an information reproducing apparatus according to a thirty-sixth embodiment of this invention.

FIG. 59 shows an information reproducing apparatus according to a thirty-sixth embodiment of this invention. The apparatus of FIG. 59 is similar to the apparatus of FIG. 55 except for design changes mentioned hereafter.

The transversal filter 21, the multiplier and LPF section 27, and the inverter 35 (see FIG. 25) are omitted from the apparatus of FIG. 59. Accordingly, in the apparatus of FIG. 59, the delay adjuster 20 is directly connected to the subtracter 30. The second central digital signal is transmitted from the re-sampling DPLL section 17a to the subtracter 30 via the delay adjuster 20. The device 30 subtracts the output signal of the transversal filter 25 from the output signal of the delay adjuster 20. The temporary decision circuit 100a may be replaced by a signal generator which responds to the characteristic mode signal as follows. When the characteristic mode signal indicates that the waveform of a signal reproduced from the optical disc 10A (see FIG. 1) is of the differential type, the signal generator produces and outputs a prescribed reference signal representing a target sample peak level (a desired sample peak level). When the characteristic mode signal indicates that the waveform of a signal reproduced from the optical disc 10A (see FIG. 1) is of the integral type, the signal generator produces and outputs a prescribed reference signal representing a target zero level (a desired zero level).

Thirty-Seventh Embodiment

Figure 60:
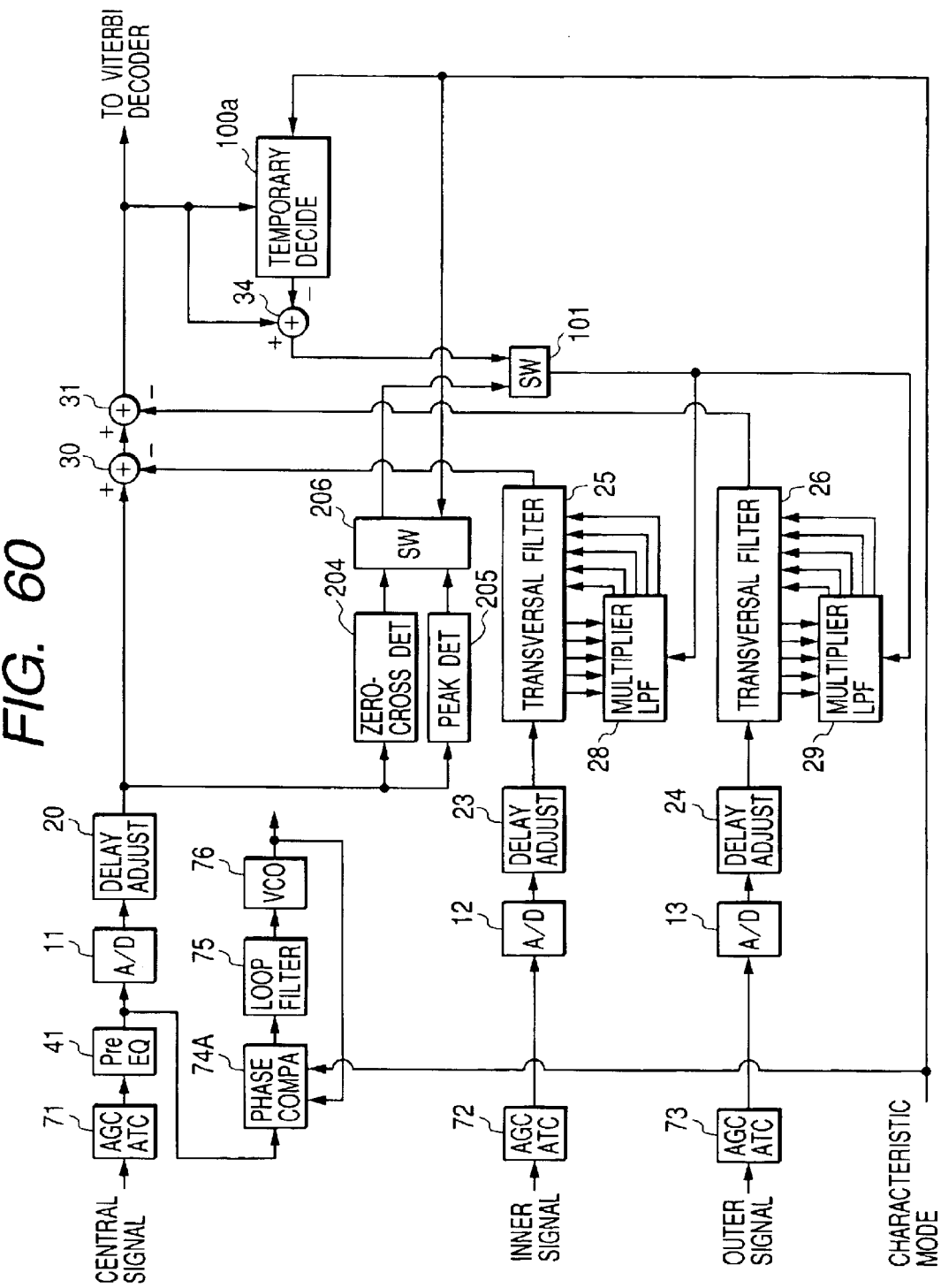
FIG. 60 is a block diagram of an information reproducing apparatus according to a thirty-seventh embodiment of this invention.

FIG. 60 shows an information reproducing apparatus according to a thirty-seventh embodiment of this invention. The apparatus of FIG. 60 is similar to the apparatus of FIG. 56 except for design changes mentioned hereafter.

The transversal filter 21, the multiplier and LPF section 27, and the inverter 35 (see FIG. 26) are omitted from the apparatus of FIG. 60. Accordingly, in the apparatus of FIG. 60, the delay adjuster 20 is directly connected to the subtracter 30. The central digital signal is transmitted from the A/D converter 11 to the subtracter 30 via the delay adjuster 20. The device 30 subtracts the output signal of the transversal filter 25 from the output signal of the delay adjuster 20.

The temporary decision circuit 100a may be replaced by a signal generator which responds to the characteristic mode signal as follows. When the characteristic mode signal indicates that the waveform of a signal reproduced from the optical disc 10A (see FIG. 1) is of the differential type, the signal generator produces and outputs a prescribed reference signal representing a target sample peak level (a desired sample peak level). When the characteristic mode signal indicates that the waveform of a signal reproduced from the optical disc 10A (see FIG. 1) is of the integral type, the signal generator produces and outputs a prescribed reference signal representing a target zero level (a desired zero level).

Thirty-Eighth Embodiment

Figure 61:
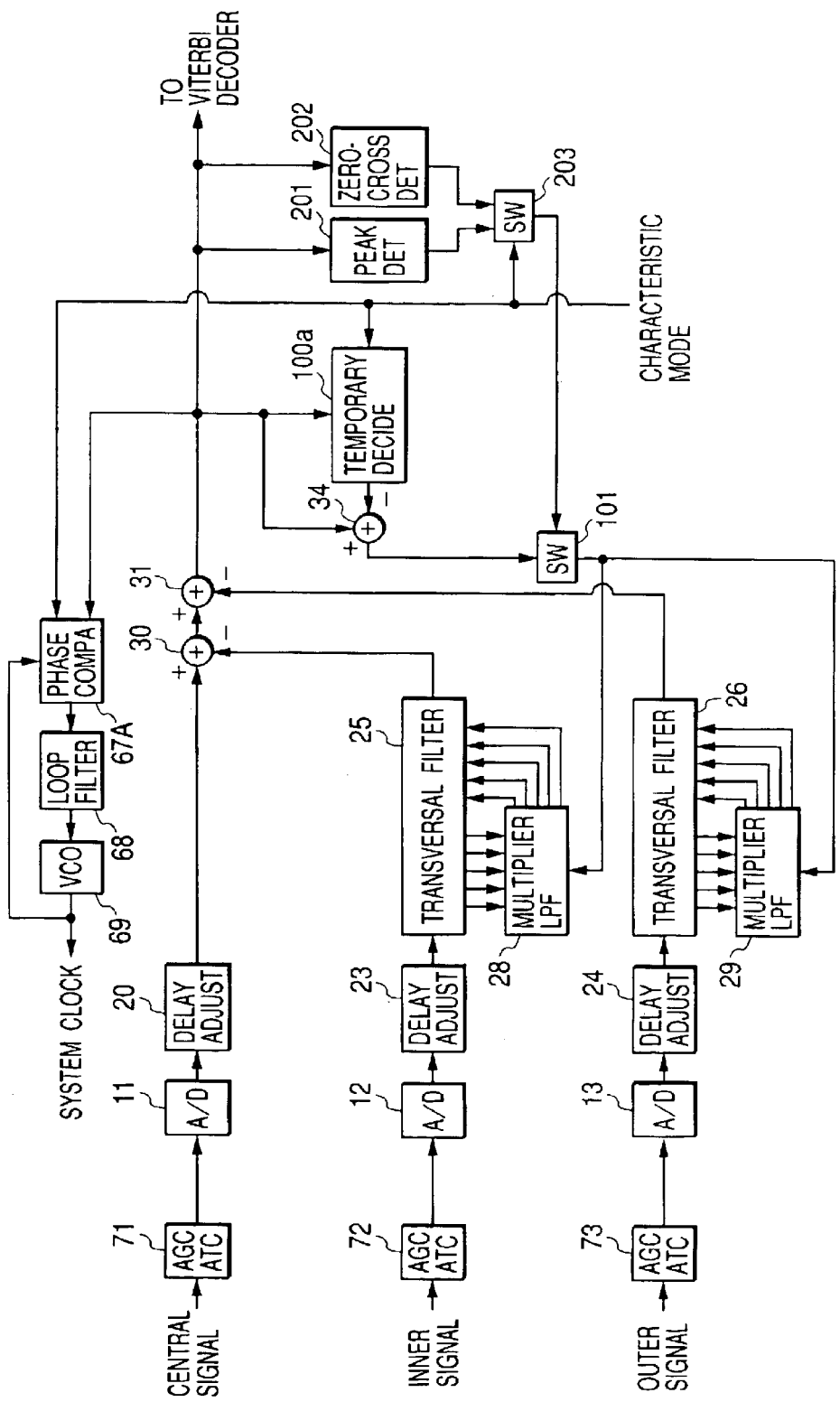
FIG. 61 is a block diagram of an information reproducing apparatus according to a thirty-eighth embodiment of this invention.

FIG. 61 shows an information reproducing apparatus according to a thirty-eighth embodiment of this invention. The apparatus of FIG. 61 is similar to the apparatus of FIG. 57 except for design changes mentioned hereafter.

The transversal filter 21, the multiplier and LPF section 27, and the inverter 35 (see FIG. 57) are omitted from the apparatus of FIG. 61. Accordingly, in the apparatus of FIG. 61, the delay adjuster 20 is directly connected to the subtracter 30. The central digital signal is transmitted from the A/D converter 11 to the subtracter 30 via the delay adjuster 20. The device 30 subtracts the output signal of the transversal filter 25 from the output signal of the delay adjuster 20.

The temporary decision circuit 100a may be replaced by a signal generator which responds to the characteristic mode signal as follows. When the characteristic mode signal indicates that the waveform of a signal reproduced from the optical disc 10A (see FIG. 1) is of the differential type, the signal generator produces and outputs a prescribed reference signal representing a target sample peak level (a desired sample peak level). When the characteristic mode signal indicates that the waveform of a signal reproduced from the optical disc 10A (see FIG. 1) is of the integral type, the signal generator produces and outputs a prescribed reference signal representing a target zero level (a desired zero level).

Thirty-Ninth Embodiment

An information reproducing apparatus in a thirty-ninth embodiment of this invention is a modification of the apparatus of one of embodiments among the twenty-first to thirty-eighth embodiments thereof which include the re-sampling DPLL section 17a. In the apparatus of the thirty-ninth embodiment of this invention, the re-sampling DPLL section 17a implements a PLL-based process, and 0-point information and peak-point information are generated by a zero-cross detector and a peak detector which operate on a signal resulting from the PLL-based process.

Fortieth Embodiment

An information reproducing apparatus in a fortieth embodiment of this invention is a modification of the apparatus of FIG. 32. In the apparatus of the fortieth embodiment of this invention, the delay adjusters 20, 23, and 24 are located at stages immediately preceding the AGC/ATC circuits 14, 15, and 16, respectively. It should be noted that the delay adjusters 20, 23, and 24 may be omitted.

Forty-First Embodiment

An information reproducing apparatus in a forty-first embodiment of this invention is a modification of the apparatus in one of the twenty-first to fortieth embodiments thereof. One of the two apparatus portions for generating the pseudo crosstalk signals is omitted from the apparatus of the forty-first embodiment of this invention.

The apparatus of the forty-first embodiment of this invention includes a tilt sensor for detecting an angle of the application of the forward laser beams to the optical disc 10A (see FIG. 1). The apparatus also includes a decision circuit (or a comparator) for deciding which of the inner and outer readout signals outputted from the optical head 10B (see FIG. 1) is richer in crosstalk components on the basis of the output signal of the tilt sensor. The decision circuit outputs a signal representing the result of the decision. The apparatus further includes a switch for selecting one of the inner and outer readout signals in response to the output signal of the decision circuit, and for feeding the selected readout signal to the apparatus portion for generating the pseudo crosstalk signal. Specifically, the switch selects one of the inner and outer readout signals which is decided to be richer in crosstalk components.

Forty-Second Embodiment

An information reproducing apparatus in a forty-second embodiment of this invention is a modification of the apparatus in one of embodiments among the first to forty-first embodiments thereof which include the temporary decision circuit 33 or 33a.

In the apparatus of the forty-second embodiment of this invention, the temporary decision circuit 33 or 33a refers to only three successive peak-point information values PK. The central-place value (the second-place value) among the three successive peak-point information values PK corresponds to a sample point of interest.

Figure 62:
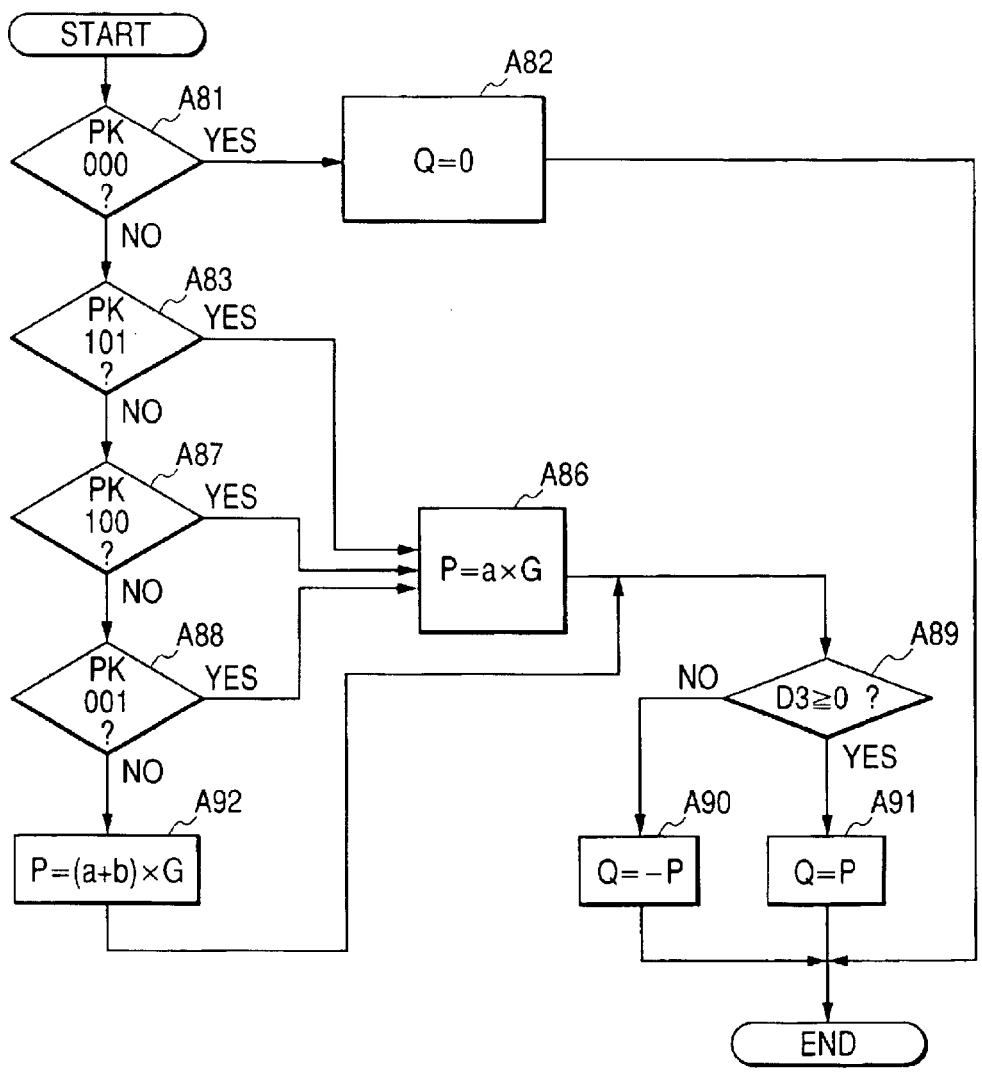
FIG. 62 is a flowchart of an algorithm of a temporary decision by a temporary decision circuit in a forty-second embodiment of this invention.

FIG. 62 is a flowchart of an algorithm of a temporary decision by the temporary decision circuit 33 or 33a in the forty-second embodiment of this invention. The temporary decision is executed for every period of the bit clock signal.

As shown in FIG. 62, a first step A81 of the algorithm decides whether or not three successive peak-point information values PK represented by output signals of the tap delay circuit 32 are "000". When the three successive peak-point information values PK are "000", the algorithm advances from the step A81 to a step A82. Otherwise, the algorithm advances from the step A81 to a step A83.

In the case where the three successive peak-point information values PK are "000", the before-equalization signal waveform is fixed to a signal level of "0" for a long time interval centered at the sample point of interest. Thus, in this case, the step A82 sets a temporary decision level (a temporary decision value or a temporary decision result value) Q to "0" according to the previously-indicated equation (1). After the step A82, the current execution cycle of the temporary decision ends.

The step A83 decides whether or not the three successive peak-point information values PK are "101". When the three successive peak-point information values PK are "101", the algorithm advances from the step A83 to a step A86. Otherwise, the algorithm advances from the step A83 to a step A87.

The step A87 decides whether or not the three successive peak-point information values PK are "100". When the three successive peak-point information values PK are "100", the algorithm advances from the step A87 to the step A86. Otherwise, the algorithm advances from the step A87 to a step A88.

The step A88 decides whether or not the three successive peak-point information values PK are "001". When the three successive peak-point information values PK are "001", the algorithm advances from the step A88 to the step A86. Otherwise, the algorithm advances from the step A88 to a step A92.

In the case where the three successive peak-point information values PK are "101", "100", or "001", the sample point of interest (the central sample point) does not correspond to a peak while at least one of the two sample points immediately neighboring the sample point of interest corresponds to a peak. In this case, the step A86 sets an intermediate value P to "a·G" according to the previously-indicated equation (2). After the step A86, the algorithm advances to a step A89.

In the case where the three successive peak-point information values PK differ from "000", "101", "100", and "001" (for example, in the case where the sample point of interest or the central-place sample point corresponds to a peak), the step A92 sets the intermediate value P to "(a+b)·G" according to the previously-indicated equation (3). After the step A92, the algorithm advances to the step A89.

The step A89 detects the polarity of the present-moment signal D3 (the output signal of the subtracter 31). Specifically, the step A89 decides whether or not the present-moment signal D3 is smaller than "0". When the present-moment signal D3 is equal to or greater than "0", the algorithm advances from the step A89 to a step A91. When the present-moment signal D3 is smaller than "0", the algorithm advances from the step A89 to a step A90.

The step A91 sets a temporary decision level (a temporary decision value or a temporary decision result value) Q equal to the value P. In other words, the step A91 executes the statement "Q=P". On the other hand, the step A90 sets the temporary decision level Q equal to the value −P (the value P multiplied by −1). In other words, the step A90 executes the statement "Q=−P". After the steps A90 and A91, the current execution cycle of the temporary decision ends.

The temporary decision circuit 33 or 33a outputs a signal representative of the temporary decision level (the temporary decision value) Q to the subtracter 34 as a temporary decision result signal. The temporary decision value Q is determined on the basis of one of the previously-indicated equations (1), (2), and (3). Accordingly, the equalization by the transversal filter 21 is based on one of the equations (1), (2), and (3). The equalization based on one of the equations (1), (2), and (3) is periodically executed in response to the polarity of the present-moment signal D3 at a timing of the central-place one (the second-place one) among three successive peak-point information values PK.

Forty-Third Embodiment

An information reproducing apparatus in a forty-third embodiment of this invention is a modification of the apparatus in one of embodiments among the twenty-first to forty-second embodiments thereof which include the temporary decision circuit 33a.

In the apparatus of the forty-third embodiment of this invention, the temporary decision circuit 33a refers to only three successive 0-point information values Z during the execution of an integral-type-signal algorithm of a temporary decision. The central-place value (the second-place value) among the three successive 0-point information values Z corresponds to a sample point of interest.

Figure 63:
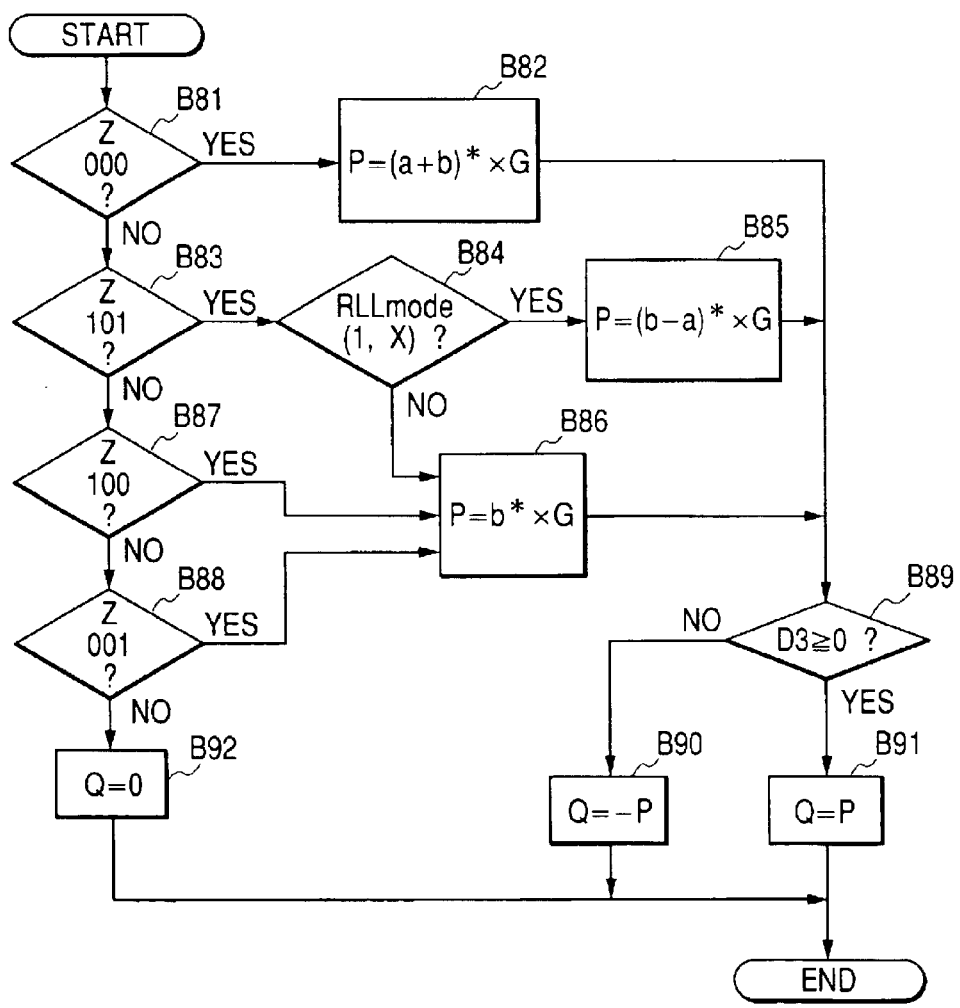
FIG. 63 is a flowchart of an algorithm of a temporary decision by a temporary decision circuit in a forty-third embodiment of this invention.

FIG. 63 is a flowchart of the integral-type-signal algorithm of the temporary decision by the temporary decision device 33a in the forty-third embodiment of this invention. The temporary decision is executed for every period of the bit clock signal.

As shown in FIG. 63, a first step B81 of the algorithm decides whether or not three successive 0-point information values Z represented by output signals of the tap delay circuit 32 are "000". When the three successive 0-point information values Z are "000", the algorithm advances from the step B81 to a step B82. Otherwise, the algorithm advances from the step B81 to a step B83.

In the case where the three successive 0-point information values Z are "000", the before-equalization signal waveform is fixed in a positive side or a negative side for a long time interval centered at the sample point of interest. Thus, in this case, the step B82 calculates a relatively large value P according to the previously-indicated equation (11). After the step B82, the algorithm advances to a step B89.

The step B83 decides whether or not the three successive 0-point information values Z are "101". When the three successive 0-point information values Z are "101", the algorithm advances from the step B83 to a step B84. Otherwise, the algorithm advances from the step B83 to a step B87.

The step B84 decides whether or not the RLL mode signal represents RLL (1, X). When the RLL mode signal represents RLL (1, X), the algorithm advances from the step B84 to a step B85. Otherwise, the program advances from the step B84 to a step B86.

Three successive 0-point information values Z being "101" can occur only in the case of RLL (1, X). According to the before-equalization signal waveform which corresponds to three successive 0-point information values Z being "101", the signal polarity changes at an early stage. Thus, in this case, the step B85 calculates a relatively small value P according to the previously-indicated equation (12). After the step B85, the algorithm advances to the step B89.

The step B87 decides whether or not the three successive 0-point information values Z are "100". When the three successive 0-point information values Z are "100", the algorithm advances from the step B87 to the step B86. Otherwise, the algorithm advances from the step B87 to a step B88.

The step B88 decides whether or not the three successive 0-point information values Z are "001". When the three successive 0-point information values Z are "001", the algorithm advances from the step B88 to the step B86. Otherwise, the algorithm advances from the step B88 to a step B92.

In the case where the three successive 0-point information values Z are "101" and the RLL mode signal does not represent RLL (1, X), and in the case where the three successive 0-point information values Z are "100" or "001", the before-equalization signal level remains in the same for a short time interval centered at the sample point of interest. Thus, in this case, the step B86 calculates an intermediate value P according to the previously-indicated equation (13). After the step B86, the algorithm advances to the step B89.

The step B89 detects the polarity of the present-moment signal D3 (the output signal of the subtracter 31). Specifically, the step B89 decides whether or not the present-moment signal D3 is smaller than "0". When the present-moment signal D3 is equal to or greater than "0", the algorithm advances from the step B89 to a step B91. When the present-moment signal D3 is smaller than "0", the algorithm advances from the step B89 to a step B90.

The step B91 sets a temporary decision level (a temporary decision value or a temporary decision result value) Q equal to the value P. In other words, the step B91 executes the statement "Q=P". On the other hand, the step B90 sets the temporary decision level Q equal to the value –P (the value P multiplied by –1). In other words, the step B90 executes the statement "Q=–P". After the steps B90 and B91, the current execution cycle of the temporary decision ends.

The step B92 sets the temporary decision level Q equal to "0" according to the statement "Q=0". The algorithm advances to the step B92 in cases including the case where the central-place one among the the three successive 0-point information values Z is "1". After the step B92, the current execution cycle of the temporary decision ends.

The temporary decision circuit 33a outputs a signal representative of the temporary decision level (the temporary decision value) Q to the subtracter 34 as a temporary decision result signal for an integral-type reproduced signal. The temporary decision value Q is determined on the basis of one of the previously-indicated equations (11), (12), and (13) and the previously-indicated equation "Q=0". Accordingly, the equalization by the transversal filter 21 for an integral-type reproduced signal is based on one of the equations (11), (12), and (13) and the equation "Q=0". The equalization based on one of the equations (11), (12), and (13) and the equation "Q=0" is periodically executed in response to the polarity of the present-moment signal D3 at a timing of the central-place one (the second-place one) among three successive 0-point information values Z.

Forty-Fourth Embodiment

An information reproducing apparatus in a forty-fourth embodiment of this invention is a modification of the apparatus in one of embodiments among the first to forty-third embodiments thereof which include the temporary decision circuit 33 or 33a. In the apparatus of the forty-fourth embodiment of this invention, at least one of the PR mode signal and the RLL mode signal fed to the temporary decision circuit 33 or 33a is fixed.

Forty-Fifth Embodiment

An information reproducing apparatus in a forty-fifth embodiment of this invention is a modification of the apparatus in one of embodiments among the first to forty-fourth embodiments thereof which include the inverter 35. The apparatus of the forty-fifth embodiment of this invention includes an inverter array instead of the inverter 35. The inverter array receives the tap output signals from the transversal filter 21. The inverter array inverts the tap output signals, and outputs the inversion-resultant signals to the multiplier and LPF section 27.

Forty-Sixth Embodiment

An information reproducing apparatus in a forty-sixth embodiment of this invention is a modification of the apparatus in one of embodiments among the first to forty-fourth embodiments thereof which include the inverter 35.

The apparatus of the forty-sixth embodiment of this invention includes an inverter array instead of the inverter 35. The inverter array receives the output signals of the multiplier and LPF section 27 which represent tap coefficients. The inverter array inverts the tap-coefficient signals, and outputs the inversion-resultant signals to the transversal filter 21.

Forty-Seventh Embodiment

An information reproducing apparatus in a forty-seventh embodiment of this invention is a modification of the apparatus in one of embodiments among the first to forty-fourth embodiments thereof which include the inverter 35. The apparatus of the forty-seventh embodiment of this invention includes a polarity-change arrangement instead of the inverter 35. The polarity-change arrangement changes the polarity of a processed digital signal within the transversal filter 21.

Forty-Eighth Embodiment

An information reproducing apparatus in a forty-eighth embodiment of this invention is a modification of the apparatus in one of embodiments among the first to forty-fourth embodiments thereof which include the inverter 35. The apparatus of the forty-eighth embodiment of this invention includes a polarity-change arrangement instead of the inverter 35. The polarity-change arrangement implements signal-polarity inversion at a place in the loop of a signal propagation path.

What is claimed is:

1. An information reproducing apparatus comprising:
   first means for reading a first signal from a first track of a recording medium;
   second means for reading a second signal from a second track of the recording medium, the second track neighboring the first track;
   a filter for filtering the second signal read by the second means into a filtering-resultant signal according to a controllable filtering characteristic;
   a first subtracter for subtracting the filtering-resultant signal from the first signal read by the first means to generate a subtraction-resultant signal;
   a peak detector for detecting whether or not a level represented by the first signal read by the first means peaks, and generating peak-point information representing a timing at which the level represented by the first signal peaks;
   a second subtracter for generating an error signal indicative of a difference between the subtraction-resultant signal and a prescribed reference signal at a timing equal to the timing represented by the peak-point information; and
   third means for controlling the filtering characteristic of the filter in response to the error signal generated by the second subtracter so as to minimize the error signal.

2. An information reproducing apparatus as recited in claim 1, wherein the first means comprises means for reading the first signal from the first track of the recording medium in a tangential push-pull method.

3. An information reproducing apparatus comprising:
   first means for reading a first signal of a run-length-limited code from a first track of a recording medium;
   second means for reading a second signal from a second track of the recording medium, the second track neighboring the first track;
   a transversal filter subjecting the first signal read by the first means to a partial-response waveform equalization to generate an equalization-resultant signal, the partial-response waveform equalization depending on tap coefficients;
   a controllable filter for filtering the second signal read by the second means into a filtering-resultant signal according to a controllable filtering characteristic;
   a first subtracter for subtracting the filtering-resultant signal from the equalization-resultant signal to generate a subtraction-resultant signal;
   third means for detecting whether or not one of (1) the first signal read by the first means and (2) the subtraction-resultant signal generated by the first subtracter corresponds to a peak point, and generating peak-point information in response to a result of said detecting;
   a temporary decision device for calculating a temporary decision value of the subtraction-resultant signal on the basis of a PR mode signal, an RLL mode signal, the peak-point information, and an actual value of the subtraction-resultant signal, the PR mode signal representing a type of the partial-response waveform equalization, the RLL mode signal representing a type of the run-length-limited code;
   a second subtracter for calculating a difference between the temporary decision value of the subtraction-resultant signal and the actual value thereof, and generating an error signal in response to the calculated difference; and
   fourth means for controlling the tap coefficients of the transversal filter and the filtering characteristic of the controllable filter in response to the error signal generated by the second subtracter so as to minimize the error signal.

4. An information reproducing apparatus as recited in claim 3, further comprising a phase-locked loop circuit for generating a system clock signal from the subtraction-resultant signal generated by the first subtracter, a delay circuit responsive to the peak-point information generated by the third means for outputting at least three successive samples of the peak-point information, and means provided in the temporary decision device for calculating the temporary decision value of the subtraction-resultant signal on the basis of the PR mode signal, the RLL mode signal, the successive samples of the peak-point information which are outputted from the delay circuit, and the actual value of the subtraction-resultant signal, wherein the third means is contained in the phase-locked loop circuit.

5. An information reproducing apparatus as recited in claim 3, further comprising a phase-locked loop circuit for generating a system clock signal from the first signal read by the first means, a delay circuit responsive to the peak-point information generated by the third means for outputting at least three successive samples of the peak-point information, and means provided in the temporary decision device for calculating the temporary decision value of the subtraction-resultant signal on the basis of the PR mode signal, the RLL mode signal, the successive samples of the peak-point information which are outputted from the delay circuit, and the actual value of the subtraction-resultant signal.

6. An information reproducing apparatus comprising:
   first means for reading a first signal of a run-length-limited code from a first track of a recording medium;
   second means for reading a second signal from a second track of the recording medium, the second track neighboring the first track;
   a first A/D converter for converting the first signal read by the first means into a first digital signal;

a second A/D converter for converting the second signal read by the second means into a second digital signal;

third means for re-sampling the first digital signal generated by the first A/D converter to generate a first re-sampling-resultant signal;

fourth means for generating a bit clock signal from the first digital signal generated by the first A/D converter;

a first transversal filter subjecting the first re-sampling-resultant signal to a partial-response waveform equalization to generate an equalization-resultant signal, the partial-response waveform equalization depending on first tap coefficients;

fifth means for re-sampling the second digital signal generated by the second A/D converter in response to the bit clock signal to generate a second re-sampling-resultant signal;

a second transversal filter for filtering the second re-sampling-resultant signal into a pseudo crosstalk signal according to second tap coefficients, the pseudo crosstalk signal indicating a crosstalk between the first and second tracks;

a first subtracter for subtracting the pseudo crosstalk signal from the equalization-resultant signal to generate a subtraction-resultant signal;

sixth means for detecting whether or not one of (1) the first digital signal generated by the first A/D converter and (2) the subtraction-resultant signal generated by the first subtracter corresponds to a peak point, and generating peak-point information in response to a result of said detecting;

a delay circuit responsive to the peak-point information generated by the fifth means for outputting at least three successive samples of the peak-point information;

a temporary decision device for calculating a temporary decision value of the subtraction-resultant signal on the basis of a PR mode signal, an RLL mode signal, the successive samples of the peak-point information which are outputted from the delay circuit, and an actual value of the subtraction-resultant signal, the PR mode signal representing a type of the partial-response waveform equalization, the RLL mode signal representing a type of the run-length-limited code;

a second subtracter for calculating a difference between the temporary decision value of the subtraction-resultant signal and the actual value thereof, and generating an error signal in response to the calculated difference;

seventh means for controlling the first tap coefficients of the first transversal filter in response to the error signal generated by the second subtracter so as to minimize the error signal; and eighth means for controlling the second tap coefficients of the second transversal filter in response to the error signal generated by the second subtracter.

7. An information reproducing apparatus as recited in claim 6, wherein at least one of the PR mode signal and the RLL mode signal remains fixed.

8. An information reproducing apparatus as recited in claim 6, wherein the sixth means comprises means for detecting whether or not the subtraction-resultant signal generated by the first subtracter corresponds to a peak point, and generating peak-point information in response to a result of said detecting.

9. An information reproducing apparatus as recited in claim 6, wherein the type of the partial-response waveform equalization which is represented by the PR mode signal is expressed as PR (a, b, −b, −a), and the successive samples of the peak-point information are three successive samples, and wherein the temporary decision device comprises means for calculating a value P on the basis of the successive samples of the peak-point information, the value P being equal to a·G when at least one of the successive samples of the peak-point information except a central sample corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of the successive samples of the peak-point information corresponds to a peak point, where G denotes a gain factor.

10. An information reproducing apparatus as recited in claim 6, wherein the type of the partial-response waveform equalization which is represented by the PR mode signal is expressed as PR (a, b, −b, −a), and the successive samples of the peak-point information are five successive samples, and wherein the temporary decision device comprises means for calculating a value P on the basis of the successive samples of the peak-point information, the value P being equal to a·G when at least one of second and fourth samples among the successive samples of the peak-point information corresponds to a peak point, the value P being equal to (a+b)·G when the central sample among the successive samples of the peak-point information corresponds to a peak point, means for detecting a polarity of a level represented by the equalization-resultant signal which occurs when the central sample among the successive samples of the peak-point information corresponds to a peak point, means for calculating the temporary decision value on the basis of the calculated value P and the detected polarity, and means for setting the temporary decision value to "0" when none of second, third, and fourth samples among the successive samples of the peak-point information corresponds to a peak point, where G denotes a gain factor.

11. An information reproducing apparatus comprising:

first means for reading a first signal from a first track of a recording medium;

second means for reading a second signal from a second track of the recording medium, the second track neighboring the first track;

a filter for filtering the second signal read by the second means into a filtering-resultant signal according to a controllable filtering characteristic;

a first subtracter for subtracting the filtering-resultant signal from the first signal read by the first means to generate a subtraction-resultant signal;

a zero-cross detector for detecting whether or not a level represented by the first signal read by the first means crosses zero, and generating 0-point information representing a timing at which the level represented by the first signal crosses zero;

a peak detector for detecting whether or not the level represented by the first signal read by the first means peaks, and generating peak-point information representing a timing at which the level represented by the first signal peaks;

third means for selecting one of (1) the 0-point information generated by the zero-cross detector and (2) the peak-point information generated by the peak detector;

a second subtracter for generating an error signal indicative of a difference between the subtraction-resultant signal and a prescribed reference result signal at a timing equal to the timing represented by the information selected by the third means; and fourth means for controlling the filtering characteristic of the filter in response to the error signal generated by the second subtracter so as to minimize the error signal.

12. An information reproducing apparatus as recited in claim 11, wherein the first means comprises means for reading the first signal from the first track of the recording medium in a tangential push-pull method.

13. An information reproducing apparatus comprising:

first means for reading a first signal of a run-length-limited code from a first track of a recording medium;

second means for reading a second signal from a second track of the recording medium, the second track neighboring the first track;

a transversal filter subjecting the first signal read by the first means to a partial-response waveform equalization to generate an equalization-resultant signal, the partial-response waveform equalization depending on tap coefficients;

a controllable filter for filtering the second signal read by the second means into a filtering-resultant signal according to a controllable filtering characteristic;

a first subtracter for subtracting the filtering-resultant signal from the equalization-resultant signal to generate a subtraction-resultant signal;

third means for detecting whether or not one of (1) the first signal read by the first means and (2) the subtraction-resultant signal generated by the first subtracter corresponds to a zero-cross point, and generating 0-point information in response to a result of said detecting;

fourth means for detecting whether or not one of (1) the first signal read by the first means and (2) the subtraction-resultant signal generated by the first subtracter corresponds to a peak point, and generating peak-point information in response to a result of said detecting;

fifth means for selecting one of (1) the 0-point information generated by the third means and (2) the peak-point information generated by the fourth means;

a temporary decision device for calculating a temporary decision value of the subtraction-resultant signal on the basis of a PR mode signal, an RLL mode signal, the information selected by the fifth means, and an actual value of the subtraction-resultant signal, the PR mode signal representing a type of the partial-response waveform equalization, the RLL mode signal representing a type of the run-length-limited code;

a second subtracter for calculating a difference between the temporary decision value of the subtraction-resultant signal and the actual value thereof, and generating an error signal in response to the calculated difference; and sixth means for controlling the tap coefficients of the transversal filter and the filtering characteristic of the controllable filter in response to the error signal generated by the second subtracter so as to minimize the error signal.

14. An information reproducing apparatus as recited in claim 13, further comprising a phase-locked loop circuit for generating a system clock signal from the subtraction-resultant signal generated by the first subtracter, a delay circuit responsive to the information selected by the fifth means for outputting at least three successive samples of the information selected by the fifth means, and means provided in the temporary decision device for calculating the temporary decision value of the subtraction-resultant signal on the basis of the PR mode signal, the RLL mode signal, the successive samples of the information which are outputted from the delay circuit, and the actual value of the subtraction-resultant signal, wherein the third means and the fourth means are contained in the phase-locked loop circuit.

15. An information reproducing apparatus as recited in claim 13, further comprising a phase-locked loop circuit for generating a system clock signal from the first signal read by the first means, a delay circuit responsive to the information selected by the fifth means for outputting at least three successive samples of the information selected by the fifth means, and means provided in the temporary decision device for calculating the temporary decision value of the subtraction-resultant signal on the basis of the PR mode signal, the RLL mode signal, the successive samples of the information which are outputted from the delay circuit, and the actual value of the subtraction-resultant signal.

16. An information reproducing apparatus as recited in claim 13, further comprising seventh means for changing the partial-response waveform equalization by the transversal filter between PR (a, b, b, a) equalization and PR (a, b, −b, −a) equalization.

17. An information reproducing apparatus comprising:

first means for reading a first signal of a run-length-limited code from a first track of a recording medium;

second means for reading a second signal from a second track of the recording medium, the second track neighboring the first track;

a first A/D converter for converting the first signal read by the first means into a first digital signal;

a second A/D converter for converting the second signal read by the second means into a second digital signal;

third means for re-sampling the first digital signal generated by the first A/D converter to generate a first re-sampling-resultant signal;

fourth means for generating a bit clock signal from the first digital signal generated by the first A/D converter;

a first transversal filter subjecting the first re-sampling-resultant signal to a partial-response waveform equalization to generate an equalization-resultant signal, the partial-response waveform equalization depending on first tap coefficients;

fifth means for re-sampling the second digital signal generated by the second A/D converter in response to the bit clock signal to generate a second re-sampling-resultant signal;

a second transversal filter for filtering the second re-sampling-resultant signal into a pseudo crosstalk signal according to second tap coefficients, the pseudo crosstalk signal indicating a crosstalk between the first and second tracks;

a first subtracter for subtracting the pseudo crosstalk signal from the equalization-resultant signal to generate a subtraction-resultant signal;

sixth means for detecting whether or not one of (1) the first digital signal generated by the first A/D converter and (2) the subtraction-resultant signal generated by the first subtracter corresponds to a zero-cross point, and generating 0-point information in response to a result of said detecting;

seventh means for detecting whether or not one of (1) the first digital signal generated by the first A/D converter and (2) the subtraction-resultant signal generated by the first subtracter corresponds to a peak point, and generating peak-point information in response to a result of said detecting;

eighth means for selecting one of (1) the 0-point information generated by the sixth means and the peak-point information generated by the seventh means;

a delay circuit responsive to the information selected by the eighth means for outputting at least three successive samples of the information selected by the eighth means;

a temporary decision device for calculating a temporary decision value of the subtraction-resultant signal on the basis of a PR mode signal, an RLL mode signal, the successive samples of the information which are outputted from the delay circuit, and an actual value of the subtraction-resultant signal, the PR mode signal representing a type of the partial-response waveform equalization, the RLL mode signal representing a type of the run-length-limited code;

a second subtracter for calculating a difference between the temporary decision value of the subtraction-resultant signal and the actual value thereof, and generating an error signal in response to the calculated difference;

ninth means for controlling the first tap coefficients of the first transversal filter in response to the error signal generated by the second subtracter so as to minimize the error signal; and tenth means for controlling the second tap coefficients of the second transversal filter in response to the error signal generated by the second subtracter.

18. An information reproducing apparatus as recited in claim 17, wherein at least one of the PR mode signal and the RLL mode signal remains fixed.

19. An information reproducing apparatus as recited in claim 17, wherein the sixth means comprises means for detecting whether or not the subtraction-resultant signal generated by the first subtracter corresponds to a zero-cross point, and generating 0-point information in response to a result of said detecting, and the seventh means comprises means for detecting whether or not the subtraction-resultant signal generated by the first subtracter corresponds to a peak point, and generating peak-point information in response to a result of said detecting.

20. An information reproducing apparatus comprising:

first means for reading a first signal from a first track of a recording medium;

second means for reading a second signal from a second track of the recording medium, the second track neighboring the first track;

a filter for filtering the second signal read by the second means into a filtering-resultant signal according to a controllable filtering characteristic;

a first subtracter for subtracting the filtering-resultant signal from the first signal read by the first means to generate a subtraction-resultant signal;

a peak detector for detecting whether or not a level represented by the first signal read by the first means peaks, and generating peak-point information representing a timing at which the level represented by the first signal peaks;

a temporary decision circuit for implementing a temporary decision about the subtraction-resultant signal generated by the first subtracter, and generating a temporary decision result signal representing a result of the temporary decision;

a second subtracter for generating an error signal indicative of a difference between the subtraction-resultant signal and the temporary decision result signal at a timing equal to the timing represented by the peak-point information; and third means for controlling the filtering characteristic of the filter in response to the error signal generated by the second subtracter so as to minimize the error signal.

21. An information reproducing apparatus comprising:

first means for reading a first signal from a first track of a recording medium;

second means for reading a second signal from a second track of the recording medium, the second track neighboring the first track;

a filter for filtering the second signal read by the second means into a filtering-resultant signal according to a controllable filtering characteristic;

a first subtracter for subtracting the filtering-resultant signal from the first signal read by the first means to generate a subtraction-resultant signal;

a zero-cross detector for detecting whether or not a level represented by the first signal read by the first means crosses zero, and generating 0-point information representing a timing at which the level represented by the first signal crosses zero;

a peak detector for detecting whether or not the level represented by the first signal read by the first means peaks, and generating peak-point information representing a timing at which the level represented by the first signal peaks;

third means for selecting one of (1) the 0-point information generated by the zero-cross detector and (2) the peak-point information generated by the peak detector;

a temporary decision circuit for implementing a temporary decision about the subtraction-resultant signal generated by the first subtracter, and generating a temporary decision result signal representing a result of the temporary decision;

a second subtracter for generating an error signal indicative of a difference between the subtraction-resultant signal and the temporary decision result signal at a timing equal to the timing represented by the information selected by the third means; and fourth means for controlling the filtering characteristic of the filter in response to the error signal generated by the second subtracter so as to minimize the error signal.

* * * * *